(12) United States Patent  (10) Patent No.: US 8,926,216 B2
McAndrews et al.  (45) Date of Patent: Jan. 6, 2015

(54) ADJUSTABLE ASSEMBLY FOR A BICYCLE

(75) Inventors: Michael McAndrews, Capitola, CA (US); Ron Powers, Santa Cruz, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 165 days.

(21) Appl. No.: 13/417,069

(22) Filed: Mar. 9, 2012

(65) Prior Publication Data
US 2012/0228906 A1 Sep. 13, 2012

Related U.S. Application Data

(60) Provisional application No. 61/452,024, filed on Mar. 11, 2011.

(51) Int. Cl.
F16B 7/10 (2006.01)
B62J 1/08 (2006.01)
B62K 25/08 (2006.01)
B62K 25/04 (2006.01)

(52) U.S. Cl.
CPC . *B62J 1/08* (2013.01); *B62K 25/08* (2013.01); *B62J 2001/085* (2013.01); *B62K 2025/045* (2013.01); *B62K 2025/048* (2013.01)
USPC .................................................... 403/109.7

(58) Field of Classification Search
USPC .......... 403/109.7, 109.8, 109.3, 109.5, 109.1; 248/407, 411; 297/215.13
See application file for complete search history.

(56) References Cited

U.S. PATENT DOCUMENTS 373,303 A 11/1887 Patzer
390,381 A 10/1888 Luetke
390,406 A 10/1888 Sittig
510,993 A 12/1893 Riess
617,831 A 1/1899 Irish et al.
(Continued)

FOREIGN PATENT DOCUMENTS

DE 9013266 11/1990
DE 9405449 9/1994
(Continued)

OTHER PUBLICATIONS

International Search Report (mailed May 23, 2012) for International Application No. PCT/US2012/028355, which is the PCT counterpart of the present application.

*Primary Examiner* — Michael P Ferguson
*Assistant Examiner* — Daniel Wiley
(74) *Attorney, Agent, or Firm* — Knobbe, Martens, Olson & Bear, LLP

(57) ABSTRACT

According to some embodiments, an adjustable assembly for a bicycle comprises a first support and a second support slidably positioned within at least a portion of the first support, such that one of the first support and the second support is adapted to attach to a first bicycle portion and the other of the first support and the second support is adapted to attach to a second bicycle portion. In some embodiments, the second support comprises an expansion portion configured to be selectively moved between an expanded position and a retracted position. In one embodiment, the expansion portion is configured to contact and engage at least one portion of the first support when the expansion portion is in an expanded position, and the first support is configured to be selectively moved relative to the second support when the expansion portion is permitted to assume a retracted position.

15 Claims, 53 Drawing Sheets

(56) References Cited

U.S. PATENT DOCUMENTS

| | | |
|---|---|---|
| 2,644,504 A | 7/1953 | Vick |
| 2,780,277 A | 2/1957 | Ries et al. |
| 2,909,212 A | 10/1959 | Scherer |
| 3,228,647 A | 1/1966 | Jaroslaw |
| 3,327,985 A | 6/1967 | Levit et al. |
| 3,560,032 A | 2/1971 | Cohen et al. |
| 3,861,740 A | 1/1975 | Tajima et al. |
| 4,023,649 A | 5/1977 | Wood |
| 4,113,221 A | 9/1978 | Wehner |
| 4,113,222 A | 9/1978 | Frinzel |
| 4,150,851 A | 4/1979 | Cienfuegos |
| 4,165,854 A | 8/1979 | Duly |
| 4,245,826 A | 1/1981 | Wirges |
| 4,261,540 A | 4/1981 | Baker et al. |
| 4,640,484 A | 2/1987 | Lamond |
| 4,674,796 A | 6/1987 | Weinich et al. |
| 4,706,916 A | 11/1987 | Cullmann et al. |
| 4,772,069 A | 9/1988 | Szymski |
| 4,789,176 A | 12/1988 | Carroll |
| 4,807,856 A | 2/1989 | Teckenbrock |
| 4,850,733 A | 7/1989 | Shook |
| 4,872,696 A | 10/1989 | Gill |
| 4,919,378 A | 4/1990 | Iwasaki et al. |
| 5,036,873 A | 8/1991 | Clayton |
| 5,044,592 A | 9/1991 | Cienfuegos |
| 5,149,034 A | 9/1992 | Ganaja |
| 5,236,169 A | 8/1993 | Johnsen |
| 5,240,219 A | 8/1993 | Stonehouse |
| 5,458,020 A | 10/1995 | Wang |
| 5,459,908 A | 10/1995 | Chen |
| 5,500,981 A | 3/1996 | Ho |
| 5,513,895 A | 5/1996 | Olson et al. |
| 5,584,097 A | 12/1996 | Lu |
| 5,586,830 A | 12/1996 | Wanek |
| 5,620,070 A | 4/1997 | Wang |
| 5,628,088 A | 5/1997 | Chen |
| 5,683,200 A | 11/1997 | Levy |
| 5,713,555 A | 2/1998 | Zurfluh et al. |
| 5,727,898 A | 3/1998 | Lu |
| 5,729,866 A | 3/1998 | Chg |
| 5,826,935 A | 10/1998 | DeFreitas |
| 5,829,733 A | 11/1998 | Becker |
| 5,899,479 A | 5/1999 | Schroder |
| 5,911,263 A | 6/1999 | Wu |
| 6,202,971 B1 | 3/2001 | Duncan |
| 6,220,581 B1 | 4/2001 | Mueller |
| 6,276,756 B1 | 8/2001 | Cho et al. |
| 6,354,557 B1 | 3/2002 | Walsh |
| 6,478,278 B1 | 11/2002 | Duncan |
| 6,543,754 B2 | 4/2003 | Ogura |
| 6,585,215 B2 | 7/2003 | Duncan |
| 6,609,686 B2 | 8/2003 | Malizia |
| 6,827,397 B1 | 12/2004 | Driver |
| 6,913,560 B2 | 7/2005 | Ryan et al. |
| 7,017,928 B2 | 3/2006 | Felsl et al. |
| 7,025,367 B2 | 4/2006 | McKinnon |
| 7,025,522 B2 | 4/2006 | Sicz et al. |
| 7,044,274 B2 | 5/2006 | Chen |
| 7,083,180 B2 | 8/2006 | Turner |
| 7,267,635 B2 | 9/2007 | Ryan et al. |
| 7,306,206 B2 | 12/2007 | Turner |
| 7,370,877 B2 | 5/2008 | Refsum |
| 7,374,140 B2 | 5/2008 | Crain et al. |
| 7,422,224 B2 | 9/2008 | Sicz et al. |
| 7,673,936 B2 | 3/2010 | Hsu |
| 7,708,251 B2 | 5/2010 | Watt et al. |
| 7,845,602 B1 | 12/2010 | Young et al. |
| 8,317,261 B2 * | 11/2012 | Walsh ................. 297/215.13 |
| 8,328,454 B2 | 12/2012 | McAndrews et al. |
| 8,702,336 B2 | 4/2014 | McAndrews et al. |
| 2001/0015400 A1 | 8/2001 | Langham |
| 2002/0185581 A1 | 12/2002 | Trask |
| 2003/0136885 A1 | 7/2003 | Malizia |
| 2004/0036327 A1 | 2/2004 | Barandiaran Salaberria |
| 2006/0175792 A1 | 8/2006 | Sicz et al. |
| 2007/0215781 A1 | 9/2007 | Watt |
| 2008/0127770 A1 | 6/2008 | Morelli |
| 2009/0192673 A1 | 7/2009 | Song et al. |
| 2009/0324327 A1 | 12/2009 | McAndrews |
| 2010/0207351 A1 | 8/2010 | Klieber |
| 2010/0254751 A1 | 10/2010 | McMillan, III |
| 2010/0314917 A1 | 12/2010 | Hsieh |
| 2012/0006949 A1 | 1/2012 | Laird et al. |
| 2013/0093159 A1 | 4/2013 | McAndrews et al. |

FOREIGN PATENT DOCUMENTS

| | | |
|---|---|---|
| DE | 4401980 | 7/1995 |
| DE | 102008059894 B4 | 11/2010 |
| DE | 202010012738 U1 | 12/2010 |
| EP | 0148979 | 7/1985 |
| EP | 1092621 | 4/2001 |
| FR | 1178244 | 5/1959 |
| FR | 2952031 | 5/2011 |
| GB | 2116128 | 9/1983 |
| JP | 04362482 | 12/1992 |
| TW | M278624 | 3/1994 |
| WO | WO 97/20725 | 6/1997 |
| WO | WO 2009/083206 | 7/2009 |
| WO | WO 2010/063535 | 6/2010 |

* cited by examiner

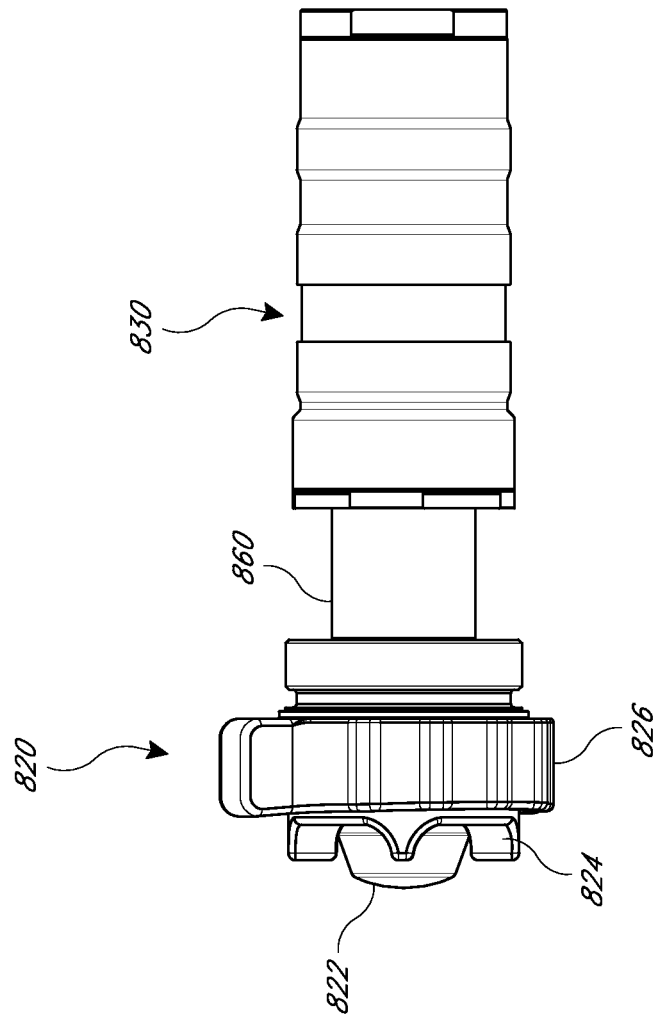
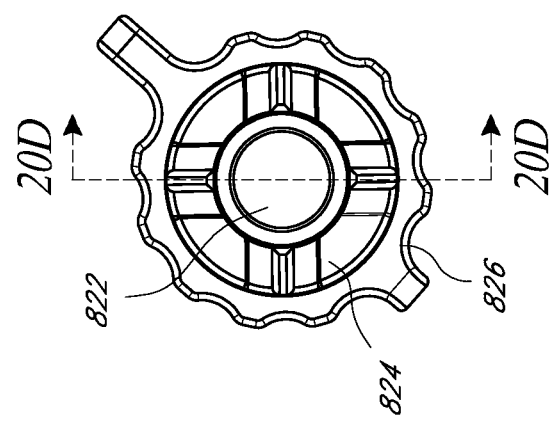

ADJUSTABLE ASSEMBLY FOR A BICYCLE

CROSS REFERENCE TO RELATED APPLICATIONS

This application claims the priority benefit under 35 U.S.C. §119(e) of U.S. Provisional Application No. 61/452,024, filed Mar. 11, 2011, the entirety of which is hereby incorporated by reference herein.

BACKGROUND

1. Field

This application generally relates to adjustable assemblies for bicycles, and more specifically, to vertically-adjustable bicycle saddle posts and handlebar assemblies.

2. Description of the Related Art

In certain situations, it may be desirable for a cyclist to selectively raise or lower the saddle, handlebar assembly and/or other bicycle assembly while he or she is riding the bicycle. For example, it may be advantageous to lower the saddle when going downhill. Further, it may be advantageous to raise the saddle when climbing a hill. The height of the bicycle saddle may be important in determining a rider's power efficiency. In addition, extended use of a bicycle that has an improperly positioned saddle may lead to discomfort and/or injury. Adjustable seat post assemblies are known in the prior art. However, such seat post assemblies are often overly complicated, unreliable and/or difficult to operate or maintain. Accordingly, an improved adjustable bicycle assembly is disclosed herein.

SUMMARY

According to some embodiments, an adjustable assembly for a bicycle comprises a first support and a second support, wherein the first support and the second support are configured to be slidably moved relative to one another. In some embodiments, the first support and/or the second support is adapted to attach to a first bicycle portion, and wherein the other of the first support and the second support is adapted to attach to a second bicycle portion. In some embodiments, the second support comprises an expansion portion (e.g., collet, slidable or otherwise movable balls or bearings, pawls, etc.) configured to be moved between a first position and a second position. In some embodiments, the expansion portion assumes an expanded position (e.g., radially expanded position) when the assembly is in a non-actuated position. In other embodiments, the expansion portion assumes a retracted or contracted position (e.g., radially retracted position) when the assembly is in a non-actuated position. In some embodiments, the expansion portion comprises a plurality of slidable balls, bearings or other members having at least one spherical or partially spherical portion, wherein said balls, bearings or other members are resiliently biased in a radially inwardly or outwardly direction. In some embodiments, such balls, bearings or other members are resiliently biased (e.g., either radially outwardly or inwardly) using one or more pins or other resiliently biased members to which such balls, bearings or other members are coupled. In one embodiment, the expansion portion is configured to contact and engage at least a portion of the first support when the expansion portion is in the first position, and wherein the first support is configured to be selectively moved relative to the second support when the expansion portion is permitted to assume the second position.

According to some embodiments, a retention assembly is configured to slidably move adjacent expansion portion in an engagement position so as to prevent the expansion portion from moving from the first position to the second position. In some embodiments, the assembly further comprises a cable operatively coupled to the retention assembly, wherein movement of the cable in a first direction moves the retention assembly away from the engagement position, thereby allowing the expansion portion to be moved from the first position to the second position. In some embodiments, the expansion portion assumes an expanded position at rest. In other embodiments, the expansion portion assumes a retracted position at rest.

According to some arrangements, the expansion portion is selectively moved between the first position and the second position using at least one motor and/or other device (e.g., servomotor, rotary motor, other type of motor, solenoid, etc.). In some embodiments, such a motor or other device is mechanical or operatively coupled to one more gear boxes, gear reducers and/or the like. In some embodiments, the expansion portion is moved between the first position and the second position hydraulically and/or pneumatically. In one embodiment, the first bicycle portion comprises a bicycle frame and the second bicycle portion comprises a bicycle saddle. In other embodiments, the first bicycle portion comprises a fork assembly and the second bicycle portion comprises a handlebar assembly. In some embodiments, the cable is configured to exit an exterior of the assembly through the first support, the second support and/or the seal head portion, wherein the seal head portion is located generally along an overlap of the first support and the second support.

According to some embodiments, the first support is configured to be moved relative to the second support while a bicycle is being ridden. In some embodiments, the assembly further comprises one or more biasing members (e.g., air springs, coil springs, resilient members, elastomeric materials, etc.) that impart a force within the assembly in an attempt to urge the first support apart from the second support, wherein the biasing member is configured to elevate the adjustable assembly when the expansion portion is in the second position. In some embodiments, when the expansion portion is in the second position, the expansion portion is tripped to engage an immediately elevation level of the first support when the second support is moved relative to the first support. According to some embodiments, an adjustable assembly for a bicycle comprises a first support and a second support, wherein the first support and the second support are configured to be slidably moved relative to one another. In one embodiment, one of the first support and the second support is adapted to attach to a first bicycle portion (e.g., bicycle saddle, bicycle frame, handlebar assembly, fork assembly, etc.), and the other of the first support and the second support is adapted to attach to a second bicycle portion (e.g., bicycle saddle, bicycle frame, handlebar assembly, fork assembly, etc.). In some embodiments, the second support comprises an expansion portion configured to be moved between a first position and a second position. In some embodiments, the expansion portion is configured to contact and engage at least a portion of the first support when the expansion portion is in the first position, and the first support is configured to be selectively moved relative to the second support when the expansion portion is permitted to assume the second position. The adjustable assembly further comprises a biasing member that imparts a force within the assembly in an attempt to urge the first support apart from the second support, wherein the biasing member is configured to elevate the adjustable assembly when the expansion portion is in the second position. In some embodiments, the first support is configured to be moved relative to the second support while a bicycle is being ridden. The adjustable assembly further comprises a connector that operatively couples a controller (e.g., a lever, switch, button, knob, etc.) to the expansion portion, wherein a rider is configured to manipulate the connector in order to selectively move the expansion portion between the first and second positions. In some embodiments, a biasing force created by the biasing member (e.g., air spring, coil spring, elastomeric material or member, other resilient member, etc.) acts to move the first support away from the second support to raise the adjustable assembly when the expansion portion is permitted to assume the second position. In some embodiments, the biasing force is configured to be overcome by a downwardly directed force exerted by a rider to lower the adjustable assembly when the expansion portion is permitted to assume the second position. In one embodiment, the connector is configured to exit to an exterior of the adjustable assembly through a side or a bottom of the adjustable assembly (e.g., through a side of the first or second support, the seal head, etc.). In some embodiments, the connector comprises a cable mechanically coupled to the expansion portion. In one embodiment, the cable connects the controller to a retention assembly that is configured to move relative to the expansion portion. In some embodiments, the connector comprises a hydraulic connection (e.g., a hydraulic line or conduit that operatively couples a controller to the adjustable assembly). In some embodiments, the connector comprises an electrical connection coupled to a solenoid or a motor (e.g., a servomotor, a rotary motor, another motor) positioned within the adjustable assembly. In some embodiments, a motor or similar device is coupled to one or more gear reducers, gear boxes and/or the like. In some embodiments, the adjustable assembly further comprises a retention assembly configured to slidably move within an interior area of the expansion portion in an engagement position so as to prevent the expansion portion from moving from the first position to the second position.

According to some embodiments, the expansion portion of the adjustable assembly is configured to engage one of a plurality of predetermined regions (e.g., grooves, recesses, etc.) of the first portion so that adjustable assembly can be between distinct vertical positions. In some embodiments, such predetermined or distinct regions extend either partially (e.g., intermittently) or continuously or substantially continuously around an entire circumference of the first portion. According to some embodiments, the first portion comprises one, two, three, four, five, six, seven, eight, nine, ten, more than ten predetermined or distinct regions. In other embodiments, the first portion does not comprise any predetermined regions. In such embodiments, the expansion portion is free to engage any desired portion (e.g., inner diameter, other portion, etc.) of the first portion in order to maintain a desired vertical orientation or position of the adjustable assembly. In some embodiments, the adjustable assembly is configured to provide audible confirmation when the expansion portion is moved between adjacent engagement locations (e.g., grooves, other recesses, etc.) of the first portion. Thus, a user can audibly confirm that the adjustable assembly has been moved to the next vertical level (e.g., either up or down). In other embodiments, a visual display of the vertical position can be provided to the rider (e.g., a dial, digital readout and/or other display, etc.) can be provided at or near the handlebar or any other location that the user can easy view.

According to some embodiments, an interior surface of the first support comprises a plurality of grooves, wherein the expansion portion is configured to contact and engage at least one of said grooves when in the first position. In some embodiments, the first support is configured to slidably move at least partially within the second support. In one embodiment, the second support is configured to slidably move at least partially within the first support.

According to some embodiments, an adjustable assembly for a bicycle comprises a first support having an interior surface and a second support configured to slidably move relative to the first support, wherein one of the first support and the second support is adapted to attach to a first bicycle portion, and wherein the other of the first support and the second support is adapted to attach to a second bicycle portion. In some embodiments, the second support comprises an expansion portion (e.g., collet, one or more movable balls, bearings, pawls and/or other members, etc.) configured to be moved between a first position and a second position. In some embodiments, the expansion portion at least partially engages a contact surface when in the first position, and wherein the contact surface is part of or configured to move together with the first support. In some embodiments, the first support is configured to be selectively moved relative to the second support when the expansion portion is permitted to assume the second position. In some embodiments, the adjustable assembly further comprises a retention assembly configured to slidably move adjacent to the expansion portion in an engagement position so as to prevent the expansion portion from moving from the first position to the second position.

According to some embodiments, the adjustable assembly further comprises a biasing member configured to raise an elevation of the adjustable assembly when the expansion portion is in the second position. In some embodiments, the biasing member comprises at least one of an air spring, a coiled spring, an elastomeric material and another resilient member. In one embodiment, the contact surface extends along a radial centerline of the adjustable assembly, and wherein the expansion portion is positioned at least partially around a periphery of the contact surface. In some embodiments, the first support is configured to be moved relative to the second support while a bicycle is being ridden.

According to some embodiments, the contact surface comprises a plurality of distinct grooves along different vertical locations, said distinct grooves being configured to be at least partially engaged by the expansion portion when the expansion portion is in the first position.

According to some embodiments, an adjustable assembly for a bicycle comprises a first support having an interior surface and a second support slidably, wherein the first support is configured to be slidable moved relative to the second support in order to change a height of the adjustable assembly. In some embodiments, the first support and/or the second support is adapted to attach to a first bicycle portion, and wherein the other of the first support and the second support is adapted to attach to a second bicycle portion. In one embodiment, the second support comprises an expansion portion, wherein the expansion portion comprises one or more movable members (e.g., collet, pawls, balls, bearings, etc.) and at least one servomotor, wherein the at least one servomotor is configured to selectively move the at least one movable member between a radially expanded position and a radially retracted position. In some embodiments, the at least one movable member is configured to engage the interior surface of the first support when the at least one movable member is in a radially expanded position, and wherein the first support is configured to be selectively moved relative to the second support when the at least one movable member is permitted to assume a radially retracted position.

According to some embodiments, an adjustable assembly for a bicycle comprises a first support and a second support slidably positioned within at least a portion of the first support, such that one of the first support and the second support is adapted to attach to a first bicycle portion and the other of the first support and the second support is adapted to attach to a second bicycle portion. In some embodiments, the second support comprises an expansion portion configured to be selectively moved between an expanded position and a retracted position. In one embodiment, the expansion portion is configured to contact and engage at least one portion of the first support when the expansion portion is in an expanded position, and the first support is configured to be selectively moved relative to the second support when the expansion portion is permitted to assume a retracted position.

According to some arrangements, the expansion portion comprises a plurality of slidable balls, bearings and/or other items. In one embodiment, the expansion portion comprises one or more movable pawls. In some arrangements, the expansion portion assumes an expanded position at rest. In alternative embodiments, the expansion portion assumes a retracted position at rest. In some arrangements, the expansion portion is moved between an expanded position and a retracted position using a servomotor or another type of mechanical, electromechanical, hydraulic or pneumatic device. In some embodiments, the expansion portion is moved between an expanded position and a retracted position using a solenoid. In other arrangements, the expansion portion is moved between an expanded position and a retracted position hydraulically.

According to some embodiments, the first bicycle portion comprises a bicycle frame and the second bicycle portion comprises a bicycle saddle. In alternative arrangements, the first bicycle portion comprises a fork assembly and the second bicycle portion comprises a handlebar assembly. In one embodiment, the first support is configured to be moved relative to the second support while a bicycle is being ridden.

According to some embodiments, the adjustable assembly additionally comprises a biasing member exerting a force on the second support, such that the biasing member is configured to raise the expansion portion and the second support relative to the first support when the expansion portion is in the retracted position. In several embodiments, upon retraction of the expansion portion, the expansion portion is tripped to engage an immediately adjacent groove of the first support when the second support is moved relative to the first support.

According to some embodiments, an adjustable assembly for a bicycle comprises a first support having an interior surface, a second support slidably positioned within at least a portion of the first support and a third support attached to the first support. In one arrangement, the third support comprises an outer surface, such that the third support is positioned at least partially along an interior of the second support. In some embodiments, the first support or the second support is adapted to attach to a first bicycle portion, and the other of the first and second support is adapted to attach to a second bicycle portion. In some embodiments, the second support comprises an expansion portion configured to be moved between an expanded position and a retracted position, such that the expansion portion is adapted to expand radially inwardly in the direction of the third support. In one embodiment, the expansion portion is configured to engage the third support when the expansion portion is in an expanded position. In some embodiments, the first support is configured to be selectively moved relative to the second support when the expansion portion is permitted to assume a retracted position.

According to some embodiments, the adjustable assembly further comprises a biasing member exerting a force on the second support, wherein the biasing member is configured to raise the expansion portion and the second support relative to the first and third supports when the expansion portion is in the retracted position. In some embodiments, the biasing member comprises an air spring. In some arrangements, the first support is configured to be moved relative to the second support while a bicycle is being ridden.

According to some embodiments, the outer surface of the third support comprises a plurality of grooves, such that the expansion portion is configured to engage one of the grooves when in an expanded position. In one embodiment, the first bicycle portion comprises a bicycle frame and the second bicycle portion comprises a bicycle saddle. In some embodiments, the expansion portion comprises at least one collet, slidable ball or bearing, movable pawl and/or any other movable member. In some arrangements, the expansion portion assumes an expanded position at rest, while in alternative embodiments the expansion portion assumes a retracted position at rest. In some arrangements, the expansion portion is moved between an expanded position and a retracted position using a servomotor or any other type of mechanically, hydraulically, electromechanically or pneumatically powered device. In some embodiments, such a servomotor or other device is positioned within or incorporated into the expansion portion. In some arrangements, the expansion portion is moved between an expanded position and a retracted position using a solenoid.

According to some embodiments, an adjustable assembly for a bicycle comprises a first support having an interior surface and a second support slidably positioned within at least a portion of the first support, wherein the first support or the second support is adapted to attach to a first bicycle portion, while the other support is adapted to attach to a second bicycle portion. In one embodiment, the second support comprises an expansion portion that includes at least one movable member and at least one servomotor. In some embodiments, the servomotor is configured to selectively move the one or more movable members between a radially expanded position and a radially retracted position, so that such movable members are configured to engage the interior surface of the first support when the at least one movable member is in a radially expanded position. In some arrangements, the first support is configured to be selectively moved relative to the second support when the at least one movable member is permitted to assume a radially retracted position.

According to some embodiments, one or more of the movable members comprise a pawl. In one embodiment, the movable member comprises one or more movable (e.g., slidable) balls or bearings. In some embodiments, the movable members are configured to engage a groove, recess or other feature of the first support. In other embodiments, the movable members are configured to engage a portion of the first support that does not include any grooves, recesses or other features (e.g., a generally cylindrical or smooth portion of the adjacent surface of the first support). In some embodiments, at least a portion of an outer surface of one or more of the movable members comprises a generally anti-skid feature and/or material to provide enhanced engagement between the first and second supports when the at least one movable member is in the radially expanded position.

According to some embodiments, the expansion portion assumes a radially expanded position at rest, while in alternative embodiments the expansion portion assumes a radially retracted position at rest. In one embodiment, the first bicycle portion comprises a bicycle frame and the second bicycle portion comprises a bicycle saddle. In some arrangements, the first bicycle portion comprises a fork assembly and the second bicycle portion comprises a handlebar assembly. In one embodiment, the first support is configured to be moved relative to the second support while a bicycle is being ridden. In some embodiments, the adjustable assembly further comprises a biasing member configured to exert a force on the second support, such that the biasing member is configured to raise the expansion portion and the second support relative to the first support when the expansion portion is in the retracted position.

According to some embodiments, an adjustable assembly for a bicycle includes a first support having an interior surface and a second support slidably positioned within at least a portion of the first support. In one embodiment, one of the first support and the second support is adapted to attach to a first bicycle portion, and the other of the first support and the second support is adapted to attach to a second bicycle portion. In some arrangements, one of the first and second supports is permanently attached to or made a part of the frame of the bicycle. Further, the second support comprises an expansion portion configured to be moved between an expanded position and a retracted position. The expansion portion is configured to engage the interior surface of the first support when the expansion portion is in an expanded position. In addition, the first support is configured to be selectively moved relative to the second support when the expansion portion is permitted to assume a retracted position. In some embodiments, the first bicycle portion comprises a bicycle frame and the second bicycle portion comprises a bicycle saddle. In other arrangements, the first bicycle portion comprises a fork assembly and the second bicycle portion comprises a handlebar assembly.

According to some embodiments, a bicycle includes an adjustable assembly. In some arrangements, the assembly includes a first support configured to attach to a first bicycle portion, the first support having an interior surface. The assembly further includes a second support configured to attach to a second bicycle portion, the second support being slidably positioned within the first support. The second support includes a movable portion configured to engage the interior surface of the first support when the movable portion is in an expanded position. In one embodiment, the assembly further includes a retention assembly configured to slidably move at least partially into or out of an interior space of the movable portion, such that the movable portion is generally not permitted to retract inwardly when the retention assembly is positioned within the interior space of the movable portion. Further, the assembly comprises an actuator configured to selectively move the retention assembly into or out of the interior space of the movable portion. In some embodiments, the second support can be selectively moved relative to the first support when the retention assembly is moved out of the interior space of the movable portion. Moreover, the second support is configured to be stationary relative to the first support when the retention assembly is positioned within the interior space of the movable portion. In some arrangements, the first bicycle portion comprises a bicycle frame and the second bicycle portion comprises a bicycle saddle. In other embodiments, the first bicycle portion comprises a fork assembly and the second bicycle portion comprises a handlebar assembly.

According to some embodiments, a method of adjusting the vertical position of a bicycle component comprises providing an adjustable assembly having an outer support and an inner support. In some arrangements, the inner support is slidably positioned within the outer support. Further, the inner support includes an expansion portion configured to engage an interior surface of the outer portion when the expansion portion is in an expanded position. The adjustable assembly further includes a biasing assembly configured to urge the inner support relative to the outer support. In one embodiment, the assembly additionally comprises an actuator configured to selectively permit the expansion portion to be either in a locked orientation wherein the expansion portion is maintained in the expanded position or an unlocked orientation wherein the expansion portion is generally allowed to move into a retracted position.

In some arrangements, the inner support is configured to be selectively slidably moved relative to the outer support when the expansion portion is in the unlocked orientation. Further, the inner support is configured to be generally stationary relative to the outer support when the expansion portion is in the locked orientation. The method further includes securing the outer portion of the adjustable assembly to a first bicycle portion and securing the inner portion of the adjustable assembly to a second bicycle portion. In some arrangements, the method additionally comprises selectively raising the second bicycle portion relative to the first bicycle portion by reducing downward forces on the second bicycle portion and moving the actuator so that the expansion portion is in the unlocked orientation, or selectively lowering the second bicycle portion relative to the first bicycle portion by exerting a downward force on the second bicycle portion and moving the actuator so that the expansion portion is in the unlocked orientation. In addition, the method includes maintaining a selected vertical position of the second bicycle portion by moving the actuator so that the expansion portion is in the locked orientation. According to some embodiments, the first bicycle portion comprises a bicycle frame and the second bicycle portion comprises a bicycle saddle. In other arrangements, the first bicycle portion comprises a fork assembly and the second bicycle portion comprises a handlebar assembly.

In some embodiments, an adjustable seat post assembly for a bicycle includes a first support having an interior surface and a second support slidably positioned within at least a portion of the first support. In one arrangement, the first support is adapted to attach to a bicycle frame, and the second support is adapted to attach to a bicycle saddle. In an alternative embodiment, the second support is adapted to attach to a bicycle frame, and the first support is adapted to attach to a bicycle saddle. Further, the second support includes a collet or other expansion portion that is adapted to be moved between an expanded position and a retracted position. The collet or other expansion portion is configured to engage the interior surface of the first support when the expansion portion is in an expanded position. In addition, the first support is configured to be selectively moved relative to the second support when the expansion portion is permitted to assume a retracted position.

In some embodiments, the interior surface of the first support comprises a plurality of grooves, and the expansion portion is configured to engage one of the grooves when in an expanded position. In other arrangements, the expansion portion comprises a collet or another expandable member. In one embodiment, the collet is slotted and/or is otherwise configured to facilitate retraction and/or expansion. In some embodiments, the collet or other expansion portion comprises spring steel and/or other resilient materials. In another embodiment, the second support comprises a main body portion, and the expansion portion is separately formed with the main body portion. In alternative embodiments, the expansion portion is integrally formed with the second support.

According to some embodiments, the adjustable seat post further includes a biasing assembly configured to urge the support (e.g., the first support or the second support) that is attached to the bicycle saddle relative to the support (e.g., the second support or the first support) that in attached to the bicycle frame. In one embodiment, the expansion portion is in an expanded position while in a resting state when no external forces are exerted on the expansion portion, such that the expansion portion normally engages one of the grooves of the first support. In some arrangements, the expansion portion comprises a collet or other expansion portion.

In some embodiments, the first support and the second support of an adjustable seat post include a generally cylindrical or other tubular shape. In other embodiments, the outer support and the inner support comprise a different shape. In other embodiments, the grooves are circumferentially located around the interior surface of the first support. In one arrangement, the adjustable seat post assembly further comprises a retention assembly configured to slidably move at least partially within or out of an interior space of the expansion portion. In some embodiments, the expansion portion is generally not permitted to retract inwardly when the retention assembly is positioned within the interior space of the expansion portion. In some embodiments, the retention assembly comprises a bearing portion, a locking portion and/or any other portion or component.

According to some embodiments, a retention assembly and/or any other member is normally resiliently biased at least partially within the interior space of the expansion portion. In other arrangements, the adjustable seat post assembly further includes a connector mechanically attached to the retention assembly (e.g., bearing portion, locking portion, etc.) or any other member, such that movement of the connector in a first direction moves the retention assembly and/or one or more of its portions or components (e.g., bearing portion, locking portion, etc.) within the interior space of the expansion portion. Further, and movement of the connector in a second direction moves the retention assembly and/or one or more of its portions or components bearing portion out of the interior space of the expansion portion, the second direction being generally opposite of the first direction. In some embodiments, the connector comprises a cable, a rod or other actuator.

In some embodiments, the connector is operatively connected to a lever configured to be manipulated while the bicycle is being ridden. In other arrangements, the seat post assembly further includes a lock pin operatively connected to the connector and the retention assembly. In one embodiment, the lock pin is configured to prevent the expansion portion from retracting inwardly when positioned within the interior space of the expansion portion.

According to other embodiments, a bicycle includes an adjustable seat post device or assembly which comprises a first support configured to attach to a bicycle frame and a second support configured to attach to a bicycle saddle. In some embodiments, the first support includes an interior surface, and the second support is slidably positioned within the first support. In one arrangement, the second support includes a movable portion configured to engage the interior surface of the first support when the movable portion is in an expanded position. The adjustable seat post further includes a retention assembly and/or any other member configured to slidably move at least partially into or out of an interior space of the movable portion. In one embodiment, the movable portion is generally not permitted to retract inwardly when the retention assembly is positioned within the interior space of the movable portion. In some embodiments, the retention assembly comprises a bearing portion a locking portion and/or any portion or component. In other arrangements, the seat post further comprises a cable, a rod or other actuator configured to selectively move the retention assembly (e.g., the bearing portion, locking portion and/or any other portion or component of the retention assembly) into or out of the interior space of the movable portion. In some embodiments, the second support can be selectively moved relative to the first support when the retention assembly and/or other members are moved out of the interior space of the movable portion. In some embodiments, the second support is configured to be stationary relative to the first support when the retention assembly and/or other members are positioned within the interior space of the movable portion.

In some arrangements, the interior surface of the first support comprises a plurality of grooves. In one embodiment, the movable portion of the second support is configured to engage one of the grooves when the movable portion is in an expanded position. In other embodiments, the second support comprises a main body portion. In another embodiment, the movable portion is separately formed with the main body portion.

According to some embodiments, the movable portion is integrally formed with the second support. In other arrangements, the movable portion of the second support comprises an expansion portion. In one embodiment, the expansion portion comprises a collet or other expandable member. In some embodiments, the collet is slotted or includes other features that help it to retract or expand. In some arrangements, the second support comprises an upper end and a lower end, the movable portion being positioned at or near said lower end of the second support. In other embodiments, the movable portion is positioned along any other portion of the second support.

In some embodiments, the seat post assembly of the bicycle further comprising a biasing assembly configured to urge the second support relative to the first support. In one arrangement, the retention assembly is normally resiliently biased at least partially within the interior space of the movable portion. In other embodiments, the actuator comprises a connector mechanically attached to the retention assembly, which is configured to be moved out of the interior space of the movable portion when the connector is generally moved. In some embodiments, the connector comprises a cable, a rod or other actuator. In other embodiments, the connector is operatively connected to a lever or other actuation device located near a handlebar area of the bicycle. In some embodiments, the connector is operatively attached to a lever or other actuation device positioned underneath the saddle or positioned along any other location of the bicycle.

According to some arrangements, a method of adjusting the vertical position of a saddle of a bicycle includes the step of providing an adjustable seat post assembly. In some embodiments, the seat post assembly includes an outer support and an inner support slidably positioned within the outer support. In some arrangements, the inner support includes an expansion portion configured to engage an interior surface of the outer portion when the expansion portion is in an expanded position. In some embodiments, the adjustable seat post assembly further comprises a biasing assembly configured to urge the inner support relative to the outer support, and an actuator configured to selectively permit the expansion portion to be either in a locked orientation wherein the expansion portion is maintained in the expanded position or an unlocked orientation wherein the expansion portion is generally allowed to move into a retracted position.

In some embodiments, the inner support is configured to be selectively slidably moved relative to the outer support when the expansion portion is in an unlocked orientation. In other embodiments, the inner support is configured to be generally stationary relative to the outer support when the expansion portion is in a locked orientation. In some arrangements, the method of adjusting the vertical position of a bicycle saddle further includes the steps of securing the outer portion of the seat post assembly to a bicycle frame and securing the inner portion of the seat post assembly to a bicycle saddle. In one embodiment, the method further comprises selectively raising the bicycle saddle relative to the bicycle frame by reducing a weight or other downward forces on the bicycle saddle, and moving the actuator so that the expansion portion is in the unlocked orientation, or selectively lowering the bicycle saddle relative to the bicycle frame by exerting weight and/or other downward forces on the bicycle saddle and moving the actuator so that the expansion portion is in an unlocked orientation. In some arrangements, the method of adjusting the vertical position of a bicycle saddle further includes maintaining a selected vertical position of the bicycle saddle by moving the actuator so that the expansion portion is in a locked orientation.

In some arrangements, the expansion portion comprises a slotted collet, another type of collet or some other expandable member. In one embodiment, the actuator includes a connector (e.g., cable, rod, other actuator, etc.) and a lever, the lever being operatively connected to the connector. In some embodiments, selectively raising or lowering the bicycle saddle comprises moving the lever from a first position to a second position, against a resilient force. In other embodiments, maintaining a selected position comprises releasing the lever so that the lever moves to the first position.

BRIEF DESCRIPTION OF THE DRAWINGS

These and other features, aspects and advantages disclosed in the present application are described with reference to drawings of certain preferred embodiments, which are intended to illustrate, but not to limit, the present inventions. It is to be understood that the attached drawings are for the purpose of illustrating concepts disclosed herein and may not be to scale.

FIG. 20B illustrates a top view of the adjustable assembly of FIG. 20A;

FIG. 20C illustrates a side view of the adjustable assembly of FIG. 20A;

DETAILED DESCRIPTION

This application is directed to a vertically-adjustable assembly for a bicycle that is desirably configured to permit a user to selectively raise and/or lower a bicycle component or other portion of the bicycle even while he or she is riding the bicycle. The adjustable assembly and the various systems and features associated with it are described in the context of a bicycle saddle because they have particular utility in this context. However, the adjustable post assembly and methods described herein, as well as their various systems and features, can be used in other contexts as well, such as, for example, but without limitation, the front fork and handlebar area of a bicycle or any other portion of a bicycle. For convenience, the adjustable assembly is described herein with specific reference to an adjustable seat post assembly.

Figure 1:
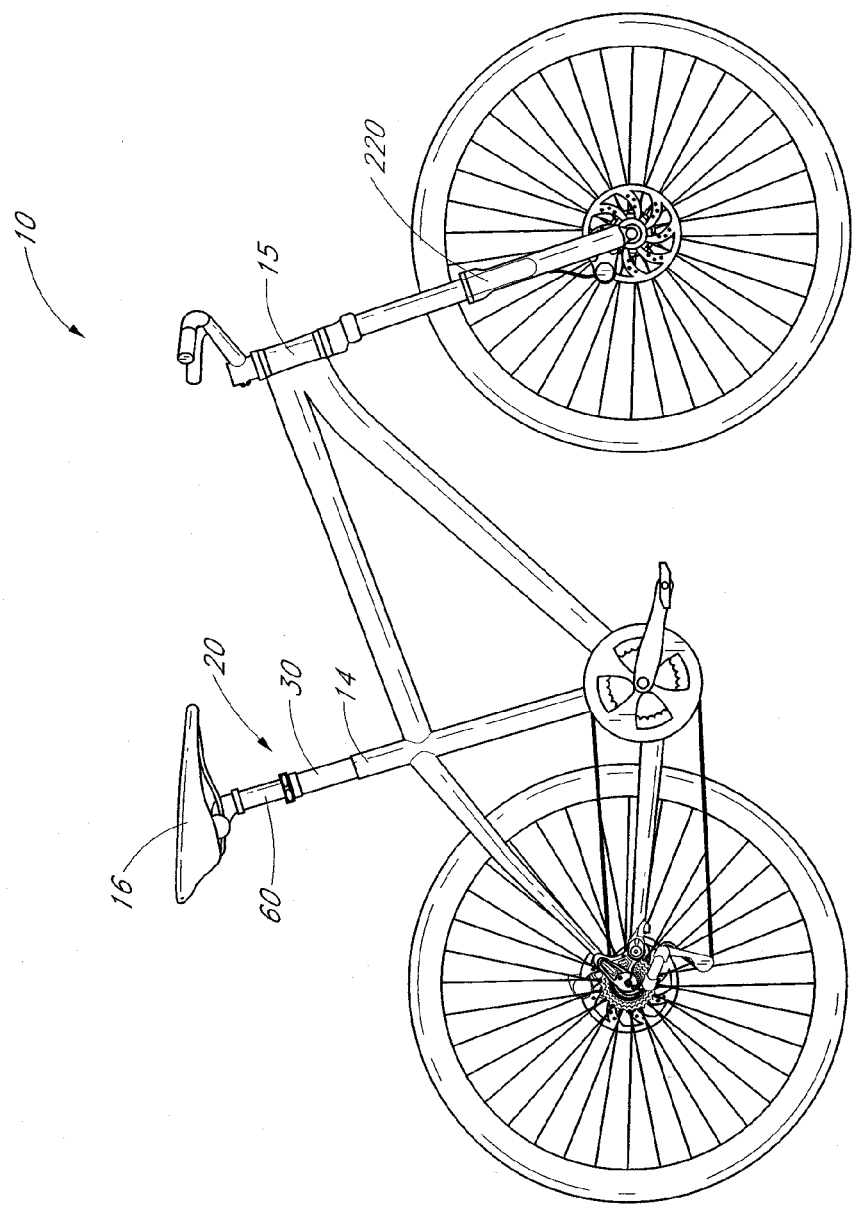
FIG. 1 illustrates a side view of a bicycle comprising an adjustable saddle post assembly according to one embodiment.
Figure 2:
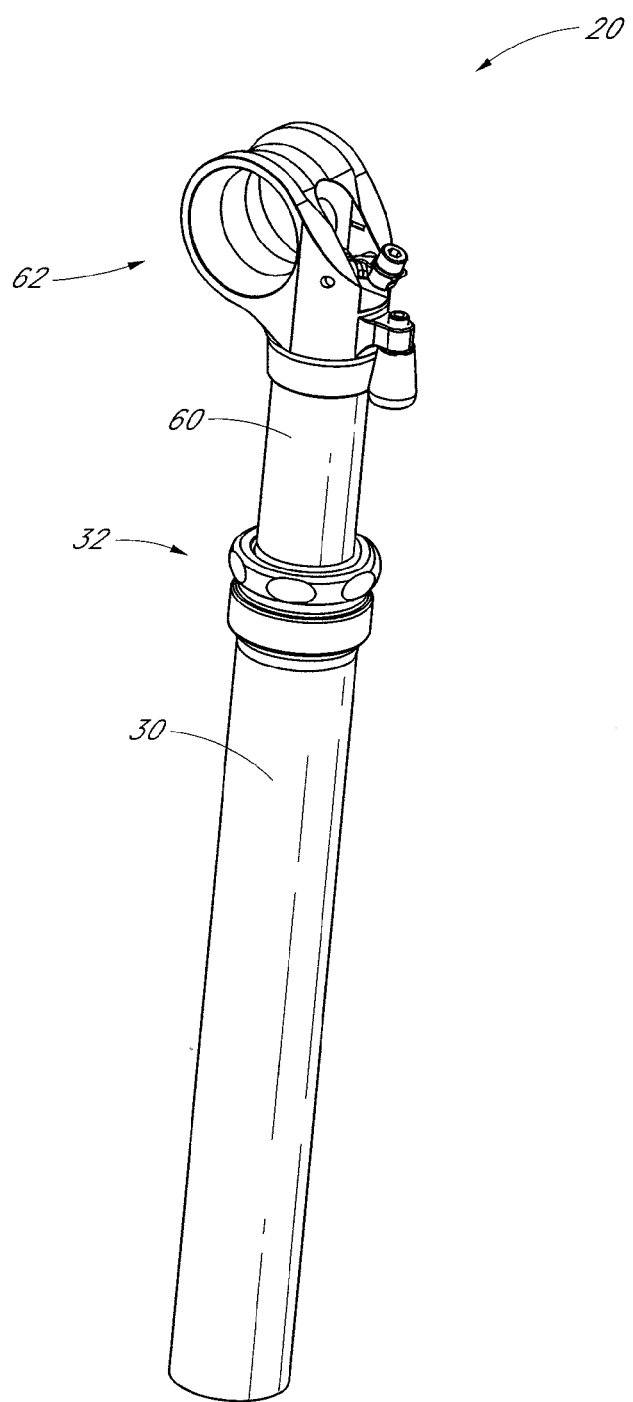
FIG. 2 illustrates a perspective view of an adjustable saddle post assembly according to one embodiment.

As illustrated in FIG. 2, the seat post assembly 20 can include an inner support 60 that is configured to be slidably moved relative to an outer support 30. A bicycle saddle 16 (FIG. 1) or other seat member can be attached to an upper portion of the inner support 60 (e.g., saddle head 62). In some embodiments, the outer support 30 is attached to the bicycle frame 14 (FIG. 1). Further, in other embodiments, the outer support 30 can be permanently attached to or be made a part of the bicycle frame. Accordingly, vertical movement of the inner support 60 relative to the outer support 30 can allow a seated occupant to selectively raise or lower the saddle as desired.

With continued reference to the embodiment depicted in FIGS. 1 and 2, the outer support 30 is configured to attach to the bicycle frame 14, while the inner support 60 is configured to attach to the saddle 16 or other seat member. As discussed, the outer support 30 can be incorporated into the bicycle frame. Alternatively, however, the outer support 30 can be configured to attach to the saddle 16 or other seat member and the inner support 60 can be configured to attach to the bicycle frame 14.

In addition, the seat post assembly 20 can be permanently or removably attached to the bicycle frame 14 and/or the saddle 16, as desired or required. For example, the outer support 30 of the seat post assembly 20 can be a part of the frame 14. In one arrangement, the seat post assembly 10 is secured to the bicycle frame 14 using a clamping device, a mechanical fastener and/or the like.

Figure 3:
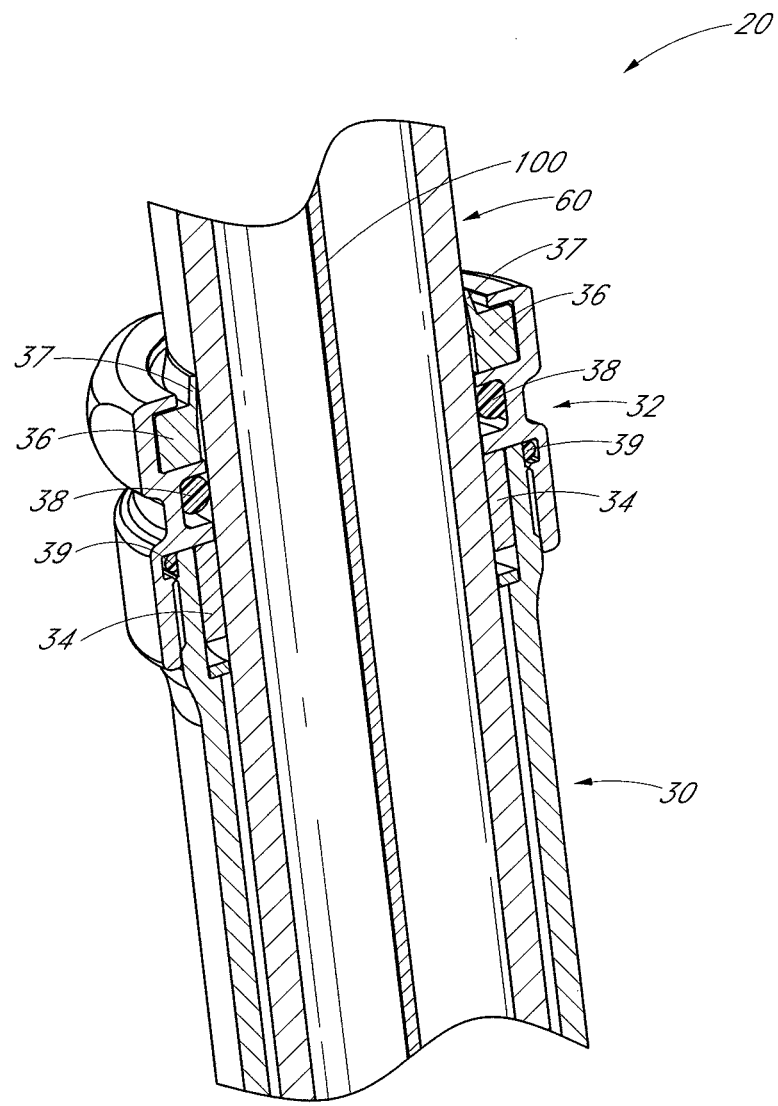
FIG. 3 illustrates a partial perspective, cross-sectional view of the adjustable saddle post of FIG. 2.

As illustrated in FIG. 3, the outer support 30 can include a seal head portion 32 at or near its upper end. The seal head portion 32 can be advantageously configured to prevent fluids, solids (e.g., dust) or any other materials from entering the interior of the outer support 30 and/or inner support 60. In addition, as discussed in greater detail herein, the seal head portion 32 can help prevent air or other fluids from escaping a chamber 58 or other internal portion of the seat post assembly 20. In some embodiments, the seal head portion 32 comprises a circumferential wiper 36 that generally abuts and contacts an outer surface of the inner support 60. The wiper 36 can comprise one or more elastomeric (e.g., rubber), thermoplastic or other flexible, rigid or semi-rigid or materials.

In the depicted arrangement, the wiper 36 comprises a lip portion 37 or other member that is resiliently biased toward an outer surface of the inner support 60. As a result of such a design, the likelihood of fluids, solids and/or other materials leaking or otherwise escaping the space between the inner support 60 and outer support 30 is reduced. In addition, one or more other sealing members can be used to prevent or minimize fluids and/or other materials from entering or leaving an interior of the seat post assembly 20 through the seal head portion 32, either in lieu of or in addition to the wiper 36. For example, the seal head portion 32 can comprise one or more O-rings 38, 39 or other sealing members, as desired or required.

Figure 4:
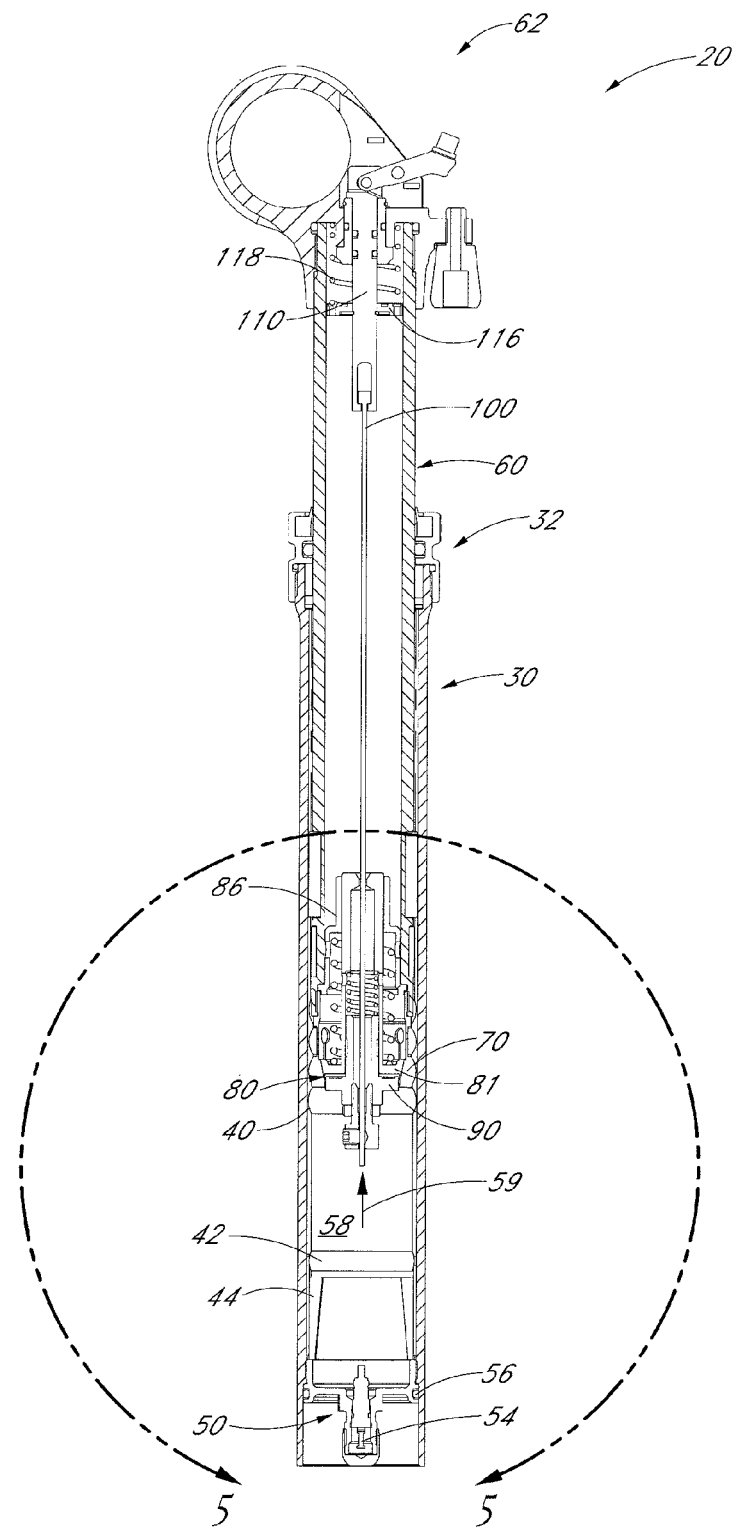
FIG. 4 illustrates a cross-sectional view of the adjustable saddle post assembly of FIG. 2.
Figure 5:
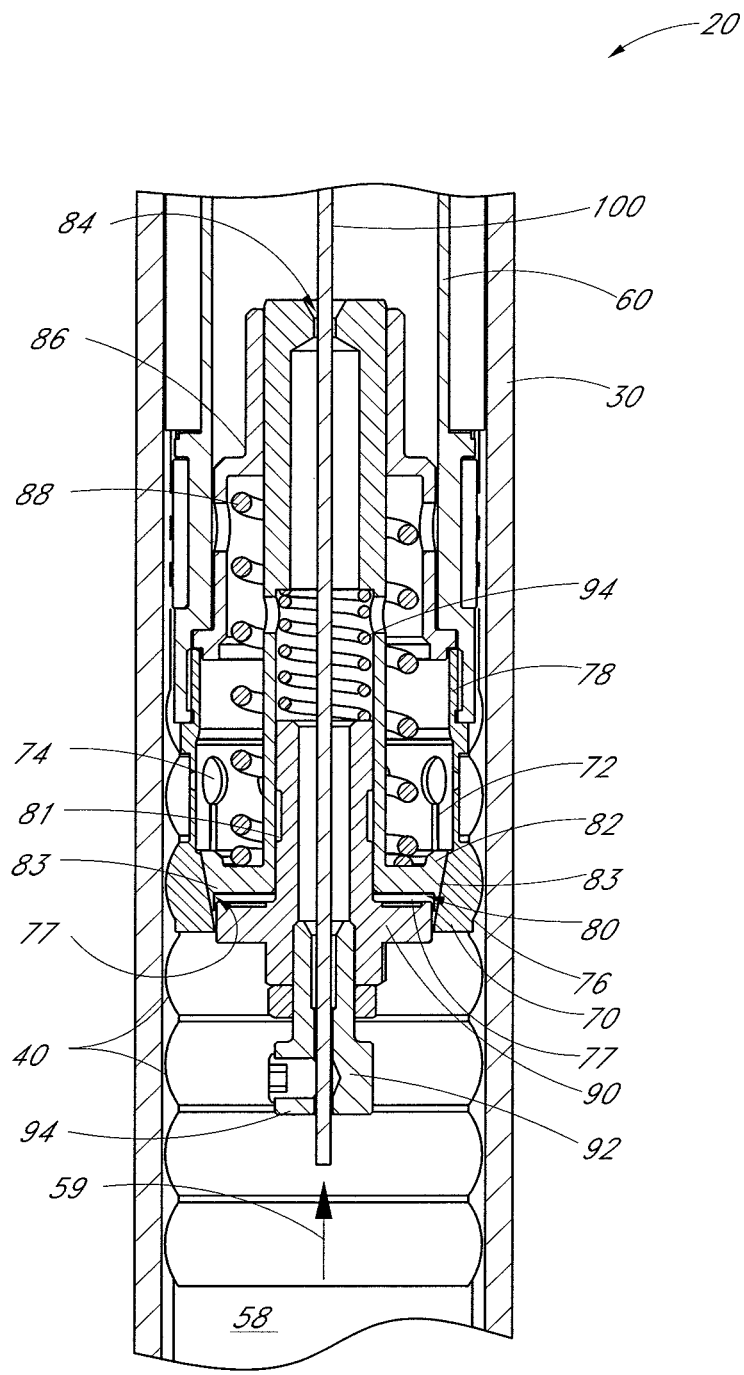
FIG. 5 illustrates a detailed cross-sectional view of the adjustable saddle post of FIG. 4.

With reference to the cross-sectional views illustrated in FIGS. 4 and 5, the outer support 30 can comprise a plurality of circumferential grooves 40, recesses or other features along its interior surface. As discussed in greater detail herein, the grooves 40 along the interior of the outer support 30 are preferably sized, shaped and otherwise adapted to be engaged by a collet or other expansion portion of the inner support 60. In the depicted arrangement, the outer support 30 includes a total of eight grooves 40 that are situated immediately adjacent to each other. In addition, each of the illustrated grooves 40 can include an identical or substantially identical curved shape. However, in other embodiments, the quantity, size, shape, spacing, location and/or other details of the grooves 40 can vary, as desired or required by a particular application or use. For example, the radius of curvature of the grooves 40 can be greater or less than illustrated herein. In addition, the grooves 40 can extend along a greater or lesser portion of the interior of the outer support 30.

The outer support 30, the inner support 60 and/or any other portion of the seat post assembly 20 can comprise one or more materials, such as, for example, aluminum, titanium, steel, other metals or alloys, carbon fiber, thermoplastics and/or the like. Regardless of the exact materials or combination of materials used, the outer and inner supports 30, 60 are preferably designed to withstand the various forces, moments and other stresses to which they may be subjected. The grooves 40 along the interior of the outer support 30 and/or any other feature along the inside or outside of the outer or inner supports 30, 60 can be formed at the same time that such supports are manufactured. Alternatively, the grooves 40 or any other feature can be machined or otherwise formed subsequent to the manufacture of the supports 30, 60 using one or more forming methods.

With continued reference to FIG. 4, the lower portion of the outer support 30 can include a pad 44 or other bottom portion that prevents the inner support 60 from being lowered beyond a desired threshold location. As shown, the lower portion of the outer support 30 can also include a lower groove 42, which the collet 70 or other expansion portion of the inner support 60 can generally engage when the inner support 60 is moved to or near such lower threshold position or other lowest setting relative to the outer support 30.

As illustrated in FIG. 4, the lower portion of the outer support 30 can comprise a spring or air plug assembly 50. In some embodiments, the air plug assembly 50 is situated below the pad 44 or other portion or member which vertically restricts the further lowering of the inner support 60 within the outer support 30. The air plug assembly 50 can be configured to maintain a volume of pressurized air or other fluid within the interior of the outer support 30. For example, in the depicted arrangement, the air plug assembly 50 extends across the entire cross-sectional area of the outer support 30. One or more O-rings 56 or other sealing members can be generally positioned between the circumferential edges of the air plug assembly 50 and the interior wall of the outer support 30 to help maintain air or other fluids within the interior of the outer support 30. Further, a seal head portion 32 can also help maintain a desired air spring.

With continued reference to FIG. 4, the air plug assembly 50 can include a Schrader valve 54 or other air regulating device. The Schrader valve 54 or other type of valve can be configured to permit a user to inject air or other fluids within the cavity 58 in the outer support formed above the air plug assembly 50. As discussed in greater detail herein, the cavity 58 can be pressured using air or other fluids in order to create an air spring that effectively exerts a force on the inner support 60 (e.g., the portions of the inner support 60 that are immediately adjacent to the cavity 58). In the illustrated embodiment, the Schrader valve is accessible from the bottom, open end of the outer support 30. However, in other arrangements, the Schrader valve or any other type of valve can be positioned along a different part of the seat post assembly 20. Further, a coiled spring, a different type of resilient member or another type of device or method can be used to exert a force on the inner support 60, either in lieu of or in addition to an air spring.

As illustrated in FIG. 4, the adjustable seat post assembly 20 can comprise an inner support 60 that is slidably positioned relative to the outer support 30. In some embodiments, as illustrated herein, the outer and inner supports 30, 60 comprise generally hollow, cylindrical tube shapes. However, in other arrangements, the shape, size, thickness and/or other details of the support 30, 60 can vary, as desired or required. In the depicted arrangement, the inner support is configured to be placed within the top end of the outer support 30. However, as discussed herein, the seat post assembly 20 can be differently configured so that the positions of the inner support 60 and the outer support 30 can be reversed (e.g., the inner support can be placed within a bottom end outer support).

With continued reference to FIGS. 4 and 5, the inner support 60 can include a collet or other expansion portion 70 along its lower end. The expansion portion 70 can comprise a slotted collet, another type of resilient member or other non-resilient expandable member. In the depicted embodiment, the expansion portion 70 is a separate member that is secured to the inner support 60. The expansion portion 70 and the adjacent surfaces of the inner support 60 can be machined to include one or more features (e.g., grooves, other recesses, protrusions, etc.) that can be used to mechanically engage each other. Alternatively, the expansion portion 70 and the inner support 60 can be connected using one or more other attachment devices or methods, such as, for example, tabs, screws, welds, rivets, fasteners, flanges, adhesives, friction-fit connections and/or the like. In other arrangements, the inner support 60 is integrally formed with the expansion portion 70. In FIGS. 4 and 5, the collet 70 is generally secured at the end of the inner support 60. However, the collet 70 or other expansion portion can be positioned along any other location of the inner support 60.

Figure 7A:
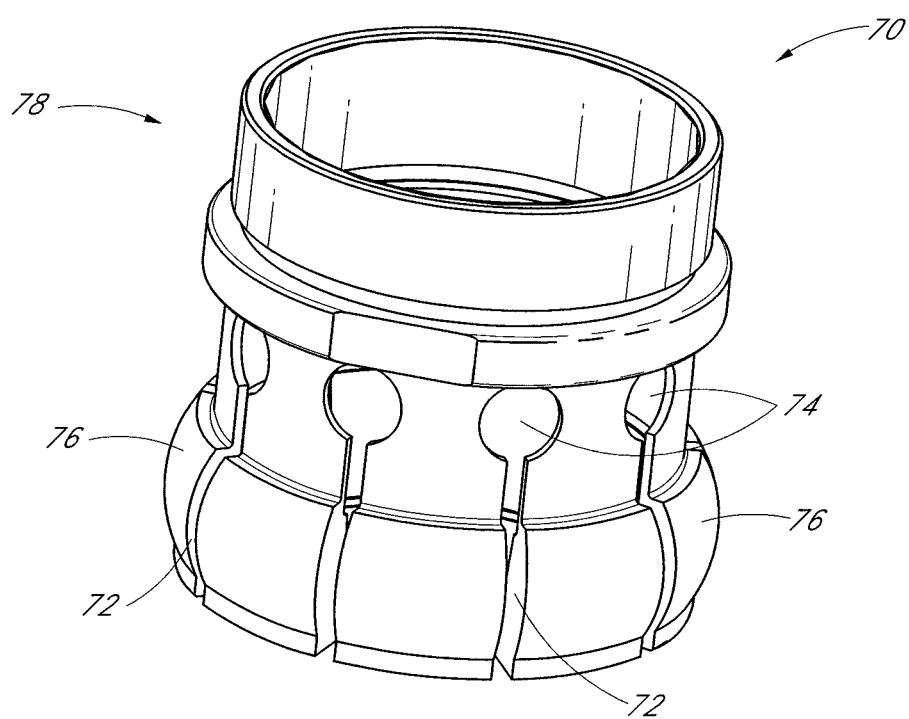
FIG. 7A illustrates a perspective view of a collet configured for use in an adjustable saddle post assembly as disclosed herein according to one embodiment.
Figure 7B:
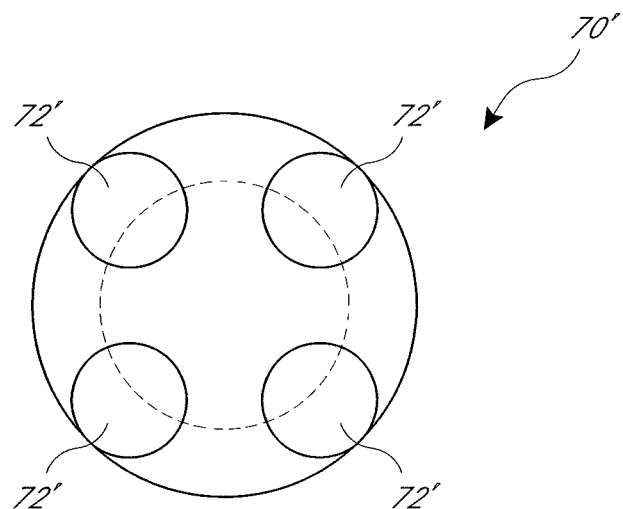
FIGS. 7B and 7C illustrate different views of an expansion portion comprising a plurality of balls according to one embodiment.

FIG. 7 illustrates a perspective view of one embodiment of a collet 70 adapted to be attached to the inner support 60 of the seat post assembly 20. As shown, the collet 70 can include one or more slots 72 and/or other features that permit it to resiliently contract inwardly. In the depicted arrangement, each of the slots 72 is vertically oriented and terminates at a circular opening 74 located along the collet body. The slots 72 desirably divide the collet 70 into a series of collet sections or arms 75.

Figure 6:
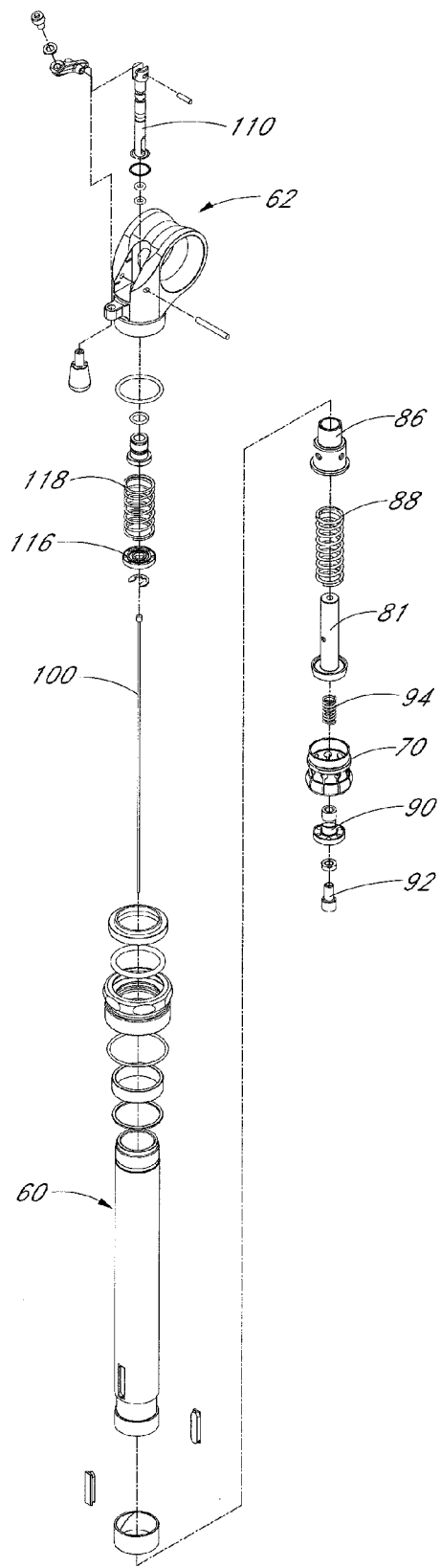
FIG. 6 illustrates an exploded perspective view of the inner support of the adjustable saddle post assembly of FIGS. 2-5.

With continued reference to FIGS. 4-6, the collet 70 can include a projecting portion 76 that is configured to engage one of the grooves 40 positioned along the interior wall of the outer support 30. However, one or more other areas of the collet 70 or other expansion portion of the inner support 60 can be adapted to engage a groove 40 of the outer support 30. In other embodiments, the collet 70 or other expansion portion is configured to engage an interior of the outer support 30 along an area that does not include any grooves 40 or other distinguishing features (e.g., a generally smooth surface of the internal surface of the outer support 30). In yet other embodiments, as discussed herein with reference to FIGS. 13A and 13B, a collet or other expansion portion is configured to expand inwardly, thereby engaging a groove and/or other portion a center shaft that is affixed or otherwise connected to the outer support.

The quantity, size, shape, spacing and/or other details of the slots 72, openings 74, and/or arms 75 of the collet 70 can vary, as desired or required. For example, in some embodiments, the collet 70 may not include any slots or openings at all. Instead, the collet 70 can be configured so that one or more of its portions can be resiliently contracted and expanded (e.g., circumferentially). Alternatively, the slots between certain collet arms could be very wide, such that there is a large angular portion of the circumference of the collet 70 which does not have a physical structure which mates with the grooves of the outer support. Desirably, however, the arms define projecting portions which extend at least 180 degrees, at least 240 degrees, at least 270 degrees, at least 300 degrees, at least 320 degrees and preferably substantially entirely around the 360 degree circumference of the collet.

As illustrated in FIGS. 4 and 5, the projecting portion 76 of the collet 70 or other expansion portion of the inner support 60 can be shaped, sized and otherwise configured to match or substantially match the shape of the grooves 40 positioned along the interior wall of the outer support 30. Accordingly, the projecting portion 76 can generally snugly engage one of the grooves when in its circumferentially expanded state. As discussed in greater detail herein, the projecting portion 76 of the collet 70 can be selectively permitted to retract inwardly in order for the collet 70 to engage a different groove 40 or other area along the interior wall of the outer support 30. Consequently, the vertical position of the inner support 60 can be selectively varied relative to the outer support 30.

In certain arrangements, the collet 70 or other expansion portion comprises spring steel and/or another resilient material. As is discussed in greater detail herein, the use of such materials permits the collet 70 or other expansion portion to retract and expand as different portions of the contoured interior wall of the outer support 30 are engaged. In one arrangement, the collet 70 is configured to remain in an expanded position (as illustrated in FIGS. 4-6) when no forces are acting on it.

As discussed in greater detail herein, the expansion portion of the inner support can include one or more other devices or features to engage an interior wall of the outer support. In some embodiments, the expansion portion comprises one or more pawls, balls and/or other sections, portions or features that engage corresponding features or portions of the outer support. For example, such pawls, balls or other items can swing, slide, roll or otherwise move radially outwardly (e.g., from a retracted or non-expanded orientation).

The inner support 60 can include a retention assembly 80, which in some embodiments, is normally biased to at least partially fit within an interior of the collet 70 or other expansion portion (e.g., pawls, balls, over movable features, etc.). In some embodiments, as discussed in greater detail herein, the retention assembly 80 comprises a bearing portion 81 and a locking portion 90. In other arrangements, however, the retention assembly 80 can include only the bearing portion 81 or only the locking portion 90. In addition, a retention assembly 80 can include one or more other portions or members, either in addition to or in lieu of the bearing portion 81 and/or the locking portion 90. Regardless of its exact configuration, the retention assembly 80 is preferably adapted to maintain the collet 70 or other expansion portion of the inner support 60 in an expanded position so that the collet 70 or other expansion portion remains engaged to a groove 40 or other interior portion of the outer support 30. As discussed in greater detail herein, this prevents relative movement between the inner support 60 and the outer support 30, thereby maintaining the vertical position of the bicycle saddle.

As illustrated in FIG. 5, the bearing portion 81 can comprise a generally tubular upper portion and a circumferentially enlarged lower portion 82. In some arrangements, the enlarged lower portion 82 includes a tapered outer surface 83 that is sized, shaped, sloped and otherwise configured to correspond and generally mate with an adjacent tapered inner surface 77 along the projecting portion of the collet 70 when the enlarged lower portion 82 is resiliently biased thereagainst. An exploded view of one embodiment of an inner support 60 comprising a retention assembly 80 is illustrated in FIG. 6.

According to some embodiments, the inner support 60 includes one or more coil springs or other biasing members that help urge the retention assembly 80 (e.g., the bearing portion 81, the locking portion 90, etc.) toward the interior of the collet 70. For example, as shown in FIG. 5, a spring housing 86 or another similar member (e.g., plate, other abutting surface, etc.) can be used to maintain a desired biasing force against the bearing portion 81 of the retention assembly 80. As is discussed in greater detail herein, the bearing portion 81 and/or any other portion of the retention assembly 80 can be selectively moved against the biasing force of one or more springs 88 or other resilient members in order to move the enlarged lower portion 82 of the bearing portion 81 and/or any other portion of the retention assembly 80 upwardly, generally out of the interior of the projecting portion 76 of the collet 70 or other expansion portion of the inner support 60. This can advantageously permit the projecting portion 76 of the collet 70 to be retracted when a sufficiently large upwardly or downwardly force is applied to the inner support 60. Consequently, the inner support 60 can be slidably moved relative to the outer support 30. Thus, the vertical position of a saddle or other seating member attached to the inner support 60 can be selectively changed.

As discussed, the retention assembly 80 can help to maintain or "lock" the projecting portion 76 of the collet 70 in its normally expanded state to prevent relative movement between the outer and inner supports 30, 60. To further ensure that the projecting portion 76 remains expanded, the retention assembly 80 can include a locking portion 90 or other similar portion, feature or device. In the embodiment depicted in FIGS. 4 and 5, the locking portion 90 is generally positioned underneath and immediately adjacent to the bearing portion 81. As shown, the locking portion 90 can be slidably positioned with a center cavity of the bearing portion 81. In other arrangements, however, the relative position of the bearing portion 81 and the locking portion 90, the manner in which such components interact and/or other details of these components can vary, as desired or required.

Similar to the bearing portion 81, the locking portion 90 can be resiliently biased toward an interior portion of the projecting portion 76 of the collet 70 using one or more coil springs 94 or other resilient members. For example, as shown, a spring 94 can be positioned within an interior cavity portion of the bearing portion 81 so that it exerts a downwardly-directed force on the locking portion 90. In the illustrated arrangement, the locking portion 90 is configured to contact the enlarged lower portion 82 of the bearing portion 81 if it is moved sufficiently far against the urging force of the spring 94 (e.g., upwardly as depicted). Therefore, in order to move the lower portion 82 of the bearing portion 81 out of the projecting portion 76 of the collet 70, the locking portion 90 is moved (e.g., upwardly as illustrated in FIG. 5) until it contacts the enlarged lower portion 82 of the bearing portion 81. Then, the continued movement of the locking portion 90 will cause the locking portion 90 and bearing portion 81 to simultaneously move against the biasing force of one or more springs 88, 94. If the retention assembly 80 (e.g., the locking portion 90, the bearing portion 81, etc.) are moved far enough away from the interior of the projecting portion 76 of the collet 70 (or other expansion portion), the collet 70 can be allowed to retract inwardly so that the inner support 60 may be moved relative to the outer support 30.

Although in the embodiments illustrated and discussed herein the retention assembly 80 includes a bearing portion 81 and a locking portion 90, it will be appreciated that the retention assembly 80 may only have a bearing portion 81 or similar device to prevent the collet 70 or other expansion portion of the inner support 60 from retracting inwardly. Alternatively, the retention assembly 80 may only include a locking portion 90 and no bearing portion 81. However, in some embodiments, the use of an expanding portion or other portion having sloped exterior surfaces, such as, for example, the bearing portion 81, is preferred, because such a portion helps ensure that the secure mating of the collet 70 with the grooves, despite wear or manufacturing. In addition, in other arrangements, the adjustable post assembly 20 can comprise a completely different method of ensuring that the collet 70 or other expansion portion of the inner support 60 remains engaged with a groove 40 or other portion of the outer support. For example, the retention assembly 80 that is configured to maintain the collet 70 or other expansion portion of the inner support 60 can comprise a less or more complicated design. In some embodiments, the retention assembly 80 comprises only a single portion and/or component (e.g., a bearing portion 81, a locking portion, any other portion or member, etc.). In other arrangements, the retention assembly 80 includes two, three, four or more different portions and/or components.

Figure 7C:
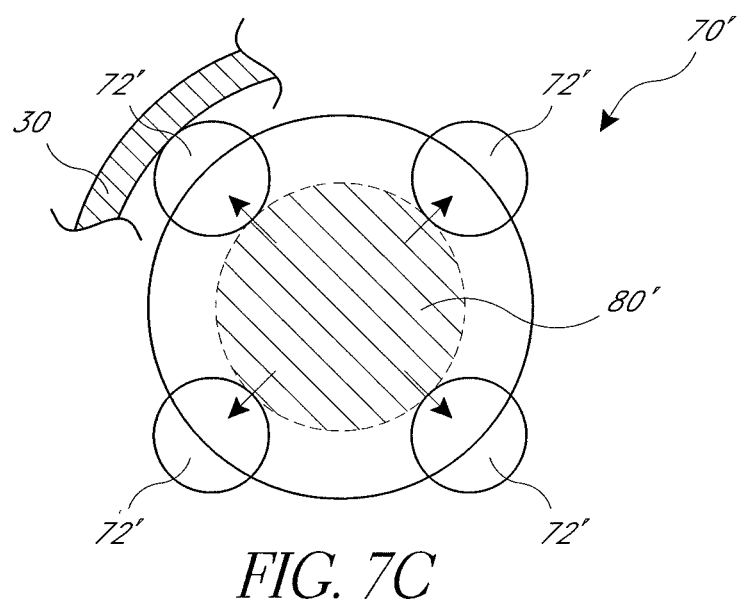

As noted above, an expansion portion can include any one of a plurality of movable members that can selectively engage an interior wall of the outer support. By way of example, with reference to the embodiment illustrated in FIGS. 7B and 7C, the expansion portion 70' can comprise one or more balls 72' that roll between a radially contracted position (FIG. 7B) and a radially expanded position (FIG. 7C). In other configurations, pawls, tabs or other items can swing, slide, roll or otherwise move between such radially contracted and expanded positions. As with the collet arrangements disclosed herein, such movable members can be configured to maintain a normally radially expanded position or other outward orientation (e.g., so that the movable members are able to contact and engage with a corresponding feature or portion of the outer support). In some embodiments, the pawls, balls or other members of an expandable or movable portion are resiliently biased in a radially expanded configuration (e.g., using one or more springs, other resilient devices, etc.). Alternatively, a desired outwardly-orientation configuration can be maintained for such components or features using one or more other devices or methods, such as, for example, sleeves, levers, cams, pins and/or the like.

The pawls, balls or other movable members that are included in an expansion portion can be locked in a radially expanded orientation using a retention assembly. The retention assembly can be similar to those discussed herein with reference to FIGS. 4-6 for the collet embodiments and enjoying certain advantages. Alternatively, however, other types of designs can be used to ensure that the movable members are safely and adequately maintained in a desired orientation (e.g., radially outward).

For example, for an expansion portion comprising one or more balls, which are adapted to roll outwardly in order to engage corresponding features along the adjacent interior wall of the outer support, a sleeve or other portion of a retention assembly can be moved within an interior portion of the expansion portion to help urge and maintain (e.g., lock) the balls along an outer periphery of the expansion portion. In some embodiments, the sleeve or other retention assembly ensures that the balls or other movable members remain in the outwardly expanded orientation as long as the position of the sleeve or other retention assembly is adequately maintained relative to the expansion portion. In FIG. 7C, for instance, a sleeve 80' or other retention member can be moved within an interior portion of the expansion portion 70' to ensure that the balls 72' are moved and retained in a radially outward orientation.

Regardless of their exact configuration, the movable components or features (e.g., pawls, balls, etc.) of an expansion portion desirably can be moved between a radially expanded and a radially contracted position to selectively adjust the vertical position of an inner support relative to an outer support. Accordingly, as discussed herein with reference to the collet embodiments, the vertical position of a seat post, a fork and/or other portion of a bicycle can be advantageously adjusted by a user.

In some embodiments, an actuation device or system can be used to move the retention assembly 80 (e.g., the bearing portion 81, the locking portion 90, etc.) and/or any other portion of the seat post assembly 20. With reference to FIGS. 4 and 5, a cable 100, rod, connector or other movable portion that extends through the interior of the inner support 60 is operatively connected to a cable lock member 92 situated below the bearing portion 81 and the locking portion 90. In the illustrated arrangement, the cable lock member 92 is secured to the adjacent locking portion 90 using one or more connection devices or methods, such as, for example, threaded fasteners, rivets, other type of fasteners, welds, pins, adhesives and/or the like. Alternatively, the cable lock member 92 can be attached to the bearing portion 81 and/or any other portion of the retention assembly 80, either in addition to or in lieu of simply being attached to the locking portion 90.

With continued reference to the cross-sectional views of FIGS. 4 and 5, the cable 100, rod, connector or other movable member can be inserted within a passage of the cable lock member 92. Further, the cable 100 can be secured to the cable lock member 92 by inserting and tightening a set screw or other fastener within one or more lateral openings 94. However, one or more alternative devices or methods may be used to secure the cable 100 to the cable lock member 92. The cable 100, rod, connector or other movable member preferably comprises one or more durable materials configured to withstand the forces and stresses to which it may be exposed during use of the adjustable seat post assembly 20. For instance, the cable 100 can comprise one or more metals (e.g., steel), thermoplastics, composites and/or the like.

In the embodiments of the adjustable seat post assembly illustrated herein, the cable 100 is configured to be routed through or near the axial center of the inner support 60. Accordingly, one or more of the components of the inner support 60 may need to be configured to accommodate the unobstructed passage of the cable therethrough. As shown, for example, the upper cylindrical portion of the retention assembly 80 (e.g., bearing portion 81, locking portion 90, etc.) can include an opening 84 through which the cable 100 is routed. In addition, the cable 100 can be routed through one or more other components of the seat post assembly 20, including, but not limited to, springs 88, 94, the spring housing 86, the collet 70 or other expansion portion and/or the like.

In FIG. 4, the cable 100, rod or other movable member is attached to a pull rod assembly 110 located at or near the upper end of the inner support 60. As discussed herein with respect to the connection between the cable 100 and the cable lock member 92, one or more devices or methods can be used to secure the cable 100 to the pull rod assembly 110. In some embodiments, a desired amount of tension can be maintained in the cable 100 situated within the seat post assembly 20. In the illustrated arrangement, such tension in the cable 100 is created by positioning a spring 118 or other resilient member between a top interior surface of the inner support 60 and a spring plate 116 that is attached to the pull rod assembly 110. In turn, the pull rod assembly 110 can be mechanically connected to another cable (not shown), rod or other member that is configured to operatively connect the pull rod assembly 110 and the cable 100 to a lever, switch, button and/or other actuation device. In some embodiments, such a lever or other actuation device is positioned at or near the handlebar area of a bicycle to permit a user to conveniently manipulate the seat post assembly. Alternatively, the pull rod assembly 110 and the cable 100 can be operatively connected to a lever or other actuation device located at a different location of the bicycle (e.g., underneath the saddle, along one or more of the frame members, etc.).

As discussed, when the cable 100 is retracted from its resting position (e.g., moved upwardly as illustrated in FIGS. 4 and 5), a retention assembly 80 (e.g., the bearing portion 80, the locking portion 90, sleeve and/or any other portions or components of the retention assembly 80) may be moved away from the interior of the projecting portion 76 of the collet 70 or other expansion portion (e.g., balls, pawls, other movable members, etc.) formed with or attached to the inner support 60. Consequently, the collet 70 or other expandable member can be permitted to retract or otherwise move (e.g., slide, roll, etc.) inwardly so that the expansion portion (e.g., the projecting portion 76 of the collet, balls, pawls, etc.) can selectively engage another groove 40 or another interior surface or portion of the inner support 60. Likewise, when the cable 100 is permitted to resiliently revert to its resting position (e.g., with the assistance of one or more springs 88, 94, 118 or other biasing members), the retention assembly 80 can move within the interior of the projecting portion of the collet 70, thereby restricting or limiting the collet's ability to retract inwardly. As discussed in greater detail herein, this can help prevent or reduce relative movement between the outer support 30 and the inner support 60.

In other embodiments, as discussed in greater detail herein, an adjustable seat post assembly can utilize one or more other devices, systems or methods to selectively move a retention assembly relative to a collet or other expansion portion. For example, instead of a movable cable or rod, a hydraulic, motor-driven or other mechanism can be used to alter the position of the retention assembly. Embodiments that incorporate such alternative designs are discussed in greater detail below with reference to FIGS. 13-19.

In use, air or other fluids may be injected into the outer support 30 through the Schrader valve 54 using a pump or some other fluid delivery device. The amount of air or other fluid that is placed within the air-tight or substantially airright chamber 58 of the outer support 30 will determine the magnitude of the air spring that tends to urge the inner support 60 generally away (e.g., upwardly, in a direction represented by arrow 59 in the illustrated embodiments) from the outer support 30. As discussed, in other arrangements, the adjustable seat post assembly 20 can include one or more springs or other biasing members to help urge the inner support 60 generally away from the outer support 30, either in lieu of or in addition to the air spring disclosed herein.

Once a desired volume of air or fluid has been injected into the chamber 58 of the outer support 30 or a desired fluid pressure has been attained therein, the seat post assembly 20 can be secured to the frame 14 and saddle 16 of the bicycle 10 (FIG. 1). In one embodiment, the outer support 30 can be inserted into a hollow member of the bicycle frame 14 which is sized, shaped and otherwise configured to receive the outer support 30. In such arrangements, the outer support 30 or other portion of the seat post assembly 20 can be secured to the frame 14 using a clamping device (not shown), fasteners and/or any other device or method. Alternatively, the outer support 30 can even be a part of the bicycle frame 14 structure itself.

Further, a saddle 16 can be secured to the saddle head 62 of the inner support 60. As illustrated in FIGS. 2 and 4, the saddle head 62 can be configured to receive a standard or non-standard saddle. In some embodiments, the bicycle additionally comprises an exterior cable or other member that operatively connects a lever or other actuation device to the cable 100 situated within the inner support 60. As discussed, such a lever or other actuation device can be conveniently placed on or near the handlebar area of the bicycle. Alternatively, the lever or other actuation device can be placed underneath or near the saddle or along any other portion of the bicycle.

The adjustable seat post assembly 20 advantageously permits a user to change the vertical position of the bicycle saddle, even while the bicycle is being ridden. As discussed with reference to the various embodiments disclosed herein, this can be accomplished by slidably moving the inner support 60 relative to the outer support 30 of the adjustable seat post assembly 20. Additional details of one embodiment of how the supports 30, 60 are permitted to slidably move relative to each other are provided herein in relation to FIGS. 8A-8C.

Figure 8A:
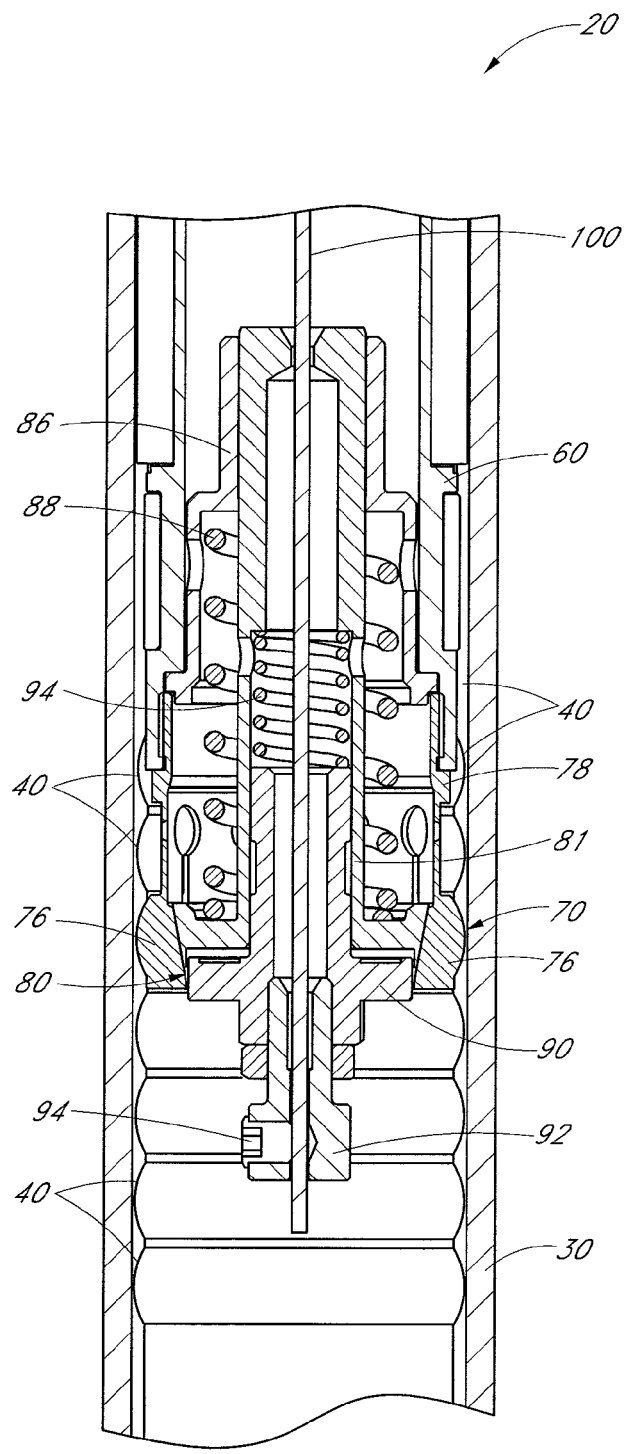
FIGS. 8A-8C illustrate different cross-sectional views of the adjustable saddle post assembly of FIG. 4 with the position of a retention assembly relative to a collet or other expansion portion being selectively modified.

With particular reference to FIG. 8A, an adjustable seat post assembly 20 can comprise an inner support 60 having a collet 70 or other expansion portion that is configured to engage a groove 40 or another portion of the interior wall of the outer support 30 when the collet 70 is in an expanded position. As discussed, the collet 70 or other expansion portion of the inner support 60 can comprise spring metal and/or one or more other resilient materials in order to allow the collet 70 to expand and retract as desired. Further, the collet 70 or other expansion portion can include one or more slots 72, openings 74 and/or other features to further enhance its resilient properties. In one embodiment, the collet 70 is configured to remain in an expanded position when no or substantially no forces are acting on it. Thus, as illustrated in FIG. 8A, the projecting portion 76 of the collet 70 or other expansion portion can normally engage a groove 40 or another surface of the interior wall of the outer support 30. As discussed in greater detail herein, in alternative embodiments, the expansion portion includes one or more other members (e.g., ball, pawls, etc.) that are configured to move radially outwardly to engage the interior wall of the outer support, in lieu of a collet or similar expandable device.

As discussed in greater detail herein, retraction (e.g., inward contraction, sliding or other movement) of the collet 70 or other expansion portion can be prevented or limited when a retention assembly 80 (e.g., sleeve, spring or other biasing member, etc.) is positioned within an interior portion of the projecting portion 76 of the collet 70. In some embodiments, the retention assembly 80 comprises a bearing portion 81. In other arrangements, the retention assembly 80 of the seat post assembly 20 can additionally include a locking portion 90 or any other device that can further ensure that the collet 70 or other expansion portion is substantially locked or otherwise remains in an expanded state. Thus, the collet 70 is generally not permitted to retract inwardly and remains engaged to the groove 40 or other interior surface of the outer support 30. Accordingly, the inner support 60 is not permitted no slidably move relative to the outer support 30.

According to some embodiments, in order to vary the vertical position of the bicycle saddle, a rider can manipulate a lever or other actuation device (not shown) that is operatively connected to the cable 100, rod, connector or other movable member of the seat post assembly 20. In other embodiments, as discussed below, a user can operate one or more buttons, dials or other controllers to permit the seat post assembly to move to a desired vertical orientation. For example, such controllers can communicate with the seat post or other movable assembly via one or more mechanical, pneumatic, electronic and/or connections. In some embodiments, the controllers communicate with one or more components (e.g., servomotor, other type of motor, etc.) of the movable assembly using a hardwired or wireless communications connection.

Figure 8B:
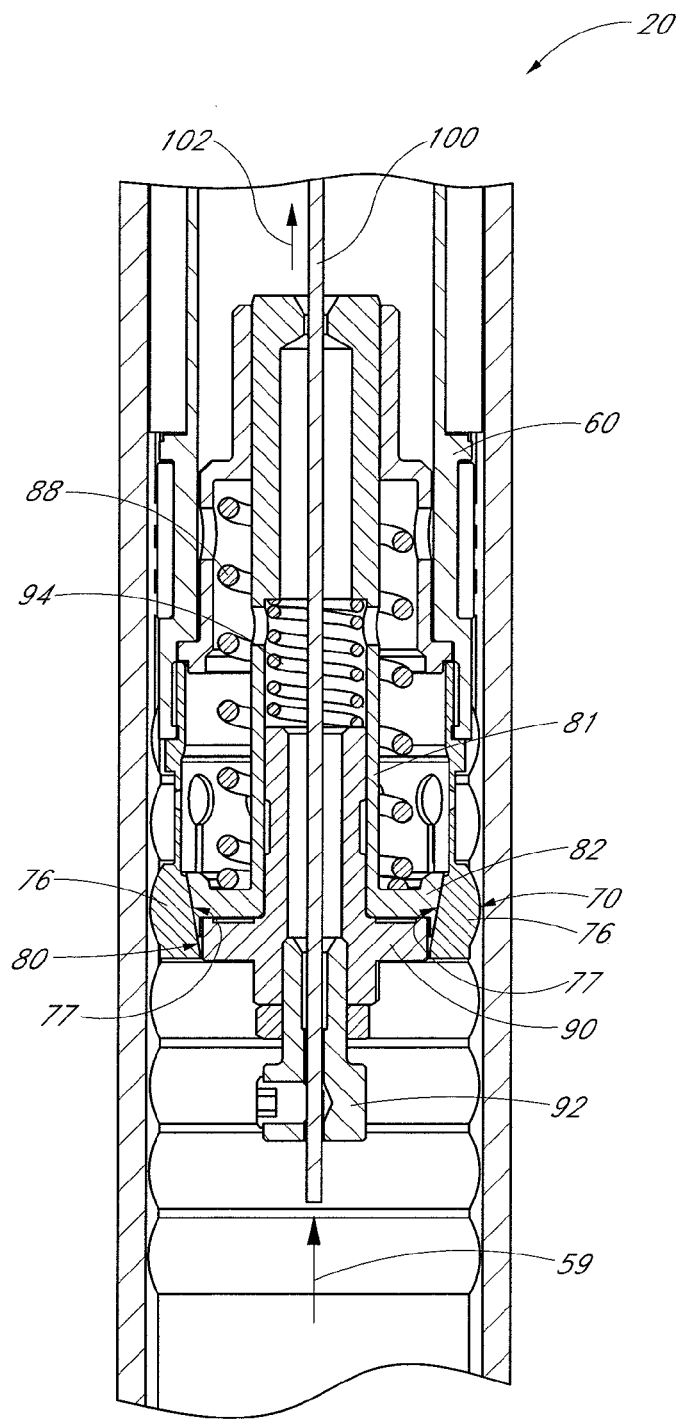
Figure 8C:
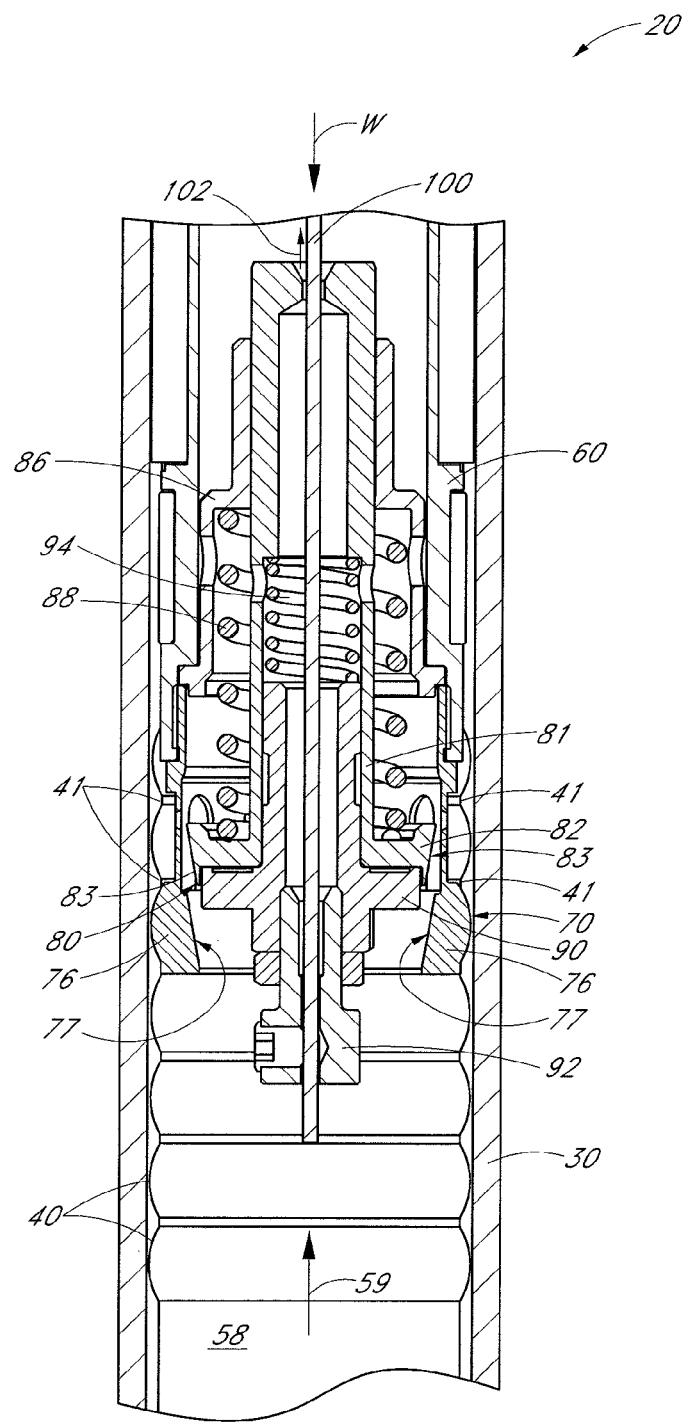

With continued reference to the embodiment illustrated in FIGS. 8A-8C, movement of the cable 100 in the general direction represented by arrow 102 can cause the locking portion 90 of the retention assembly 80 to move upwardly toward the bearing portion 81. As discussed, the retention assembly 80 need not include both the bearing portion and the locking portion 90. In addition, as noted above, a retention assembly can include a different design and general configuration than illustrated in FIGS. 8A-8C. In the cross-sectional view of FIG. 8B, the cable 100 has been moved sufficiently far along direction 102 so that the locking portion 90 contacts the lower surface of the bearing portion 81. The adjacent surfaces of the locking portion 90 and the bearing portion 81 can be sized, shaped and otherwise configured to generally accommodate each other when in mating contact. Thus, as illustrated in FIG. 8B, movement of the cable 100 can help move the locking portion 90 away from the inner surfaces 77 of the collet's projecting portion 76.

FIG. 8C illustrates the seat post assembly 20 of FIGS. 8A and 8B, with the entire retention assembly 80 (e.g., the locking portion 90, the bearing portion 81, etc.) having been moved upwardly, partially away from the interior of the projecting portion 76 of the collet 70 or other expansion portion. In some embodiments, the retention assembly 80 is moved in such a manner by the continued movement of the cable 100, rod or other movable member (e.g., in a direction generally represented by arrow 102). In the depicted arrangement, the retention assembly 80 has been moved far enough away from the interior of the projecting portion 76 such that the collet 70 or other expansion portion can be allowed to retract inwardly. In some embodiments, the position of the retention assembly 80 relative to the collet 70 can be maintained as long as the lever or other actuation device is being manipulated (e.g., depressed, pulled, etc.). Accordingly, the release of the lever or other actuation device can permit the cable 100 to be resiliently biased toward its original position, such that the locking portion 90, the bearing portion 81 and/or any other portion or component of the retention assembly 80 come to rest within the projecting portion 76 of the collet 70 (as shown in FIG. 8A). As discussed, this can once again prevent the collet 70 or other expansion portion from retracting inwardly, effectively locking the inner support 60 relative to the outer support 30.

With the retention assembly 80 having been moved away from the interior of the projecting portion 76, as illustrated, for example, in FIG. 8C, the collet 70 or other expansion portion can retract to allow the inner support 60 to move relative to the outer support 30.

In one embodiment, the fluid pressure within the chamber 58 of the outer support 30 can be configured to exert a force against the inner support 60 (e.g., in a direction generally represented in FIG. 8C by arrow 59). Accordingly, if the pressure within the chamber 58 is sufficiently high and the collet 70 or other expansion portion is permitted to retract inwardly, the inner support 60 can be moved upwardly relative to the outer support 30. As discussed, a coil spring or any other biasing device or method can be used to generate a force on the inner support 60 relative to the outer support 30, either in lieu of or in addition to the air spring disclosed herein.

Regardless of the exact manner in which a resilient force on the inner support 60 is created, a user can selectively raise the vertical position of the saddle by eliminating or reducing any downwardly directed forces on the saddle (e.g., shifting his or her weight from the saddle to the pedals) and causing the cable 100, rod, connector or other movable member to move in a direction generally represented by arrow 102 in FIG. 8C (e.g., by moving a lever or other actuation device). As discussed, such a movement of the cable 100 can permit the collet 70 or other expansion portion (e.g., balls, pawls, other outwardly slidable or movable member, etc.) of the inner support 60 to be retracted inwardly. If the force created by the air spring or other resilient member is sufficiently high, the collet 70 or other expansion portion will move (e.g., upwardly in the embodiment illustrated in FIGS. 8A-8C) relative to the outer support 30.

In arrangements where the collet 70 is configured to engage one of a plurality of grooves 40 or other features positioned along the interior surface of the outer support 30, the collet 70 or other expansion portion (e.g., balls, pawls, etc.) may retract inwardly in order to move past the ridges 41 or other features that separate adjacent grooves 40. As the collet 70 or other expansion portion is moved upwardly, it will engage a different groove or other interior portion of the outer support 30. The rate at which the collet 70 or other expansion portion is moved relative to the outer support 30 can be varied depending on the magnitude of the force created by an air spring or other resilient member, the magnitude of any countering force exerted on the inner support 60 (e.g., weight of the inner support 30, saddle and the like, the weight or other downwardly directed force exerted on the saddle by a rider, etc.), the frictional forces between adjacent surfaces of the collet 70 and the grooves 40 or other interior area of the outer support 30, the rate at which the collet 70 or other expansion portion flexes (e.g., retracts and expands) and/or the like.

In some arrangements, the collet 70 or other expansion portion (e.g., balls, pawls, etc.), as well as the inner support 30 and the saddle to which the collet 70 is attached, will continue to be raised to engage increasingly higher grooves or other interior locations of the outer support 30. Once a desired vertical position has been achieved, the user can allow the cable 100 to return to its original position (e.g., by releasing the lever or otherwise manipulating another actuation device). For example, in one embodiment, releasing a lever causes a spring 118 or other biasing member (FIG. 4) to move the pull rod assembly 110 downwardly. Consequently, the cable 100 that is operatively connected to the pull rod assembly 110 will also move downwardly. This can allow the retention assembly 80 (e.g., the bearing portion 81, the locking portion 90, etc.) to once again engage an interior portion of the projecting portion 76 of the collet 70 or other expansion portion of the inner support 60, as illustrated in FIG. 8A. This can prevent the collet 70 from being retracted inwardly, effectively causing it to remain within the particular groove 40 to which it is engaged.

According to some embodiments, in order to lower the vertical position of the saddle, a user can manipulate a lever or another actuator so that the cable 100, rod or other movable member moves in a direction generally represented by arrow 102, as discussed above with reference to FIGS. 8B and 8C. Consequently, the retention assembly 80 can move away from the interior of the projecting portion 76 of the collet 70 or other expansion portion attached to or integrally formed with the inner support 60. Thus, the collet 70 or other expansion portion can be permitted to retract inwardly so it can be selectively moved to a lower groove 40 or other interior portion of the outer support 30.

For example, in some arrangements, once the bearing portion 81, the locking portion 90 and/or any other portion or component of the retention assembly 80 have been moved far enough away from the interior of the projecting portion 76 of the collet 70, the user can shift his or her weight (generally represented by arrow W in FIG. 8C) to the saddle or otherwise apply a downwardly directed force on the inner support 60. As discussed herein with respect to raising the vertical position of the saddle, the collet 70 or other expansion portion can retract inwardly so that the projecting portion is able to move over the ridges 41 or other portions situated between adjacent grooves 40 along the interior wall of the outer support 30. Accordingly, the collet 70 or other expansion portion can engage a lower groove 40 or other portion of the outer support 30, effectively lowering the vertical position of the saddle which is attached to the inner support 60. When a desired vertical location has been achieved, the user may release the lever or other actuation device to effectively prevent further movement of the inner support 60 relative to the inner support 30.

In the examples of changing the vertical position of the saddle provided herein, there are various forces and other factors that can help determine in what direction (and at what rate) the inner support 60 will move relative to the outer support 30. As discussed, some of these may include the upwardly-directed force created by the air spring or other biasing member, the weight W or other downwardly-directed force applied to the saddle (and thus, the inner support 60) by a user, the weight of the inner support 60, saddle and/or other components of the seat post assembly 20, the frictional forces between adjacent surfaces that are intended to move relative to each other (e.g., the outer surface of the collet 70 and the interior surfaces of the outer support 30), the resilient characteristics of the collet 70 or other expansion portion and/or the like. It will be appreciated, that the adjustable seat post assembly can be modified so that one or more other forces or factors can affect the movement of the inner support 60 relative to the outer support 30, either in lieu of or in addition to those discussed herein.

Embodiments of the adjustable seat post assembly 20 that comprise a plurality of grooves 40 or other engaging recesses or features along the interior of the outer support 30 can provide additional advantages. For example, as the collet 70 or other expansion portion of the inner support 30 is moved relative to the outer support 30, the collet 70 can engage one of a number of grooves 40 or other stations. The movement of the collet 70 or other expansion portion between distinct higher or lower grooves 40 or stations can permit a user to more accurately assess the current vertical position of the saddle and to more precisely select a desired vertical setting for the saddle.

In some arrangements, the movement of the collet 70 or other expansion portion relative to the grooves 40 or stations generates a snap fit or other positive engagement. Thus, the movement of the collet 70 between adjacent (e.g., higher or lower) grooves 40 or stations can be felt or otherwise sensed by the user. For example, the seat post assembly 20 can be configured so that such movement between the outer and inner supports 30, 60 creates a tactile response that can be perceived by the user. In other embodiments, the movement of the collet 70 or other expansion portion between distinct grooves 40 or stations can create an audible response (e.g., click or snap sound) that may be perceived by the user, either in lieu of or in addition to any tactile response.

Accordingly, in such embodiments where a collet 70 or other expansion portion of the inner support 60 is configured to move between and engage distinct grooves 40 or stations of the outer support 30, a user may find it easier to choose a desired vertical position for the bicycle saddle. By way of example, a user may determine that a desired vertical change in saddle position between a particular uphill slope and a particular downhill slope requires the collet to be lowered by one, two, three, four or more groove locations. Consequently, the inclusion of tactile and/or audible response features in the seat post assembly 20 can be beneficial to a rider.

Further, as discussed, the expansion portion 70 of the inner support 60 can comprise a different design or configuration than discussed and illustrated herein. In some embodiments, the expansion portion 70 comprises a balloon or other inflatable portion that is configured to be selectively inflated or deflated in order to engage or disengage the interior wall of the outer support 30. In the embodiments disclosed herein, the inner support 60 or other member that comprises a collet 70 or other expansion portion is configured to be attached to the bicycle saddle. Further, the outer support 30 is configured to be attached to the bicycle frame. However, in other embodiments, the configuration of the adjustable seat post assembly can be modified so that the inner support 60 can be attached to the frame and the outer support 30 can be attached to the saddle. In such an arrangement, the seat post assembly can be effectively reversed so that the inner support 60 is generally below the outer support 30. It will be appreciated that the seat post assembly can be modified to include one or more other features or characteristics, either in lieu of or in addition to those illustrated and discussed herein.

As discussed, the seat post assembly 20 can be operatively connected to a lever or other actuation device to permit a user to control the function of the system. In some embodiments, such a lever or other actuation device is located at or near the handlebar area of the bicycle. This can allow a user to conveniently and safely modify the vertical location of the saddle even when the bicycle is being ridden. Alternatively, the lever or other actuation device can be positioned near the seat post assembly (e.g., at or near the bottom of the saddle) or at any other location of the bicycle. Regardless of the exact position of the lever or other actuation device, the seat post assembly can be adjusted before a user begins riding the bicycle or after he or she has begun doing so.

In some arrangements, the adjustable seat post assembly 20 is permanently affixed to a bicycle frame (e.g., the outer support or the inner support is permanently attached to the frame or is incorporated into the frame). Alternatively, the seat post assembly 20 can be configured to be selectively removed and/or replaced to the bicycle frame, as desired or required. In addition, adjustable seat post assemblies, such as those disclosed herein or equivalents thereof can be used on any type of bicycle, including, mountain bikes, road bikes and/or the like.

Figure 9A:
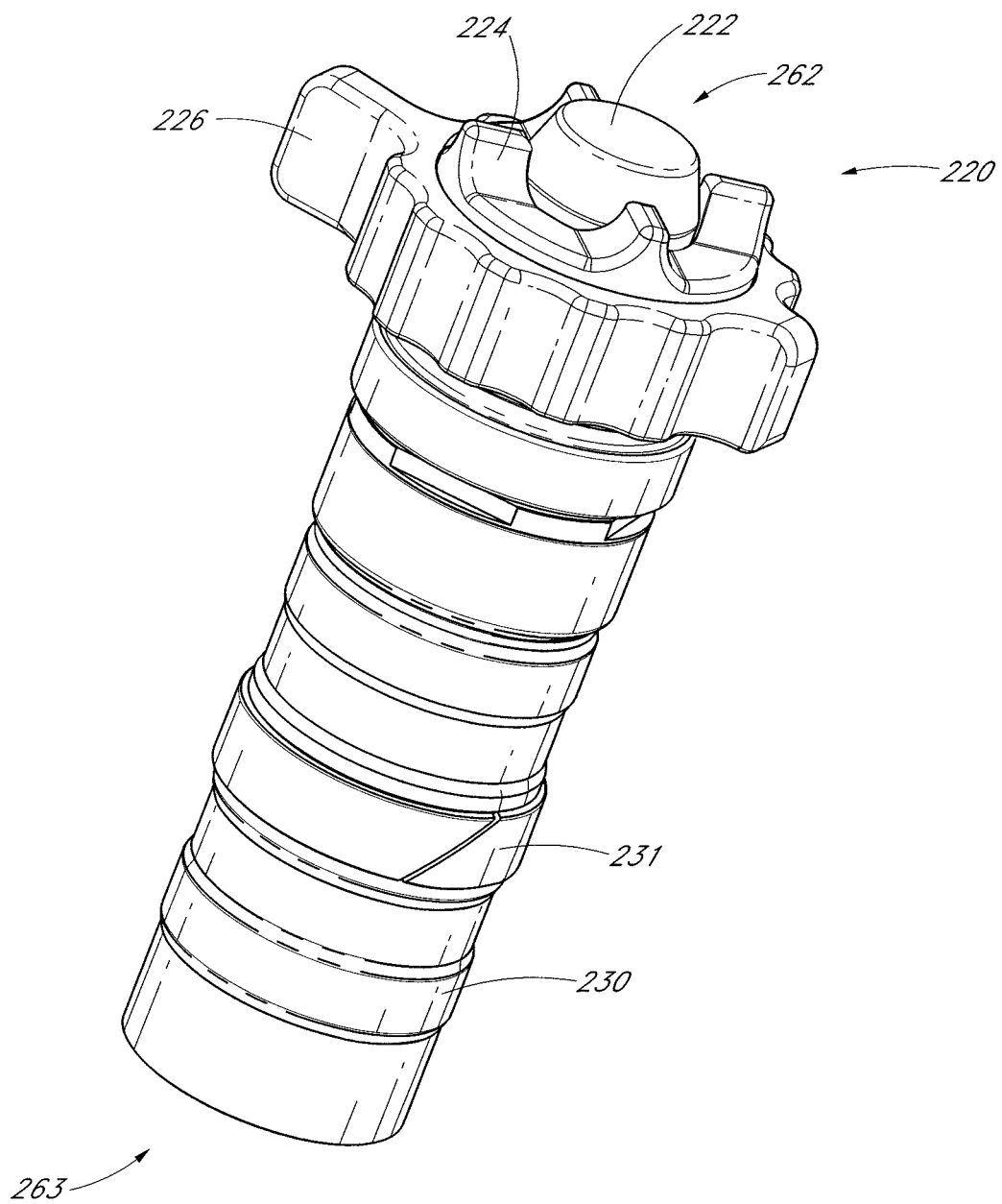
FIG. 9A illustrates a perspective view of an adjustable assembly in a retracted position configured for use in the fork of a bicycle according to one embodiment.
Figure 9B:
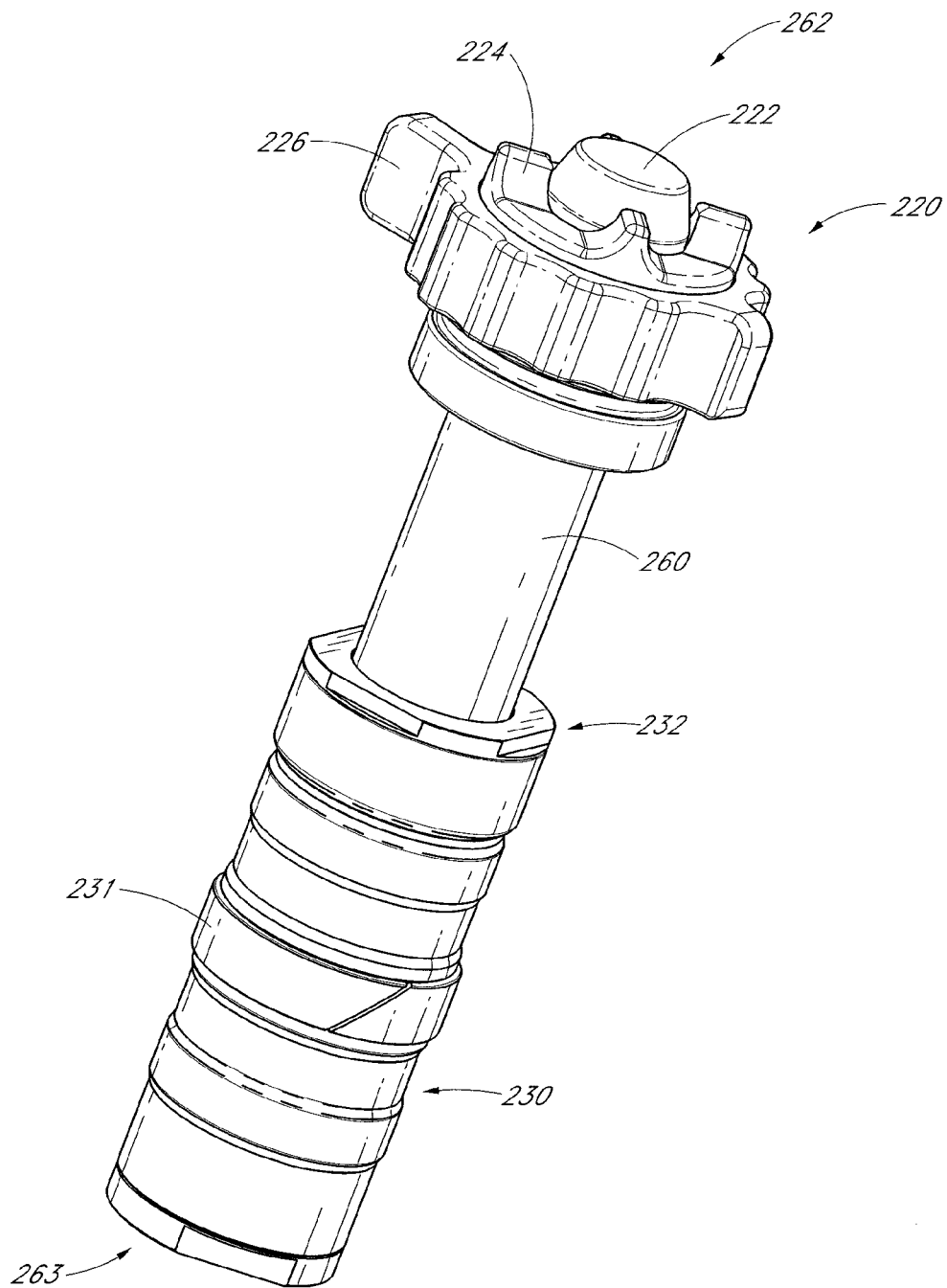
FIG. 9B illustrates the adjustable assembly of FIG. 9A in an expanded position.
Figure 9C:
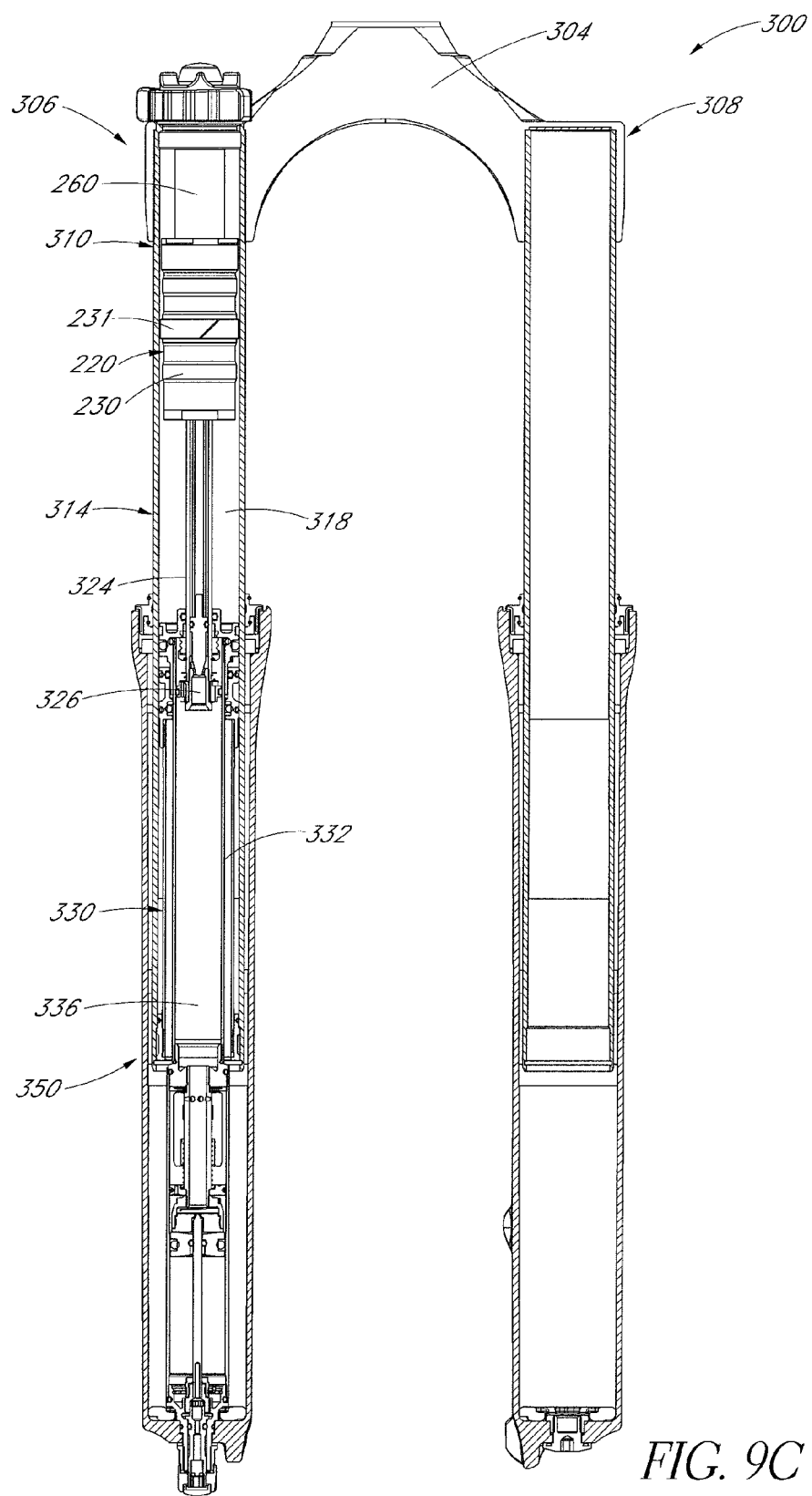
FIG. 9C illustrates the adjustable assembly of FIGS. 9A and 9B positioned within a leg of bicycle fork assembly according to one embodiment.

FIGS. 9A and 9B illustrate an embodiment of a vertically-adjustable assembly 220 configured for use in a fork assembly of a bicycle. One arrangement of a bicycle fork 300 that is configured to receive such an adjustable assembly 220 is illustrated in FIG. 9C. As shown in FIGS. 9A and 9B, the vertically-adjustable assembly 220 can include an upper portion 262 and a lower portion 263.

As shown in FIG. 9C, the adjustable assembly 220 can be positioned within the upper fork leg 310 of a bicycle fork 300. As discussed in greater detail herein, the assembly 220 can advantageously permit the overall length of the fork to be selectively modified as desired by a user. For example, when a rider is climbing an incline, he or she may choose to shorten the length of the fork in order to reduce the likelihood that the front of the bike will raise up into "a wheelie" position or flip over backwards due to pedal forces. Likewise, when a rider is descending down a hill, he or she may choose to increase the length of the fork in order to shift weight away from the front of the bicycle. This can help reduce the likelihood that the bicycle will flip over forwards due to the center of gravity of the rider on descent.

With continued reference to FIG. 9C, the adjustable assembly 220 is positioned along the upper fork leg 310 of the bicycle fork 300. However, in other arrangements, the assembly 220 can be attached of the lower fork leg 350 or any other portion of the bicycle fork assembly. Further, in FIG. 9C, the adjustable assembly 220 is positioned only within one of the fork legs 306. However, in other arrangements, an adjustable assembly 220 can be positioned only within the other fork leg 308 or both fork legs 306, 308.

As discussed, such an adjustable assembly 220 can be modified to be used in one or more other portions of the bicycle to selectively modify the vertical, horizontal or other position of one or more components or portions of the bicycle. For example, an adjustable assembly can be positioned within the head tube of the bicycle to modify the vertical position of the handlebar assembly. In addition, discussed herein, the vertically-adjustable assembly 220 can be differently configured to attach to one or more other portions of a bicycle, such as, for example, a seat post assembly.

FIG. 9B illustrates the assembly 220 of FIG. 9A in an extended position. As discussed in reference to the embodiments illustrated in FIGS. 2-8C above, the assembly 200 can include two supports 230, 260 that are configured to slidably move relative to each other. As a result, such relative movement can modify the vertical position of one or more components or systems to which the vertically-adjustable assembly 220 is mechanically connected. For example, the relative movement of the supports 230, 260 can allow a user to selectively change the effective length of the legs 306, 308 of the fork assembly 300. In some embodiments, the assembly 220 includes a seal head 232 that helps form a relatively tight seal between the two supports 230, 260.

According to some arrangements, as illustrated in FIG. 9C, the vertically-adjustable assembly 220 can be positioned with the upper fork leg 310 of the bicycle fork 300. Thus, as shown, the outer support 230 of the assembly 220 may be sized, shaped and otherwise configured to fit within upper fork leg 310. As discussed in greater detail herein, in some embodiments, the adjustable assembly 220 is configured to freely slide within the upper fork leg 310 or any other support or member into which it is positioned. Accordingly, one or more slide rings 231 or other members configured to facilitate such movements can be positioned along the outside of the adjustable assembly 220.

Vertically-adjustable assemblies 220 such as those discussed and/or illustrated herein, can be included as an original component (e.g., fork assembly, seat post assembly, etc.) of a bicycle. Alternatively, they could be after-market items that replace one or more original bicycle components.

The structural differences between the adjustable assembly of FIGS. 9A and 9B and the embodiment of FIGS. 2-8C are discussed below. With reference to the cross-sectional view of FIG. 10, the interior wall of the outer support 230 includes a plurality of grooves 240. As discussed in greater detail herein with reference to other embodiments, these grooves 240 can be sized, shaped and otherwise configured to engage an outer surface of a collet 270 or other expansion portion of the inner support 230. Accordingly, the relative position of the inner and outer supports 260, 230 can be selectively fixed at certain distinct locations. In the embodiment illustrated in FIG. 10, the outer support 230 includes a total of three grooves 240 along its interior wall. In one embodiment, the distance separating the upper most and lower most grooves is approximately 33 mm (~1.3 inches). However, it will be appreciated, that an outer support 230 can include more or fewer grooves 240 and/or the distance separating the grooves can be greater or smaller than approximately 33 mm, as desired or required for a particular application or use.

Figure 10:
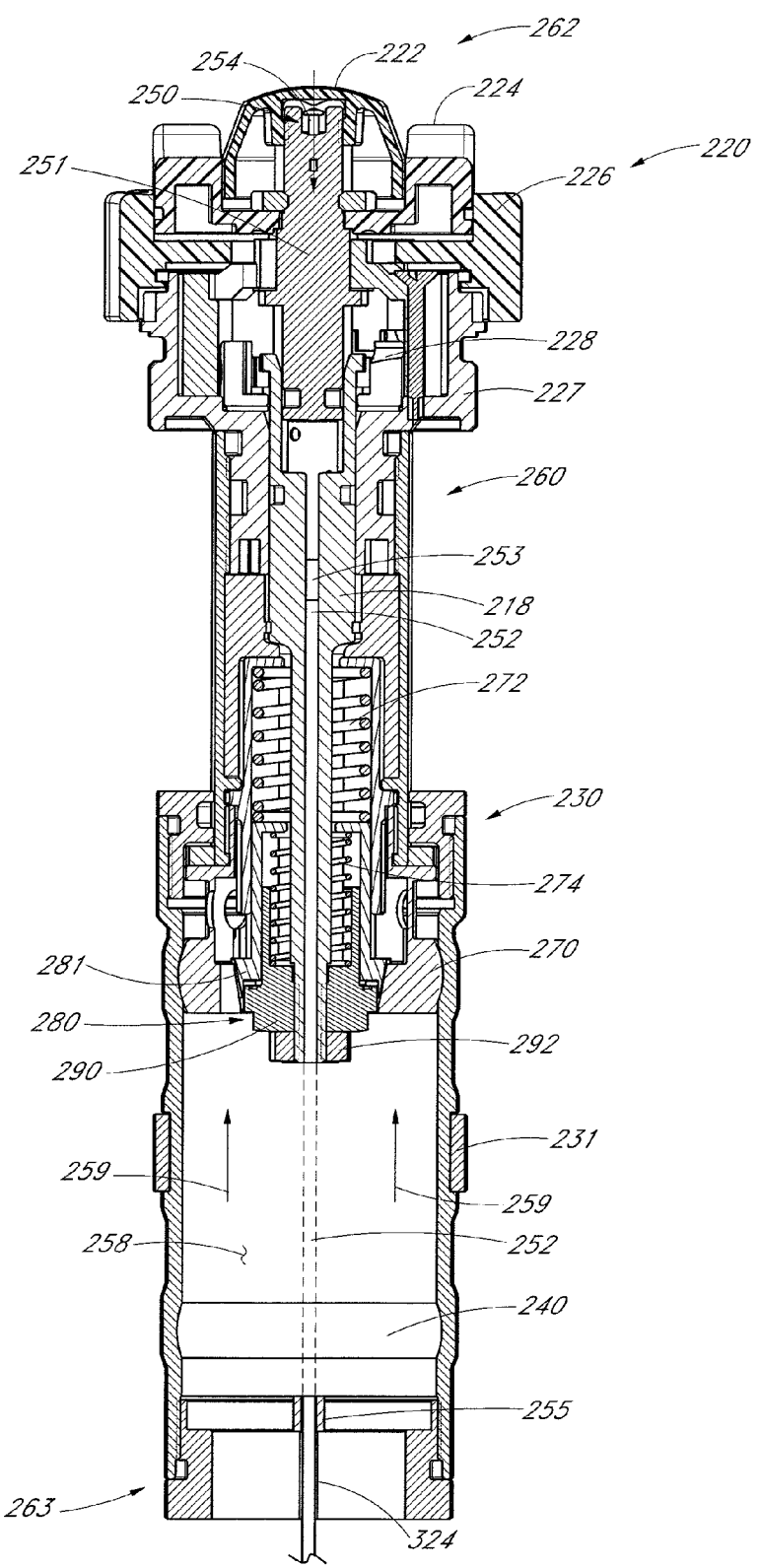
FIG. 10 illustrates a cross-sectional view of the adjustable assembly of FIGS. 9A and 9B.

With continued reference to FIG. 10, an interior space of the outer support 230 can comprise a chamber 258 or other cavity, which may be selectively pressurized to create an upwardly force (e.g., generally represented by arrows 259 in FIG. 10). As discussed, such an upwardly force can help urge the inner support 260 upwardly, generally away from the lower portion 263 of the assembly 220. This effectively extends the vertical length of the assembly 220, thereby allowing the vertical position of one or more components (e.g., piston rod 324, etc.) to be modified.

In the embodiment depicted in FIG. 10, air or other fluid can be injected into the chamber 258 of the outer support 230 through an air plug assembly 250 located near the upper portion 262 of the assembly 220. As shown, the air plug assembly 250 can comprise a Schrader valve 254 or another type of valve that permits air or other fluids to be delivered to the chamber 258 through an upper tube assembly 251 and a lower tube assembly 218. It will be appreciated that other methods or devices can be used to help provide a pressurized chamber 258 within the outer support 230. In other arrangements, one or more springs or other biasing members can be used to help urge the inner support 260 away from the outer support 230, either in lieu of or in addition to the air spring created within the chamber 258. The air plug assembly 250 can be protected by a cap 222 or other cover. Thus, a user may have to remove such a cap 222 in order to transfer air or other fluid into or out of the chamber 258.

The illustrated embodiment includes a similar interaction between a retention assembly 280 and collet 270 as discussed in greater detail herein with reference to the seat post assembly. Thus, in some embodiments, under normal conditions, the bearing portion 281 and the locking portion 290 of the retention member 280 are biased or otherwise secured within a lower portion of the collet 270 or other expansion portion. Consequently, the collet 270 is securely positioned within a groove 240 of the outer support 230. This prevents relative movement between the outer and inner supports 230, 260 and the components to which they are attached.

In order to allow the collet 270 to be retracted inwardly (e.g., upwardly or downwardly away from the particular groove 240 in which it is positioned), the retention member 280 (e.g., the bearing portion 281, locking portion 290, etc.) need to be moved upwardly, out of the interior of the collet 270, as generally discussed with reference to FIGS. 8A-8C above. As illustrated in FIGS. 10 and 11B, springs 272, 274 or other biasing members can be used to normally urge the bearing portion 281 and the locking portion 290 of the retention member 280 within the interior of the collet 270.

Unlike the assembly illustrated in FIGS. 2-8C, the vertically-adjustable assembly depicted in FIG. 10 does not include a cable. Instead, the retention member 280 is mechanically connected to the lower tube assembly 218. Thus, by being rigid and hollow, such a lower tube assembly 218 can be configured to both move the retention member 280 and provide air or other fluid to the chamber 258 of the outer support 230. In a similar manner as discussed herein with respect to the seat post assembly, the lower tube assembly 218 can be selectively raised against the biasing force of the springs 272, 274 to move the retention member out of the interior of the collet 270. As a result, the collet 270 can be permitted to move to a different (e.g., higher or lower) groove 240 along the interior of the outer support 230.

With reference back to FIG. 9C, the outer support 230 can be attached to a piston rod 324. As shown, the piston rod 324 can include a piston 326 that is configured to move within the interior of a damper tube 332 of a damper 330. Such a configuration can be used to provide a desired level of cushioning or damping to the front wheel of bicycle. Further, in order for the suspension system to function properly, the fork leg 306 can include a suspension spring 314 having an air spring chamber that is adapted to urge the upper fork leg 310 and the lower fork leg 350 away from each other. In some embodiments, the damper 330 and its various components are included in a self-contained cartridge that can be conveniently positioned within the fork assembly. Additional information regarding the piston rod 324, the piston 326, the damper, the suspension spring and other components and features of the suspension fork is disclosed in U.S. patent application Ser. No. 12/134,116, filed Jun. 5, 2008, titled BICYCLE SUSPENSION ASSEMBLY and published as U.S. Publication No. 2009/0001684, the entirety of which is hereby incorporated by reference herein.

In some embodiments, as shown in FIG. 9C, the piston rod 324 is connected to the outer support 230 of the adjustable assembly 220. Thus, relative movement between the inner support 260 and the outer support 230 of the adjustable assembly 220 varies the effective length of the piston rod 324. When the outer and inner supports 230, 260 are in an extended position relative to each other, the effective length of the piston rod 324 is increased. As a result, the upper fork leg 310 moves upwardly relative to the lower fork leg 350 of the bicycle fork 300. Accordingly, the overall length (e.g., height) of the fork 300 is increased, thereby causing the front end of the bicycle to be raised. Similarly, when the outer and inner support 230, 260 of the adjustable assembly 220 move closer together, the effective length of the piston rod 324 can be decreased. This causes the upper fork leg 310 to move downwardly relative to the lower fork leg 350. Consequently, the front end of the bicycle can be selectively lowered.

According to some embodiments, the piston rod 324 is threaded or otherwise attached to the bottom of the outer support 230 of the adjustable assembly 220. However, in other arrangements the connection between the piston rod 324 and the adjustable assembly 220 can be different (e.g., more complex), as desired or required. In some embodiments, it may be desirable to control one or more valves or other devices positioned at or near the piston 326 and/or another component or device situated generally below the adjustable assembly 220. For example, the dampening effect of the damper 330 can be regulated by manipulating a valve positioned at or near the piston 326. As illustrated in FIG. 10, the piston rod 324 can be rotatably coupled to a rod 252 that runs along the centerline of the adjustable assembly 220. As shown, the rod 252 is mechanically connected to the upper tube assembly 251 using one or more couplings 253 or other joining devices. In order to vary the effective length of the piston rod 324 so that the overall length of the fork assembly 300 can be modified, the rod 252 can be configured to accommodate the slack that occurs when the outer and inner supports 230, 260 move relative to each other. For example, in one embodiment, the rod is configured to move within a portion of the upper tube assembly 251, or vice versa.

In some embodiments, the upper tube assembly 251 and the rod each include corresponding hexagonal, D-shaped or other cross sectional shapes to ensure that they are rotatably coupled to each other. In addition, as illustrated in FIG. 10, the bottom of the outer support 230 of the adjustable assembly 220 can include a seal 255 through which the rod 252 passes to engage the piston rod 324. Such a seal 255 ensures that the air spring within the chamber 258 of the outer support 230 is adequately maintained. With continued reference to FIG. 10, the upper tube assembly 251, and thus the rod 252, are rotatably coupled to a damper control knob 224 positioned near the top of the adjustable assembly 220. Thus, a user can actuate the knob to manipulate a damper valve or other device positioned below the adjustable assembly 220.

In embodiments where control of a damper valve or other device is not desired or necessary, the adjustable assembly 220 need not include a rod 252, bottom seal 255 and/or other components described herein and illustrated in FIG. 10. In such arrangements, the piston rod 324 can be threadably or otherwise attached to the bottom of the outer support 230 of the adjustable assembly 220.

In some embodiments, as illustrated in FIGS. 9A-12, the vertically-adjustable assembly 220 can include one or more rotatable knobs 226 that are used to selectively move the retention member 280 into and out of the collet 270 or other expansion portion. For example, as illustrated in the cross-sectional view of FIG. 11B, knob 226 can be directly or indirectly attached (e.g., using bolts, other fasteners, etc.) to a connector 227 that is configured to rotate along with the knob 226.

Figure 11B:
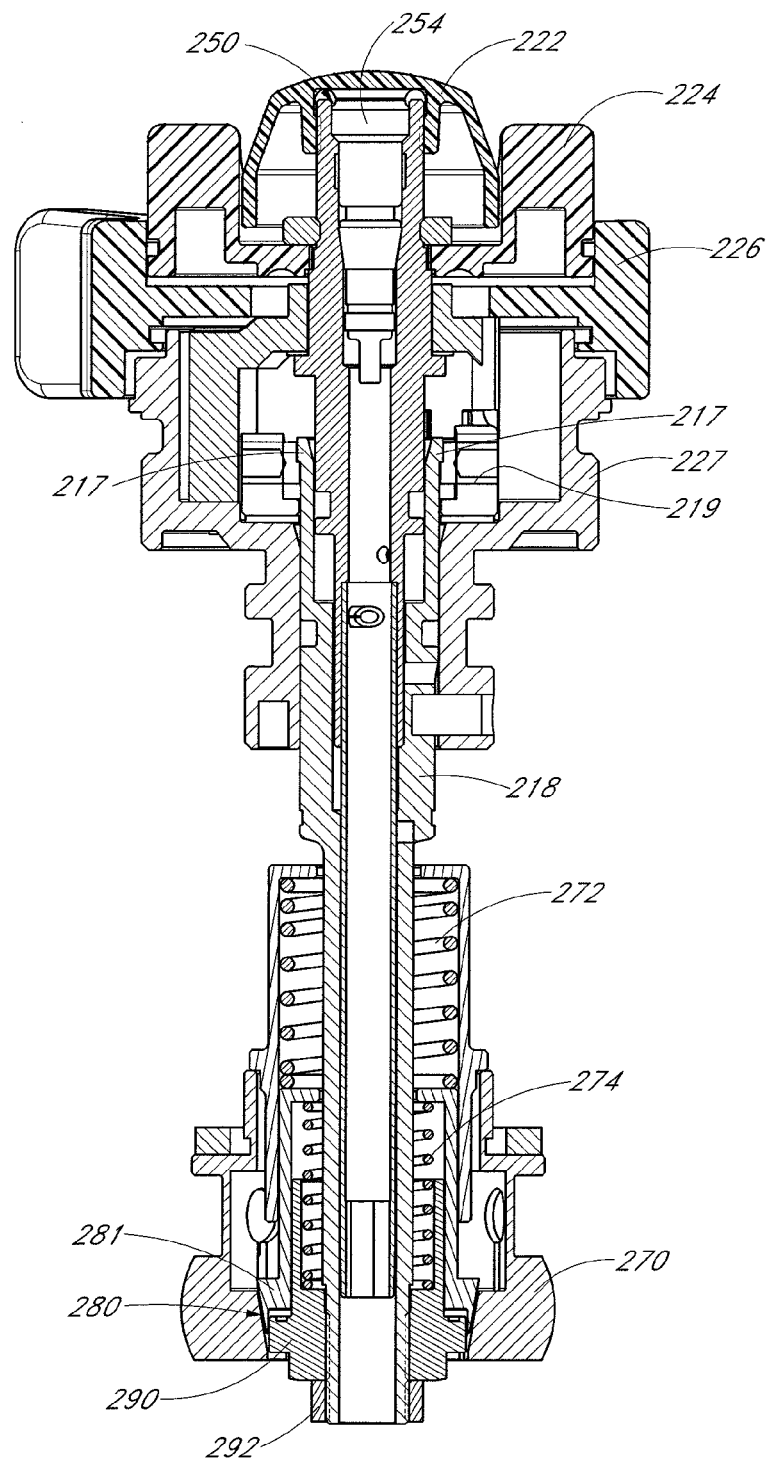
FIG. 11B illustrates a cross-sectional view of the adjustable assembly of FIGS. 9A and 9B with certain components hidden for clarity.
Figure 12:
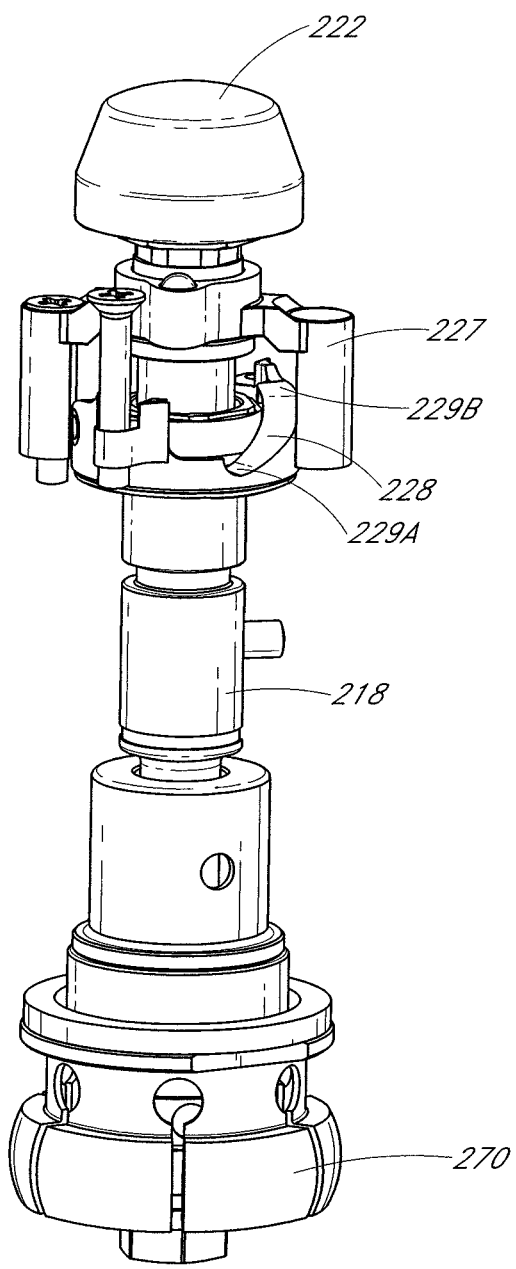
FIG. 12 illustrates a perspective view of the adjustable assembly of FIGS. 9A and 9B with certain components hidden for clarity.

With continued reference to FIG. 12, the connector 227 can include one or more cammed surfaces 228 that are also configured to rotate when the knob 226 is manipulated. As best seen in the cross-sectional view of FIG. 11B, an upper end of the lower tube assembly 218 can include an outer flange 217 or other protruding feature that is sized, shaped and otherwise adapted to engage the cammed surfaces 228 of the connector 227. Therefore, since the lower tube assembly 218 is operatively connected to the retention member 280, rotation of the knob 226 about a central axis of the assembly 220 can cause the flange 217 to move along the slanted cammed surfaces 228 of the connector 227. Consequently, the vertical position of the retention member 280 can be advantageously modified.

With continued reference to FIG. 12, the cammed surfaces 228 of the connector 227 can include lower and upper notches 229A, 229B, flat portions or other features that are designed to at least temporarily prevent relative movement between the connector 227 and the lower tube assembly 218. In some embodiments, such a temporary lock can be released by manipulating a second knob 224 or other actuation device of the assembly.

In use, whenever a user wishes to raise the front end of the bicycle, he or she can turn the knob 226 in order to move the retention member 280 upwardly, generally away from the interior of the collet 270. As a result, a user can allow an upwardly force (e.g., the air spring created within the chamber 258 of the outer support) to help move the collet 270 grooves 240. When a desired vertical position is achieved, the user can turn the knob 226 in the opposite direction, operate a different knob or actuation device and/or perform another necessary task to ensure that the retention member 280 once again is securely lowered within an interior of the collet 270. Alternatively, if a user wishes to lower the front end of the bicycle, he or she can exert a downward force (e.g., in a direction generally opposite of the air spring force) to move the collet 270 to a lower groove 240.

As discussed, by modifying the relative position of the outer and inner supports 230, 260 of the adjustable assembly 220, the rider can effectively change the length of the piston rod 324 to which the outer support 230 is attached. Consequently, the relative position of the upper fork leg 310 can be modified relative to the lower fork leg 350. This allows the user to selectively alter the overall length of the fork assembly 300, and permits him or her to either raise or lower the front end of the bicycle. As discussed, this can be particularly advantageous when riding the bicycle up or down an incline.

In some embodiments, the user manipulates a knob 226 as illustrated in FIG. 10 to modify the position of the adjustable assembly 220. However, in other arrangements, the position of the adjustable assembly 220 can be controlled using a lever, knob or other actuation device positioned at or near the handlebars of the bicycle. This can permit a user to easily and safely modify the position of the fork assembly 300 while riding the bicycle without having to take him or her hands off the handlebars.

Expansion Portion Variations

According to some embodiments, the manner in which an expansion portion or other movable member engages the adjacent support (e.g., outer support) can be different than discussed above. For example, the expansion portion (e.g., collet, balls, pawls, etc.) can be configured to retract or otherwise move radially inwardly (e.g., toward the centerline or radial center of the adjustable assembly) in order to make engaging contact with the adjacent support and to maintain a desired vertical position of the assembly. Accordingly, at least a portion of the expansion portion (e.g., one or more collets, balls, pawls, etc) can be configured to move either outwardly or inwardly to engage at least a portion of the opposite or adjacent support (e.g., outer support, inner support), as desired or required by a particular application or use.

Figure 13A:
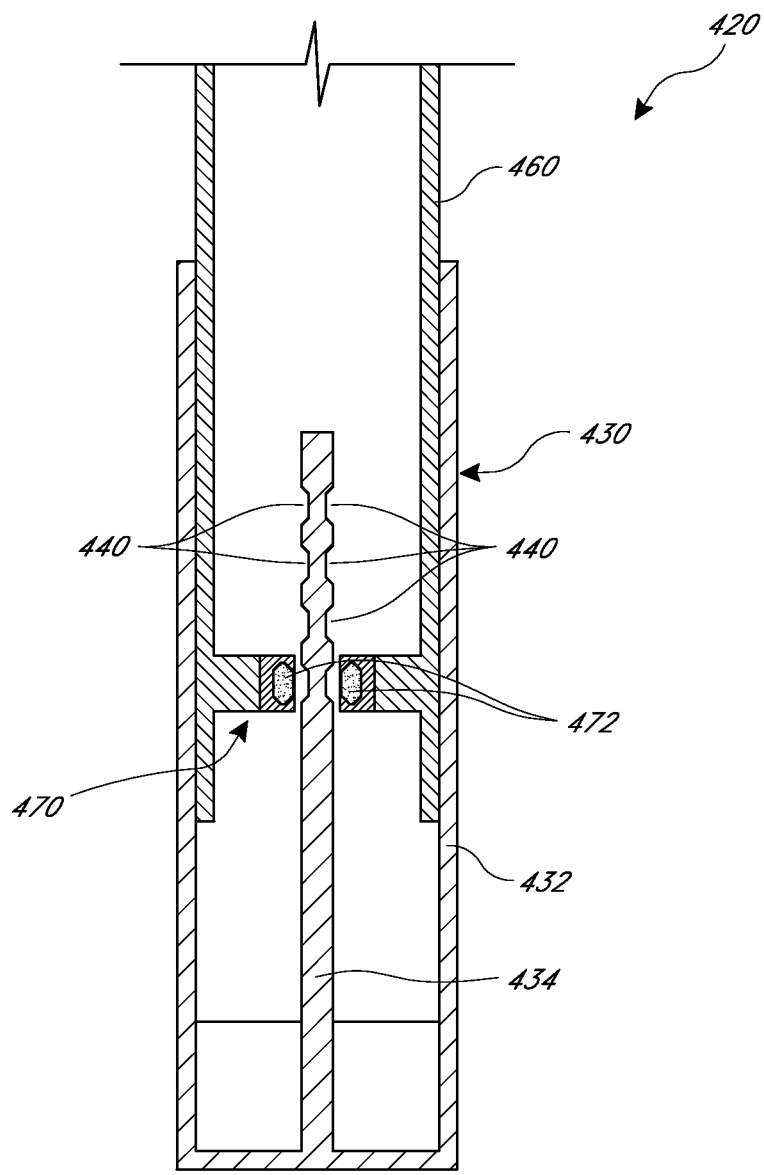
FIGS. 13A and 13B illustrate cross-sectional views of an adjustable assembly according to another embodiment.
Figure 13B:
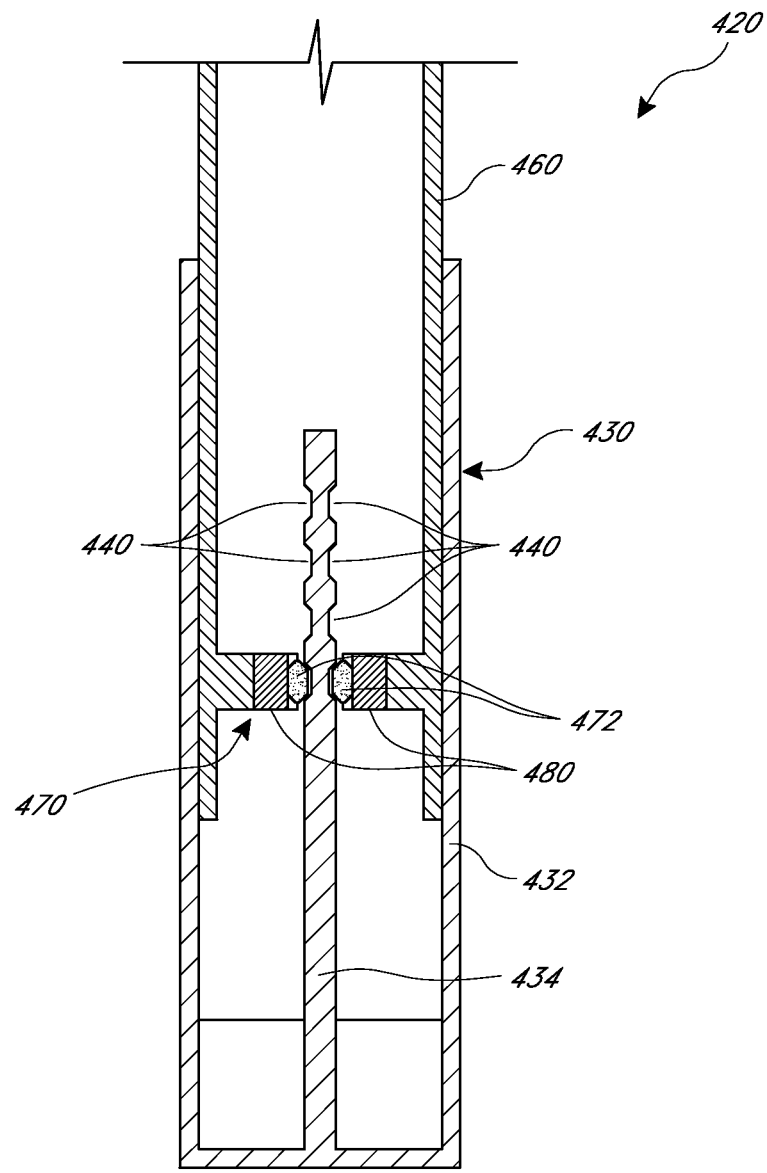

An embodiment of a movable assembly comprising a different engagement mechanism between the expansion portion (or other movable member) 470 and the adjacent support (e.g., the outer support 430) is schematically illustrated in FIGS. 13A and 13B. In the depicted movable assembly 420, the outer support 430 comprises a main outer housing 432 that defines an interior space or region of the outer support. Further, as shown, the outer support 430 can comprise a shaft 434 or other member that is positioned along the center (e.g., at or near the longitudinal centerline or radial center) of the outer member 430. In some embodiments, such a center shaft 434 is permanently or removably coupled to one or more portions of the outer support 430. For example, in the depicted arrangement, the center shaft is attached to, at least in part, a bottom surface or portion of the outer support 430. However, the shaft 434 can be connected to any other portion of the outer support 430 either in addition to or in lieu of a bottom surface, as desired or required for a particular application or configuration.

With continued reference to the embodiment depicted in FIGS. 13A and 13B, the center shaft 434 of the outer support 430 can include a plurality of grooves 440, recesses and/or other features that are adapted to receive the expansion portion 470 when the expansion portion is moved radially inwardly (e.g., in the direction of the center shaft 434, toward the support centerline). Accordingly, if the inwardly directed force on the expansion portion 470 is sufficiently large, the expansion portion 470 (e.g., collet, balls, pawls, other movable members, etc.) can engage the shaft 434 and can remain stationary relative to the shaft 434 until the rider decides to alter the vertical position of the adjustable assembly 420.

This is similar to other arrangements of a movable support illustrated and discussed herein, except that the expansion portion moves in the radially opposite direction (e.g., inwardly) in order to secure the outer support 430 relative to the inner support 460 of the assembly. Further, as with the other embodiments disclosed herein, the assembly 420 schematically illustrated in FIGS. 13A and 13B can include a retention assembly 480 that, when moved in a particular orientation relative to the expansion portion 470, ensures that the inwardly protruding members or portions 472 (e.g., slots of the collet, slidable balls, pawls, etc.) of the expansion portion 470 remain secured to the adjacent portion of the inner shaft 434 (e.g., grooves, other exterior surface of the shaft, etc.). As discussed herein, the retention assembly 480 can comprise a sleeve, other movable member and/or any other type of bearing and/or locking portion. Such a configuration in which the adjustable assembly comprises an inner shaft and an expansion portion that is adapted to move radially inwardly can be incorporated into any of the embodiments of an adjustable assembly disclosed herein or equivalents thereof.

By way of example, in the arrangement schematically illustrated in FIG. 13A, the expansion portion 470 is shown disengaged from the adjacent central shaft 434. In such an orientation, the inner support 460 can be slidably moved relative to the outer support 430 if sufficiently high downwardly or upwardly directed forces are applied to or exerted upon the assembly 420. FIG. 13B schematically illustrates the expansion portion 470 in a radially inwardly position so that the protruding members are secured within or along a groove, recess or other exterior surface of the center shaft 434. As discussed herein, to help ensure that the expansion portion 470 remains engaged and stationary relative to the shaft 434, and thus the outer support 430, a retention assembly 480 can be configured to move within a portion of the expansion portion 470. In some embodiments, such a retention assembly 480 comprises at least one of a bearing portion and a locking portion, as desired or required.

According to some embodiments of an adjustable assembly disclosed herein, the expandable or expansion portion that engages a corresponding surface of the opposite support is configured to normally maintain an "expanded" or outwardly-oriented position. For example, as discussed in greater detail herein, the collet 70 depicted in FIG. 7A comprises a plurality of members that are normally biased in a radially outwardly direction. Likewise, the individual balls (FIGS. 7B and 7C) or pawls included in other embodiments of the expansion portion can ordinarily be directed radially outwardly. However, in any of the embodiments disclosed herein, the one or more expansion portions of an adjustable assembly can include a different general configuration with respect to their normal, resting position. For instance, according to some embodiments, the collet, balls, pawls and/or other component of an expansion portion maintains a radially compressed (e.g., inwardly directed) orientation.

In embodiments where the expansion portion maintains a generally radially contracted position at rest and the expansion portion needs to be in a generally radially expanded position in order to engage the adjacent surface of the opposite support, the outer support of the adjustable assembly can freely move relative to the inner support. Accordingly, the vertical position of the seat post, fork or other portion of the bicycle comprising the adjustable assembly can be selectively modified by the user. In such arrangements, one or more external forces may be required to expand or otherwise move the expansion portion outwardly into engaging contact with the opposite support. Such external forces can comprise, but are not limited to, one or more springs, other resilient members, sleeves, elastomeric materials or components, inflatable members and/or other devices, systems or methods that are configured to impart the necessary forces on the expansion portion. In some embodiments, the devices or systems imparting the necessary radial force on the expansion portion are incorporated into the design of the expansion portion. In other arrangements, such devices or systems are separate items than the expansion portion (e.g., in such embodiments, the energy imparting components or members may or may not be in contact with the expansion portion).

Figure 14:
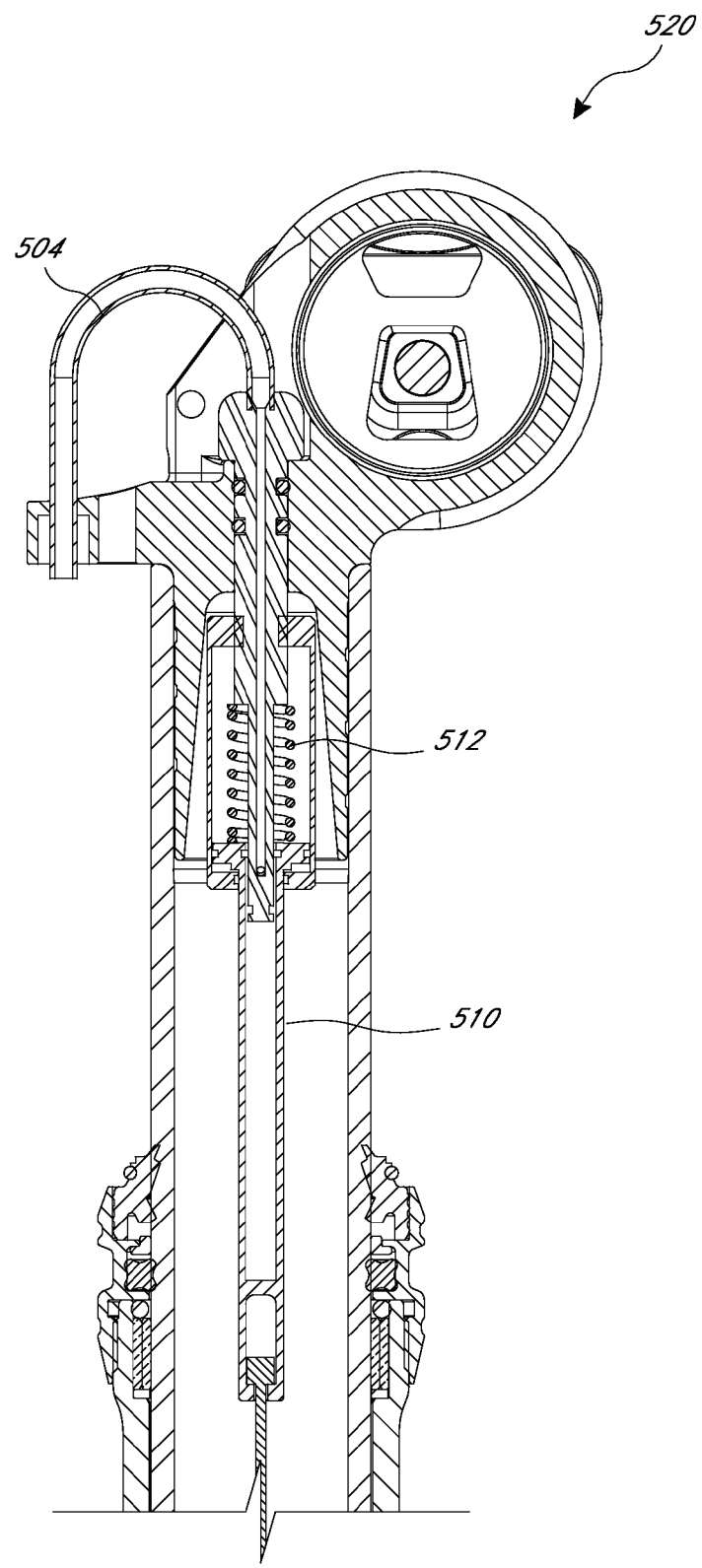
FIG. 14 illustrates a partial cross-sectional view of an adjustable assembly according to another embodiment.

According to some embodiments, one or more components of any of the adjustable assemblies disclosed herein, or equivalents thereof, are at least partially moved (e.g., translated along a longitudinal axis of the adjustable assembly), rotated or otherwise manipulated using a cable, rod or any other mechanical or non-mechanical device or method. For example, as illustrated in FIG. 14, an adjustable assembly 520 can include one or more pneumatic conduits 504. Such conduits or other pneumatic connections can eliminate the need for a mechanically-operated cable or rod. In other embodiments, such conduits 504 can either replace and/or supplement cables, other mechanical movement devices and/or any other type of movement mechanism. Accordingly, the pull rod assembly 510 (and all other interconnected components, e.g., plungers, rods, etc.) can be moved against the force of a spring 512 or other resilient member in order to move the retention assembly (e.g., bearing portion, locking portion, sleeves, etc.) relative to the expandable member or expansion portion (e.g., collet, slidable balls, pawls, other movable members, etc.).

Figure 14A:
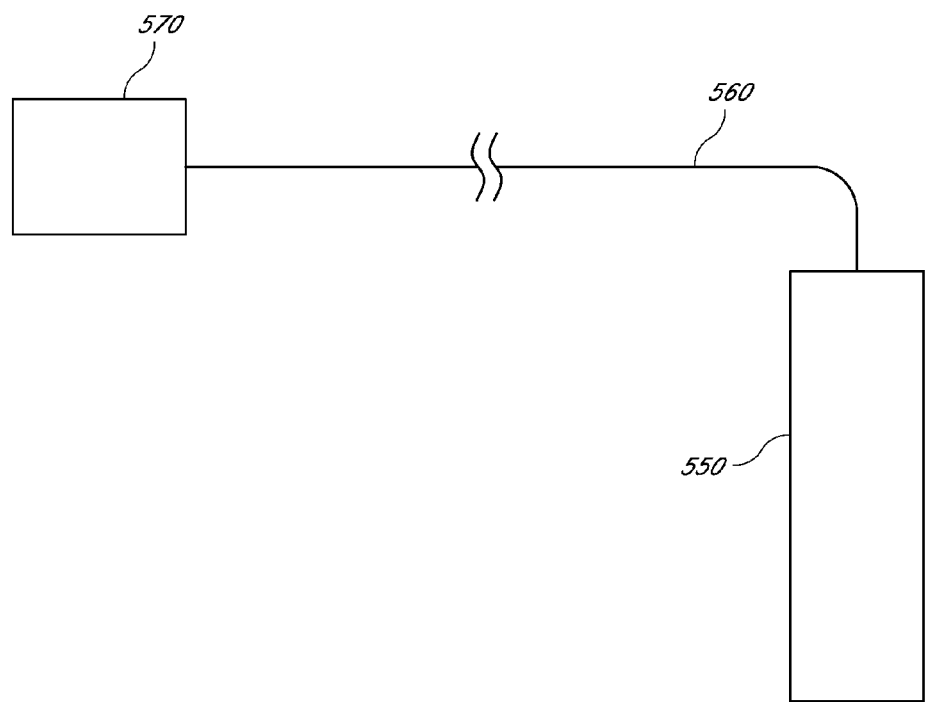
FIG. 14A schematically illustrates an adjustable assembly according to another embodiment.

One embodiment of an adjustable assembly 550 configured to be regulated hydraulically is schematically illustrated in FIG. 14A. As shown, a hydraulic line or conduit 560 can be used to operatively connect a handlebar assembly 570 of a bicycle to an adjustable seat assembly 550. As with other embodiments disclosed herein, the adjustable assembly 550 can comprise an inner tube that is slidably movable within an outer tube. The assembly 550 can additionally include an expansion portion that can be selectively moved to either prevent or permit relative movement between the inner and outer tubes of the assembly. Thus, the assembly 550 can be configured according to any one of the other assembly embodiments disclosed herein or equivalents thereof.

Figure 15A:
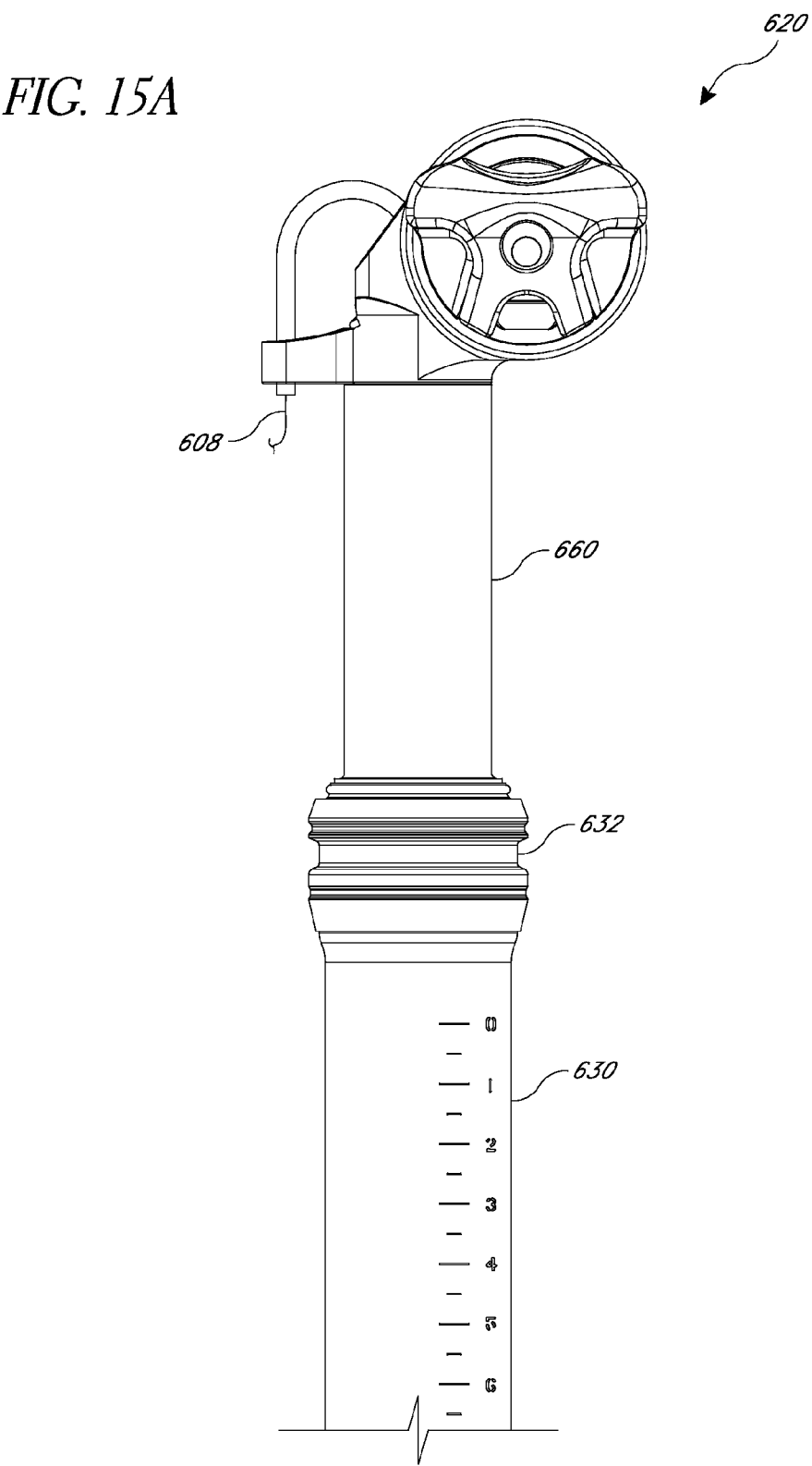
FIG. 15A illustrates a partial side view of an adjustable assembly according to another embodiment.
Figure 15B:
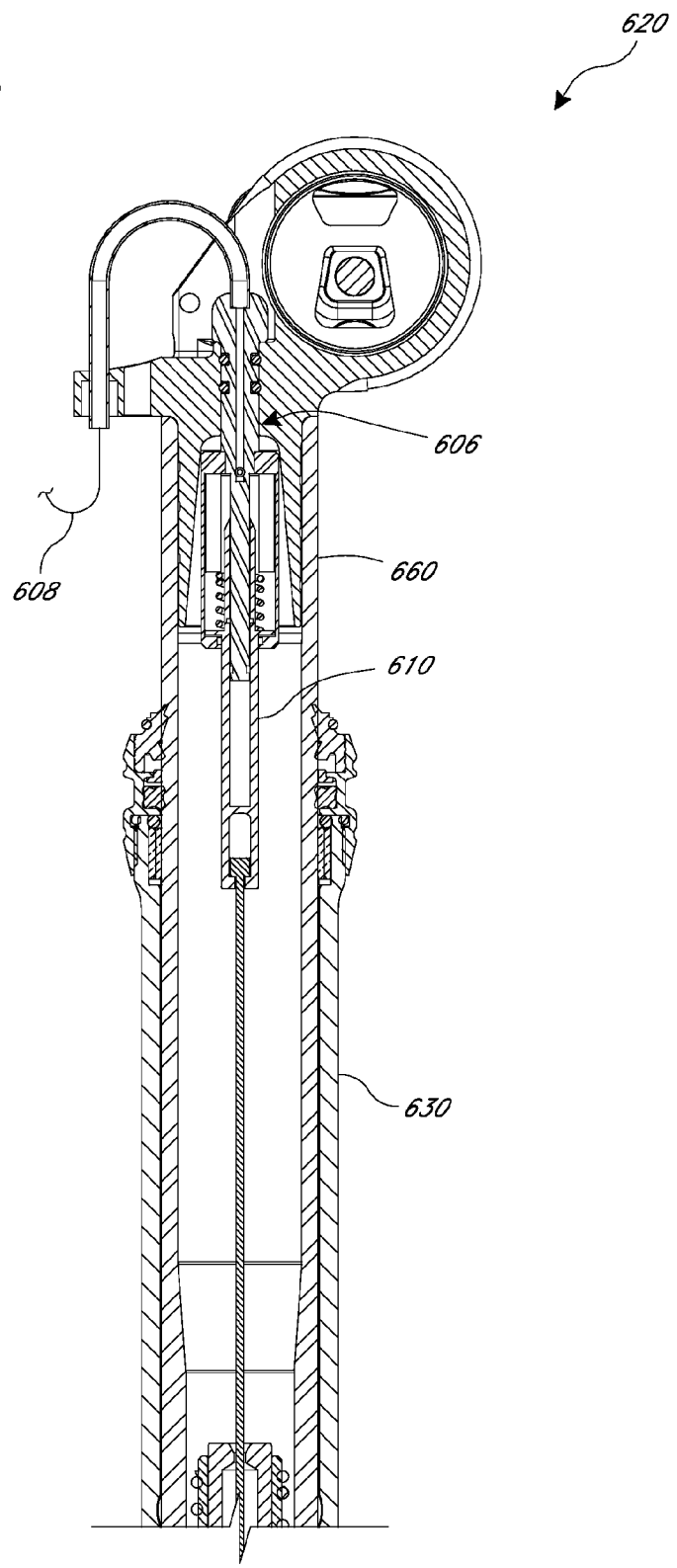
FIGS. 15B and 15C illustrate cross-sectional views of the adjustable assembly of FIG. 15A.
Figure 15C:
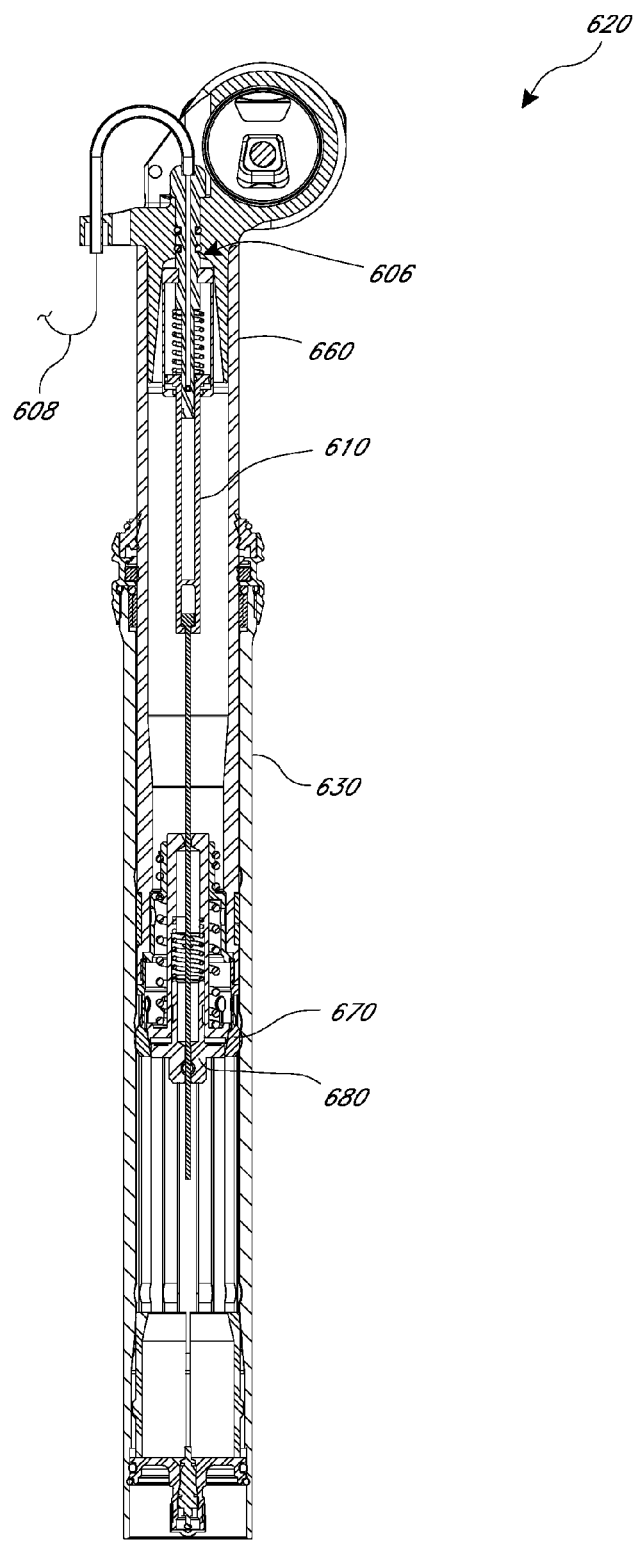

FIGS. 15A-15C illustrate an adjustable assembly 620 comprising a solenoid assembly 606 configured to create the necessary movement of a retention assembly with respect to the expandable member or expansion portion (e.g., collet, slidable balls, other objects having a spherical or partially spherical portion, pawls, other movable members, etc.). As shown, the solenoid assembly 606, which in some arrangements is located at or near an upper portion of the adjustable seat post 620, can selectively retract the pull rod assembly 610 in order to "unlock" or otherwise permit the collet, balls, pawls and/or other expansion portion 670 to assume a radially retracted position. The solenoid can be powered by one or more batteries (e.g., rechargeable batteries, disposable batteries, etc.) and/or any other power source. In some embodiments, including the embodiment shown in FIGS. 15A-15C, such a movement is accomplished by moving a corresponding retention assembly 680 (e.g., bearing portion, locking portion, sleeves and/or the like) away from a corresponding area of the expansion portion. For example, in some embodiments, the retention assembly 680 is moved out of an interior space or region of a collet or other expandable or expansion portion 670. As discussed herein, such a retraction of the expansion portion 670 can move one or more components of the expansion portion away from engaging contact with any grooves and/or other portions of the outer support. Accordingly, this can allow the inner support of the adjustable assembly 610 to be selectively moved relative to the outer support, thereby modifying the vertical orientation of the adjustable assembly 620.

According to some embodiments, the diameter of the solenoid assembly is equal to or less than about 18 mm (or another inner diameter of the corresponding tube of the assembly, e.g., 10 mm, 12 mm, 14 mm, 16 mm, 18 mm, 20 mm, 22 mm, greater than about 22 mm, less than about 10 mm, ranges between the foregoing diameters, etc.). Thus, the assembly can be conveniently positioned within the inner diameter of the corresponding tube (e.g., inner tube or upper tube) of the assembly. According to some embodiments, the length of the solenoid assembly can be approximately 25 to 65 mm. However, in other embodiments, the solenoid assembly can be shorter than about 25 mm or longer than about 65 mm, as desired or required for a particular application or use.

In some embodiments, a pneumatic conduit (FIG. 14), a hydraulic conduit 560 (FIG. 14A), a solenoid connection 608 (FIGS. 15A-15C), a rotary motor or servomotor (FIGS. 16A-16B) and/or any other device coupled to an adjustable assembly is routed to or near the bicycle's handlebar area so that a rider can conveniently adjust the position of the adjustable assembly using a lever, button, dial, knob or other controller 570 (FIG. 14A), while the rider is operating the bicycle.

According to some embodiments, the adjustable assembly comprises an electric servomotor and/or one or more other types of motorized devices to assist in moving the expansion portion between a radially contracted and a radially expanded orientation. One example of such an assembly 720 is illustrated and discussed with reference to FIGS. 16A and 16B. In other embodiments, the adjustable assembly comprises a rotary motor, either in lieu of or in addition to a servomotor. Such servomotors and/or rotary motors can include one or more gearboxes or other gear reduction devices, as desired or required. Thus, servomotors and rotary motors are used interchangeably herein Like in other arrangements disclosed herein, the depicted assembly 720 can include an inner support 760 at least partially and slidably disposed within an outer support 730. With reference to the cross-sectional view of FIG. 16B, the servomotor or rotary motor 710 (and/or other type of electromechanical motor or device) can be positioned within an interior of the inner support 730, near the expansion portion 770. In the depicted embodiment, the servomotor or rotary motor 710 is immediately above the expansion portion 770. However, in other arrangements, the location of the servomotor (and/or similar device) within or near the adjustable assembly 720 can vary, as desired or required. As noted above, one or more gear boxes or similar assemblies can be used in conjunction with a rotary motor, servomotor and/or any other motor incorporated into the adjustable assembly design, as desired or required.

Figure 16A:
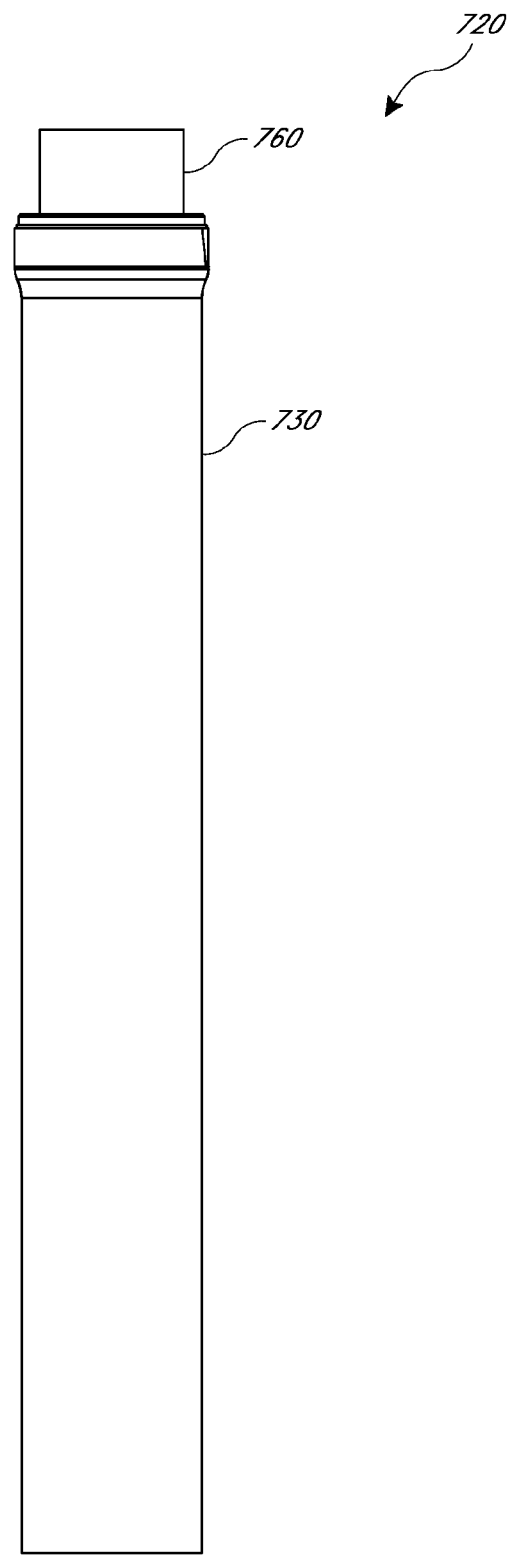
FIG. 16A illustrates a side view of an adjustable assembly according to another embodiment.
Figure 16B:
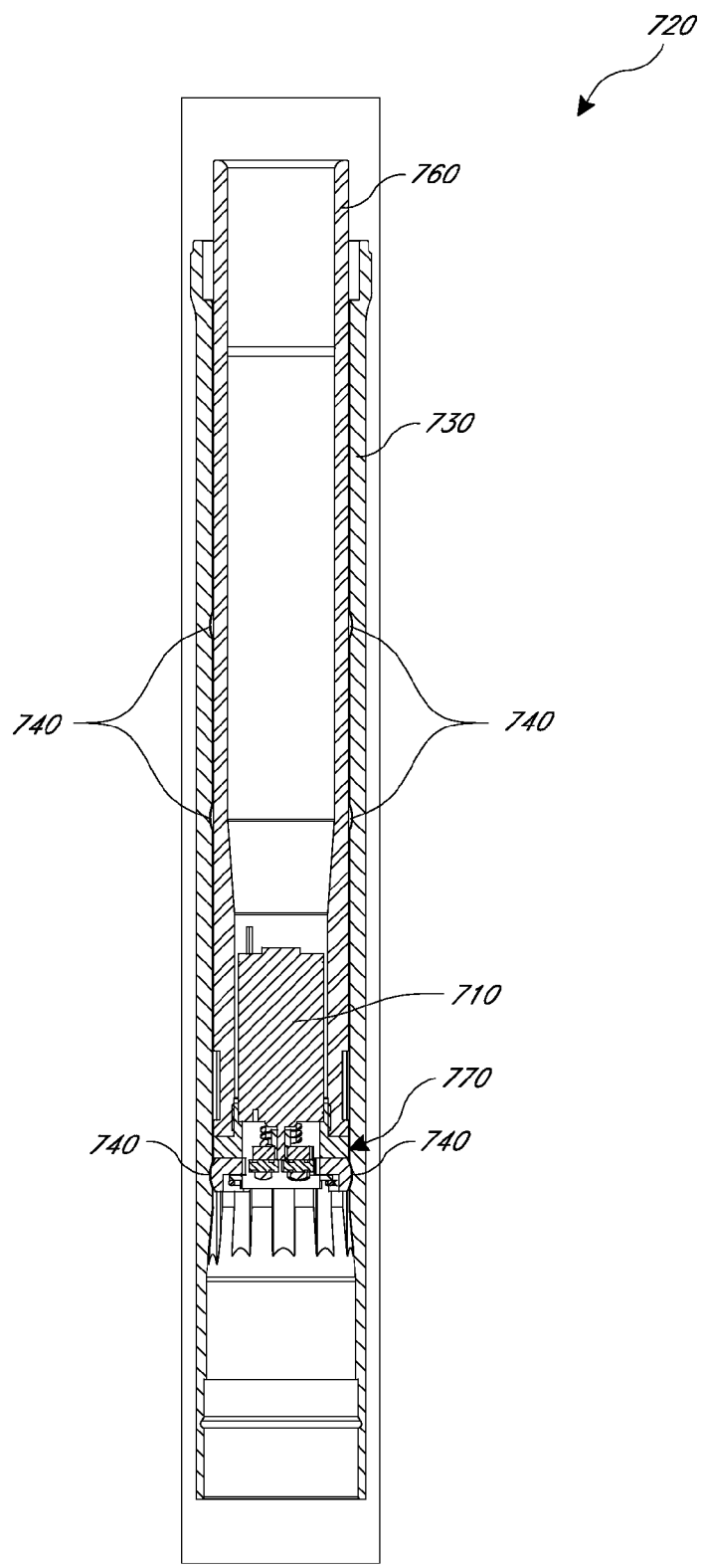
FIG. 16B illustrates a cross-sectional view of the adjustable assembly of FIG. 16A.
Figure 17:
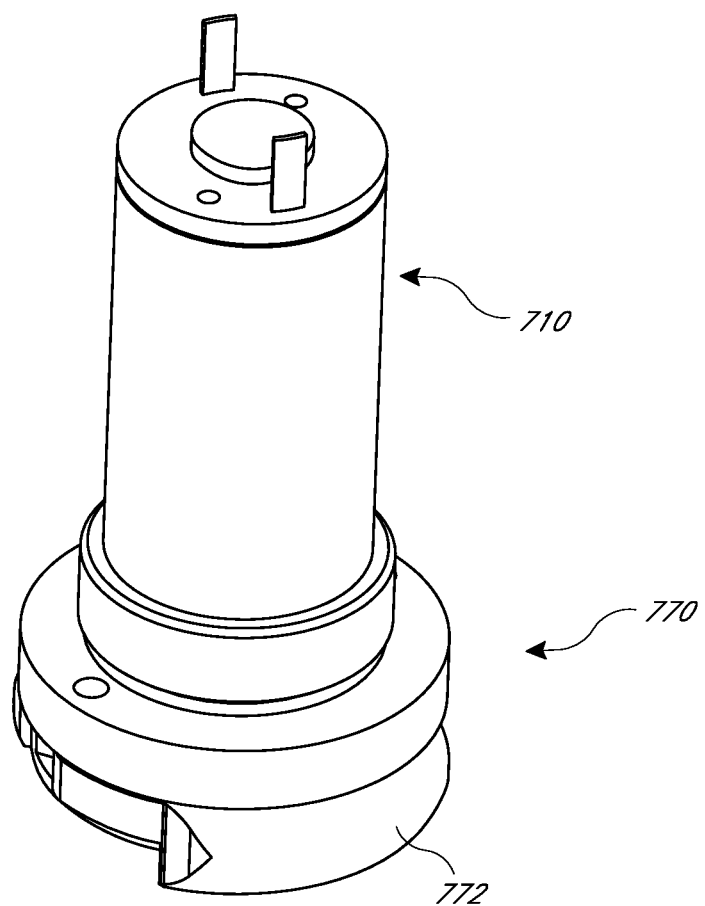
FIG. 17 illustrates a top perspective view of one embodiment of an expansion portion configured for use in an adjustable assembly.
Figure 18:
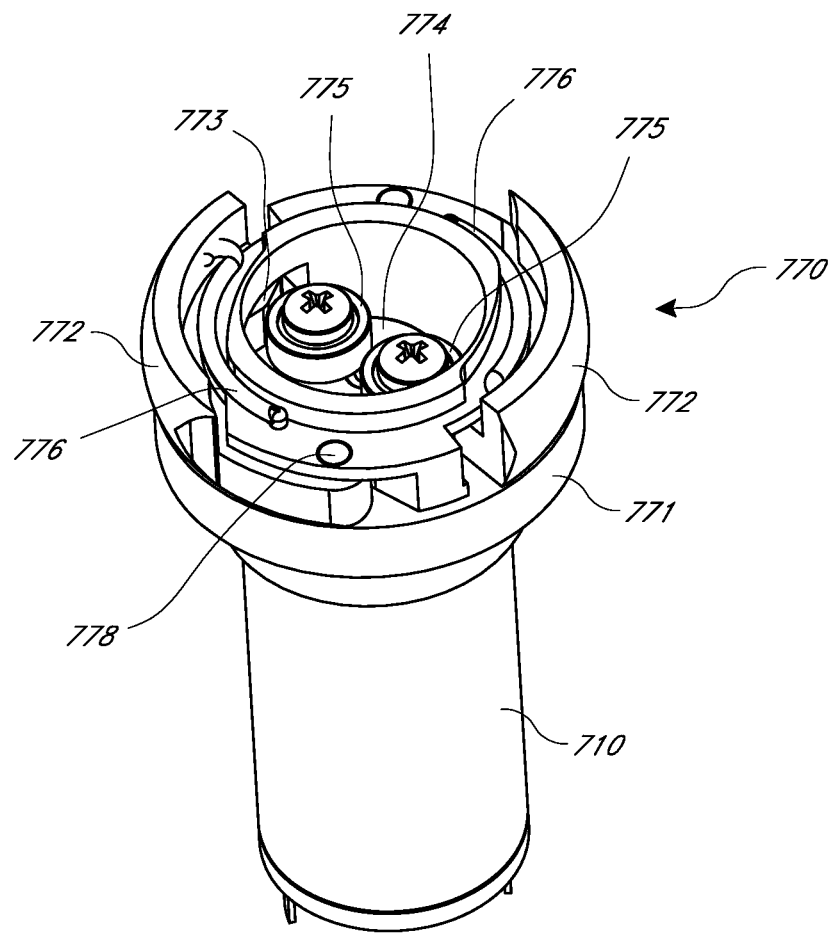
FIG. 18 illustrates a bottom perspective view of the expansion portion of FIG. 17.
Figure 19:
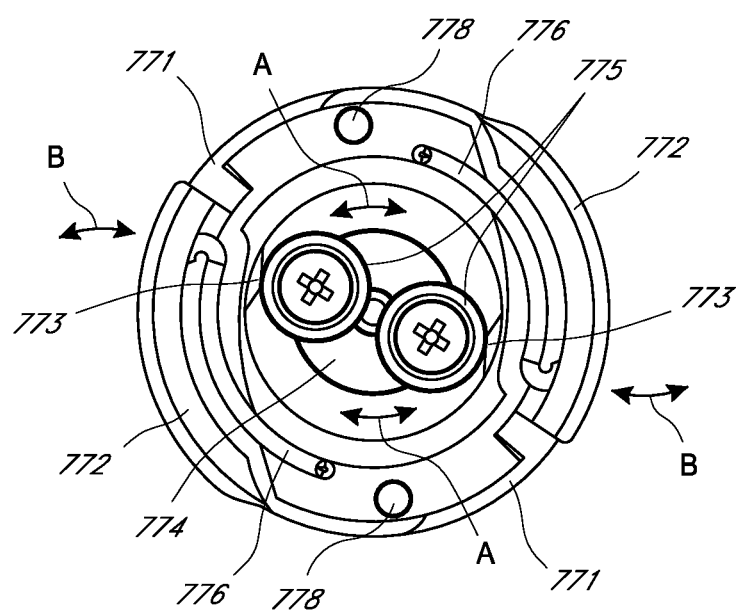
FIG. 19 illustrates a bottom view of the expansion portion of FIG. 17.
Figure 20A:
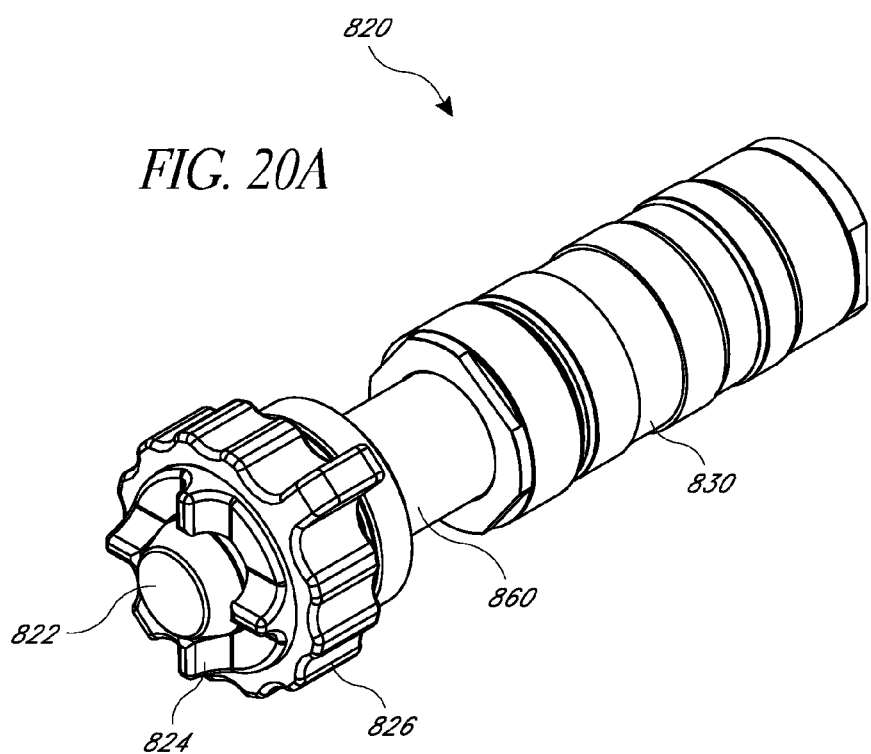
FIG. 20A illustrates a perspective view of an adjustable assembly according to another embodiment.
Figure 20D:
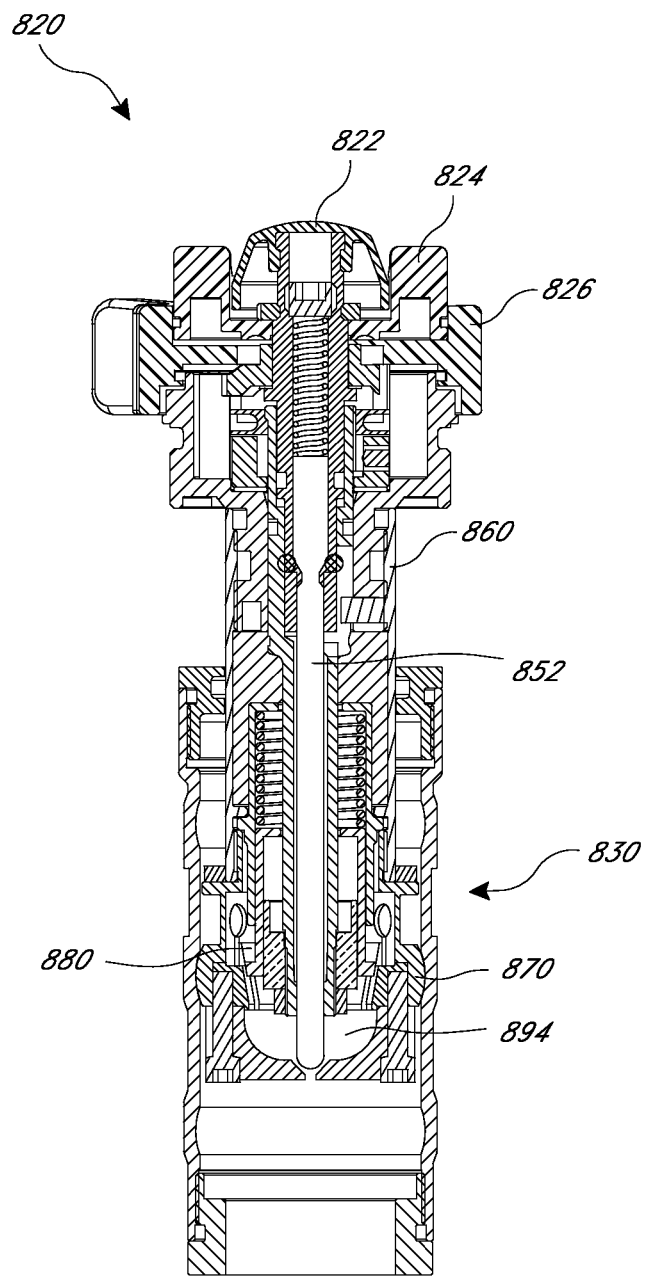
FIG. 20D illustrates a cross-sectional view of the adjustable assembly of FIG. 20A.

One embodiment of a servomotor or rotary motor 710 and an adjacent expansion portion 770, as they are oriented in the adjustable assembly of FIGS. 16A and 16B, is illustrated in the detailed perspective view of FIGS. 17-19. As shown, the electric servomotor, rotary motor or other motor 710 can be mechanically coupled to an adjacent rotary plate 774. According to some embodiments, the servomotor and/or rotary motor comprise a diameter that is equal to or less than about 18 mm (or another inner diameter of the corresponding tube of the assembly, e.g., 10 mm, 12 mm, 14 mm, 16 mm, 18 mm, 20 mm, 22 mm, greater than about 22 mm, less than about 10 mm, ranges between the foregoing diameters, etc.). Thus, the assembly can be conveniently positioned within the inner diameter of the corresponding tube (e.g., inner tube or upper tube) of the assembly. According to some embodiments, the length of the servomotor, the rotary motor and/or any other motor used in the assembly (either alone or in combination with one or more gear boxes or related assemblies) can be approximately 25 to 65 mm. However, in other embodiments, the motor (either alone or in combination with one or more gear boxes or related assemblies) is shorter than about 25 mm or longer than about 65 mm, as desired or required for a particular application or use. By way of example, a servomotor or rotary motor used in an adjustable assembly is supplied by Micromo (Clearwater, Fla.).

In some embodiments, the servomotor or rotary motor 710 is configured to rotate the plate 774 about a centerline of the assembly, such as, for example, as generally represented by arrows A in FIG. 19. In some embodiments, one or more cam actuators 775 are attached to the rotary plate and are configured to move along with the rotary plate when the servomotor is electrically energized or actuated. The cam actuators 775 can comprise ball bearings and/or any other device or configuration. Further, the quantity, orientation and/or other details related to the cam actuators 775 can be different than illustrated herein.

With continued reference to FIGS. 18 and 19, upon sufficient rotation of the rotary plate 774, the cam actuators 775 coupled to the plate can contact the cam followers 773 of the pawls 772. As shown, the cam followers 773 can extend, at least partially, into an interior space that houses the cam actuators 775. In some embodiments, the cam actuators 775 contact the cam followers 773 and urge them radially outwardly. Accordingly, the pawls 772 can rotate about the corresponding pivot 778, hinge or other rotatable point. Thus, the movement of the pawls 772 about a pivot point can help urge at least a portion of the pawls outwardly (e.g., away from the center of the expansion portion 770), such as, for example, in a manner generally represented by arrows B in FIG. 19.

Accordingly, the outwardly extended pawls 772 can contact a groove 740 and/or other surface or portion of the outer support or tube 730 in order to maintain a desired vertical orientation between the outer support 730 and the inner support 760. For example, the pawls 772 can be configured to selectively engage one or more generally cylindrical portions and/or other features of the outer support. Thus, in some embodiments, the outer support need not include grooves or other discrete recesses or other features for engagement with the expansion portion. In some arrangements, one or more exterior portions of the pawls 772 comprise, at least in part, a roughened surface, anti-skid features, materials and/or components (e.g., relatively high friction materials, bumps, dimples, elastomeric layers, etc.) and/or any other feature, device or component to help increase the relative friction between the pawls 772 and an adjacent surface of the outer support 730. Accordingly, the vertical position of the adjustable assembly can be maintained as long as the rotary plate 774 so that the cam actuators exert a sufficiently high force on the cam followers.

In some embodiments, the pawls 772 are resiliently biased to return to their contracted orientation once the cam actuators 775 disengage from the corresponding cam followers 773 of the pawls 772. The resilient biasing of the pawls 772 can be accomplished with one or more springs 776, elastomeric members, other resilient members and/or the like. However, as noted herein, the pawls, collet, balls and/or other device or component or portion of the expansion portion can be configured so that the expansion portion retains a radially expanded orientation at rest or when no external forces are being applied.

As discussed herein with regard to other embodiments, adjustable assemblies comprising a solenoid, servomotor, rotary motor and/or other electromechanical motor or device can be regulated by a switch, button and/or any other type of controller positioned on or near the bicycle's handlebars. Such a switch or other controller can be configured to communicate with the servomotor and the adjustable assembly using one or more hardwired or wireless connections. Accordingly, the rider can conveniently and reliably change the vertical position of the adjustable assembly during use (e.g., while he or she is riding the bicycle).

Figure 11A:
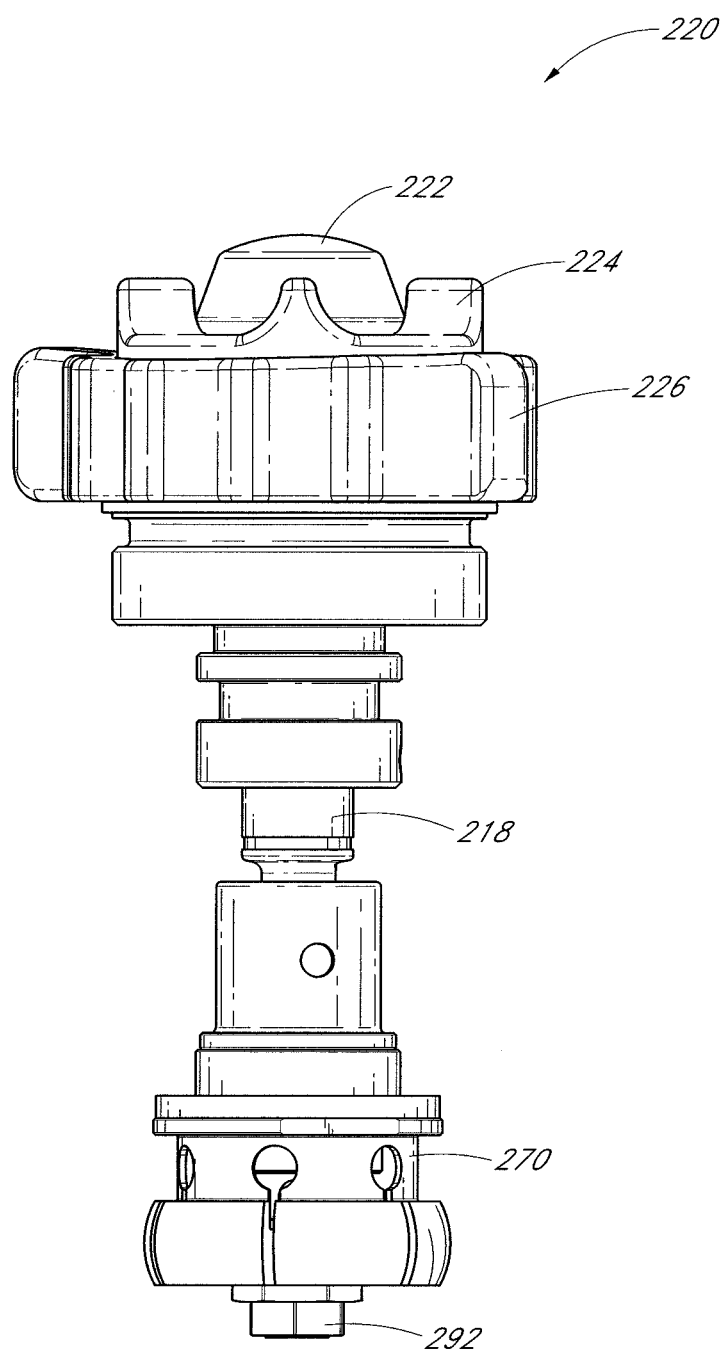
FIG. 11A illustrates a side view of the adjustable assembly of FIGS. 9A and 9B with certain components hidden for clarity.

FIGS. 20A-20D illustrate various views of another embodiment of an adjustable assembly 820 that is similar to the one discussed herein with reference to FIGS. 10-12. According to some arrangements, the assembly 820 includes an inner support 860 that is configured to slide at least partially within an outer support 830 when a user wishes to change the vertical orientation of the assembly. As shown in the cross-section view of FIG. 20D, a rod 852 or other member can mechanically connect the rotatable levers or other controllers 824, 826 (e.g., positioned near the top of the adjustable assembly 820) to the retention assembly 880. In some embodiments, the retention assembly (e.g., bearing portion, locking portion, sleeve, etc.) helps to maintain the expansion portion 870 (e.g., collet, balls, pawls, etc.) in a desired radial orientation (e.g., outwardly against an adjacent surface or feature of the opposite support, inwardly generally away from the opposite support, etc.).

With continued reference to the adjustable assembly illustrated in FIGS. 20A-20D, activation and release of the lever, knob or other controller 824, 826 of the assembly 820 can cause the retention assembly 880 to retract and to temporarily latch it in a release position. As a result, the collet, pawls, balls or other expansion portion 870 is permitted to retract radially inwardly, allowing the inner support to move relative to the outer support. Such temporary latching can be executed with the assistance of a latch 894 or other member coupled to the expansion portion 870 and/or the retention assembly 880.

According to some embodiments, once the collet or other expansion portion 870 leaves the original groove, recess or other engaging portion of the outer support 830, the temporary latch is tripped, thereby reintroducing the outwardly directed force on the collet or other expansion portion 870. Consequently, the expansion portion can engage and stop at the next groove, recess or other feature of the outer support 830. Such a configuration can help prevent the expansion portion (e.g., collet, pawls, balls, etc.) from unintended missed engagement of the next vertical stopping point. This type of over-travel protection can be incorporated into any of the adjustable assembly embodiments disclosed herein.

Control Cable Location

In some embodiments, the cable that mechanically connects the adjustable assembly to a lever or other controller (e.g., to permit a user to selectively adjust the vertical position of the assembly) can be coupled to and pass through one or more locations or portions of the adjustable assembly. For example, in some arrangements, as discussed herein with reference to FIG. 2, the cable is configured to be routed through an upper portion of the assembly (e.g., to or near the saddle head, the inner support or tube, etc.). In other embodiments, however, the control cable is secured to or routed through the outer support, the seal head portion and/or any other portion or location of the adjustable assembly, as desired or required.

In arrangements were the control cable is routed through the top of the adjustable assembly (e.g., through the top of the movable inner support, near the saddle), a relatively large cable loop may be required in this area in order to accommodate for a particular amount of travel (e.g., vertical variation) of the movable support during use. In some arrangements, for example, the cable loop is sized to provide about 100 to 125 mm of travel in the movable tube or support. In certain situations, excessive cable loop lengths can be problematic if the cable is not properly and carefully guided. For example, such slack in the cable may, in certain circumstances, interfere with a rider's feet or legs while the bicycle is being used (e.g., mounted, ridden, dismounted, etc.). Accordingly, certain benefits and other advantages may be achieve by routing the control cable through one or more stationary portions of the adjustable assembly (e.g., the lower or outer support, the seal head, etc.).

By way of example, FIGS. 21A-21D illustrate various views of one embodiment of a mechanically-actuated adjustable assembly 920. In the depicted arrangement, the control cable C is configured to pass through the seal head portion of the assembly 920. As discussed with reference to other arrangements disclosed herein, the assembly 920 can include an inner support or tube 960 that is sized, shaped and otherwise configured to be slidably disposed within at least a portion of an outer support or tube 930. In some embodiments, the outer support 930 is configured to secure to the bicycle frame and to remain substantially stationary relative to the bicycle frame. In contrast, the inner support 960, which may be secured to a bicycle saddle, will be permitted to move relative to the adjacent outer support 930 and the bicycle frame, allowing a rider to advantageously adjust the height of the saddle during use. Thus, the need to provide a minimum amount of slack in the control cable length that exits the adjustable assembly is eliminated or reduced.

Figure 21A:
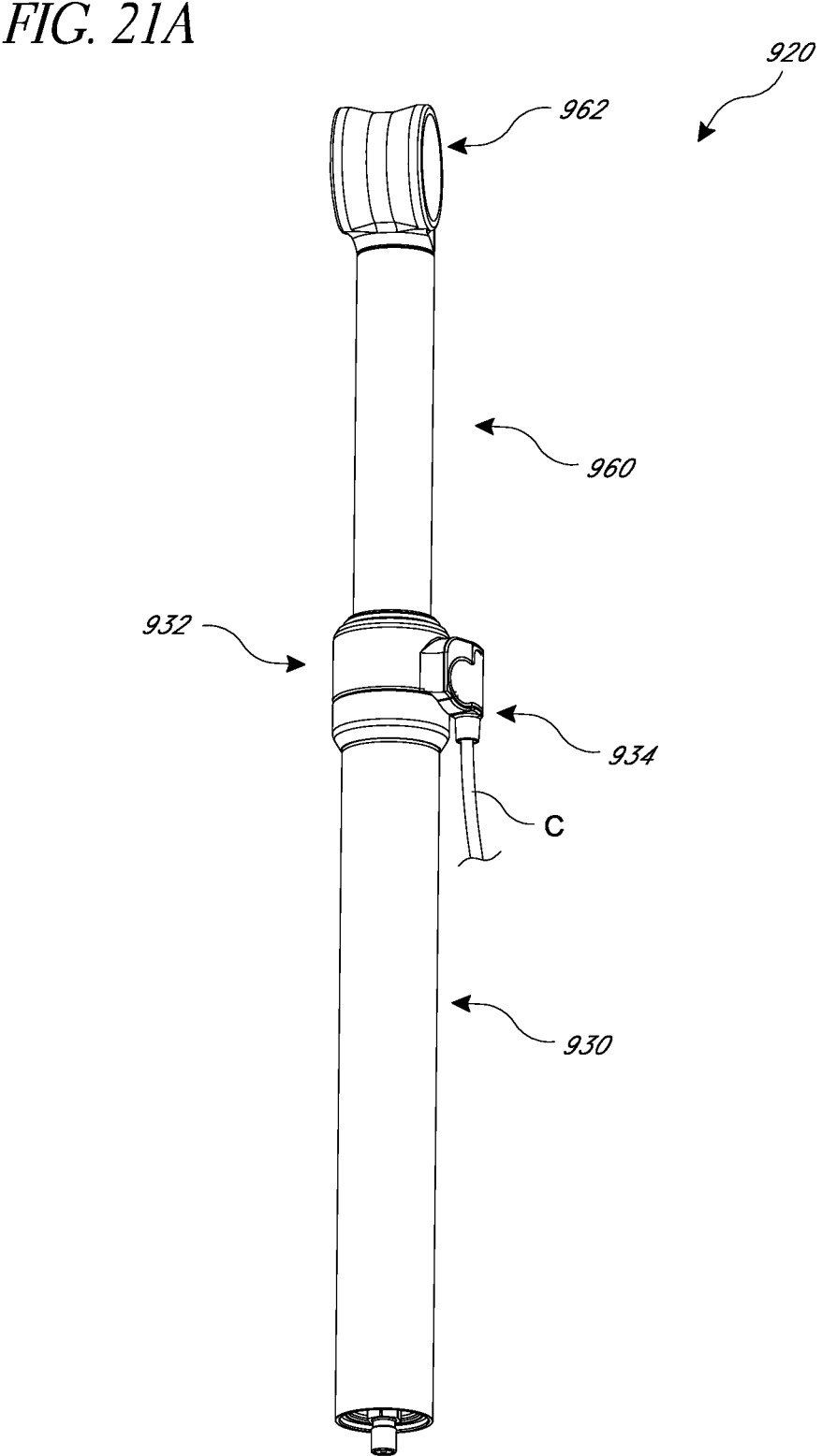
FIG. 21A illustrates a perspective view of an adjustable assembly according to another embodiment.
Figure 21B:
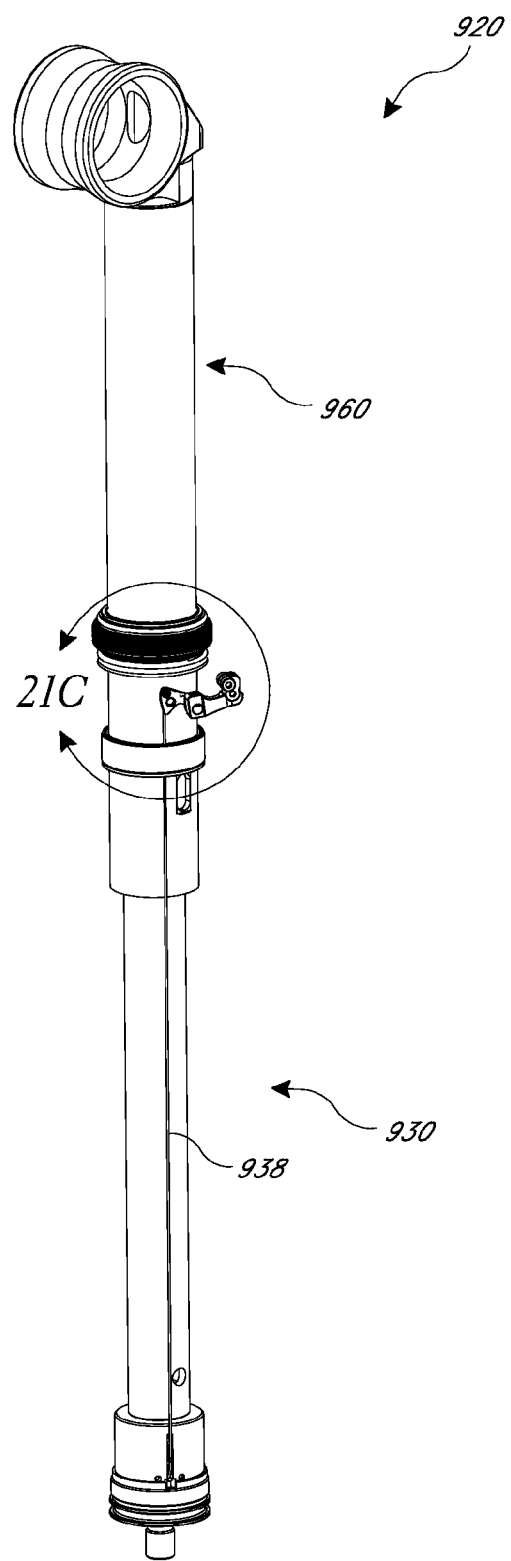
FIGS. 21B and 21C illustrate different perspective views of the adjustable assembly of FIG. 21A with a portion of the assembly hidden or removed for clarity.
Figure 21C:
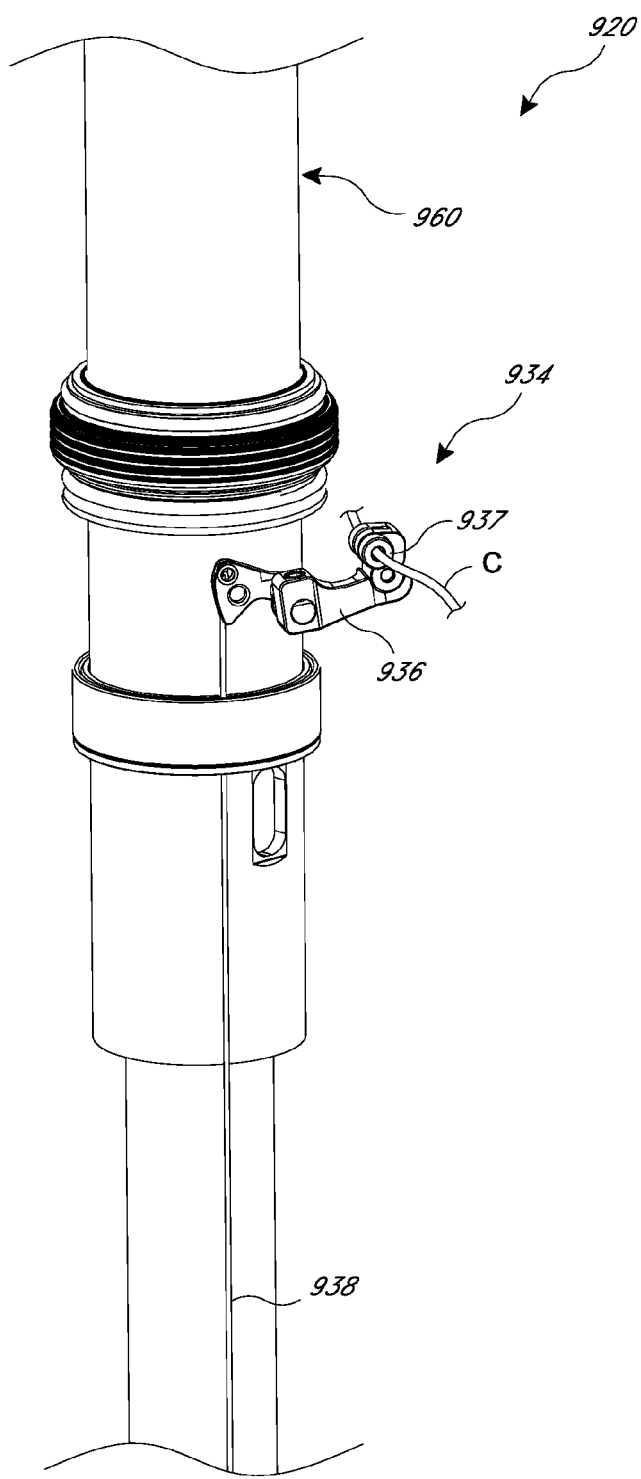

With reference to the perspective views of FIGS. 21B and 21C, the mechanically-actuated control cable C can be removably or permanently secured to a hinge assembly 936 located at or near the seal head portion 932 of the assembly 920. In some embodiments, the cable C is connected to a cable retention member 937 that is operatively coupled to the hinge assembly 936. For clarity, one or more components of the assembly, such as the outer tube and certain components of the seal head portion 932, have been hidden in these figures to more clearly view the manner in which mechanical actuation of the cables is accomplished. As shown, a cable 938 can extend from the hinge assembly 936 of the seal head portion 932 and downwardly along the interior of the outer tube (not shown in FIGS. 21B and 21C for clarity).

Figure 21D:
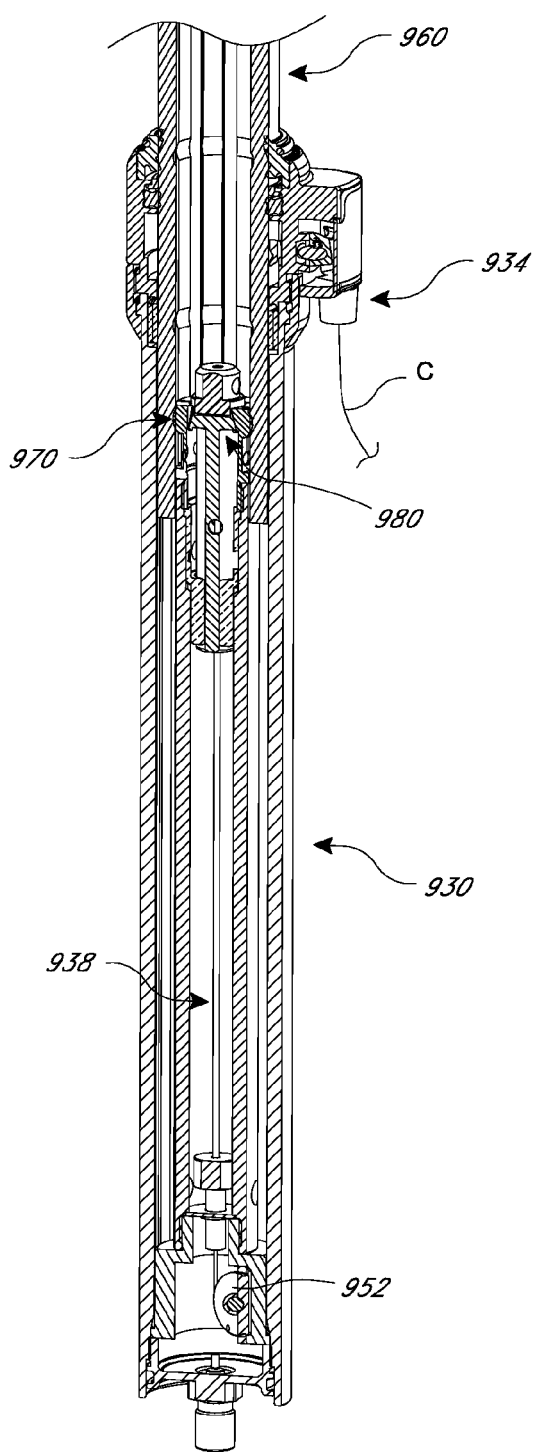
FIG. 21D illustrates a cross-sectional view of the adjustable assembly of FIG. 21A.
Figure 22A:
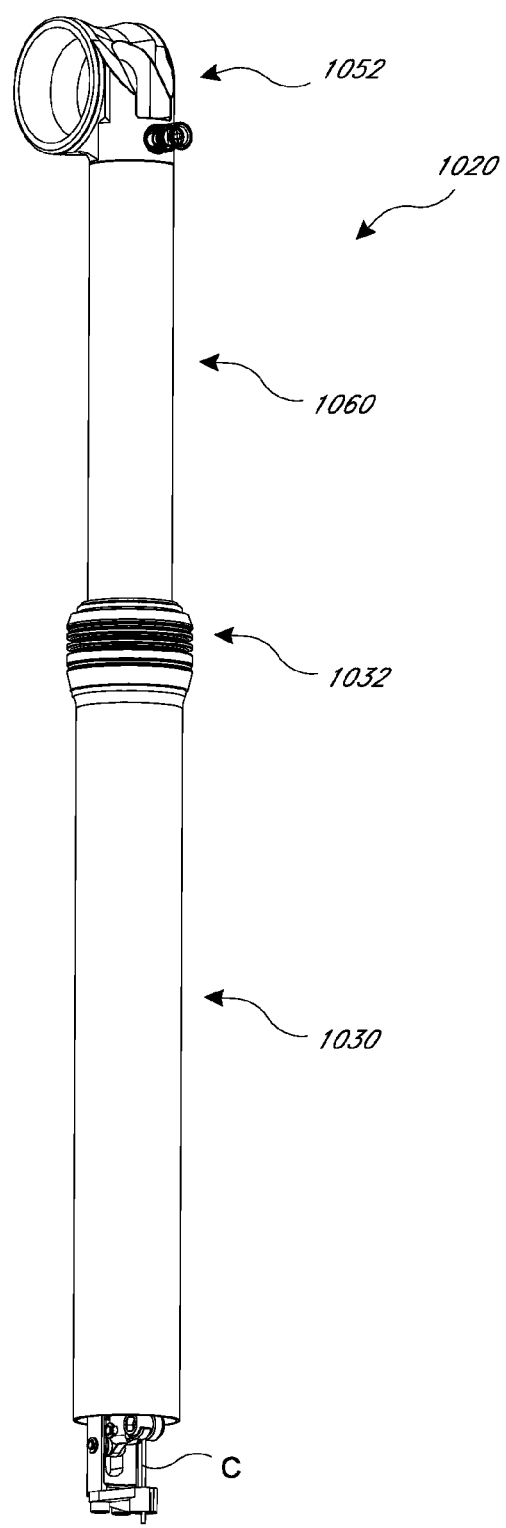
FIG. 22A illustrates a perspective view of an adjustable assembly according to another embodiment.
Figure 22B:
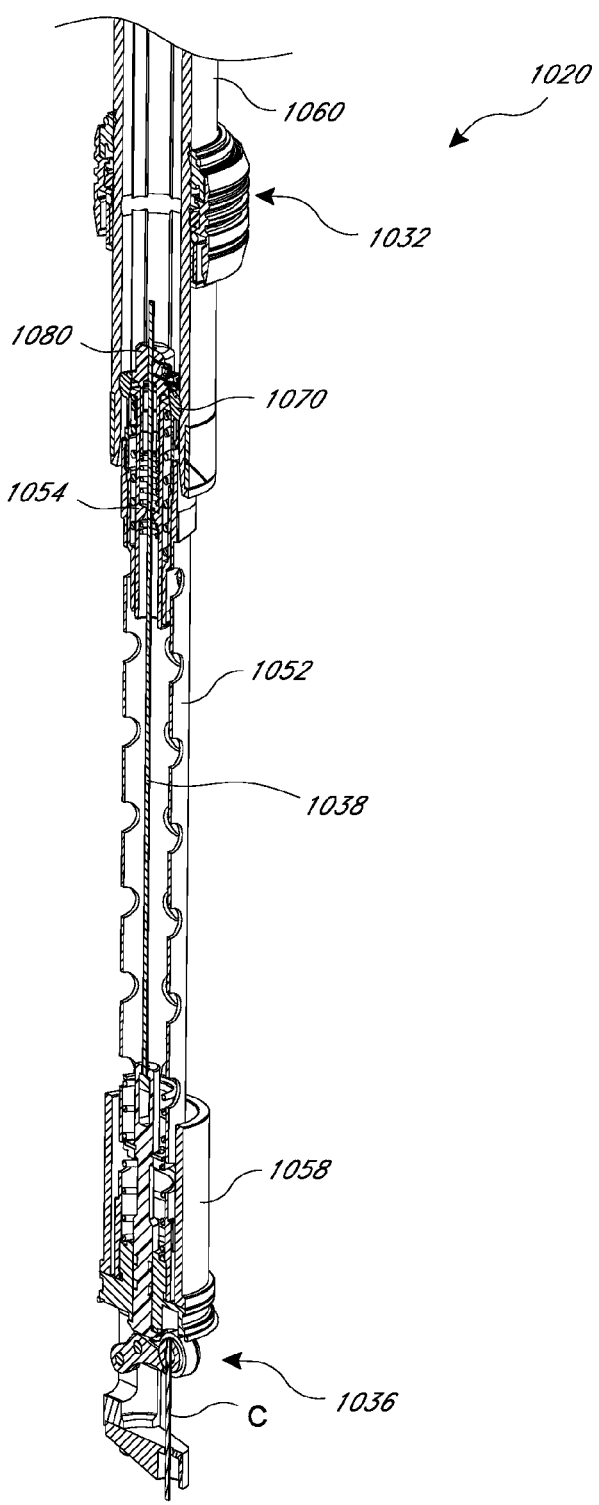
FIGS. 22B-22D illustrate different cross-sectional views of the adjustable assembly of FIG. 22A.
Figure 22C:
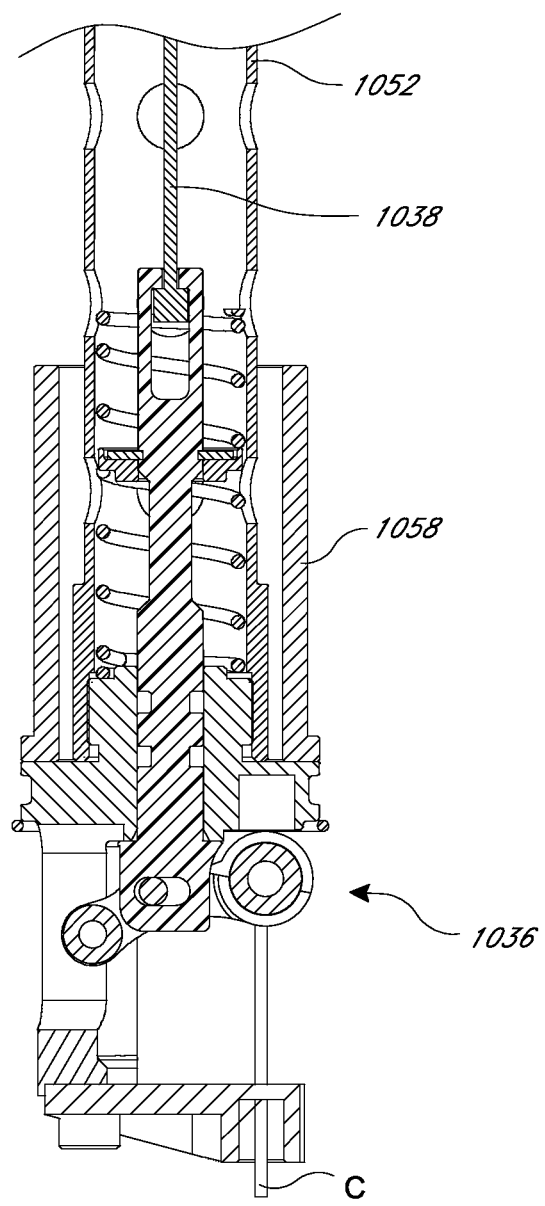
Figure 22D:
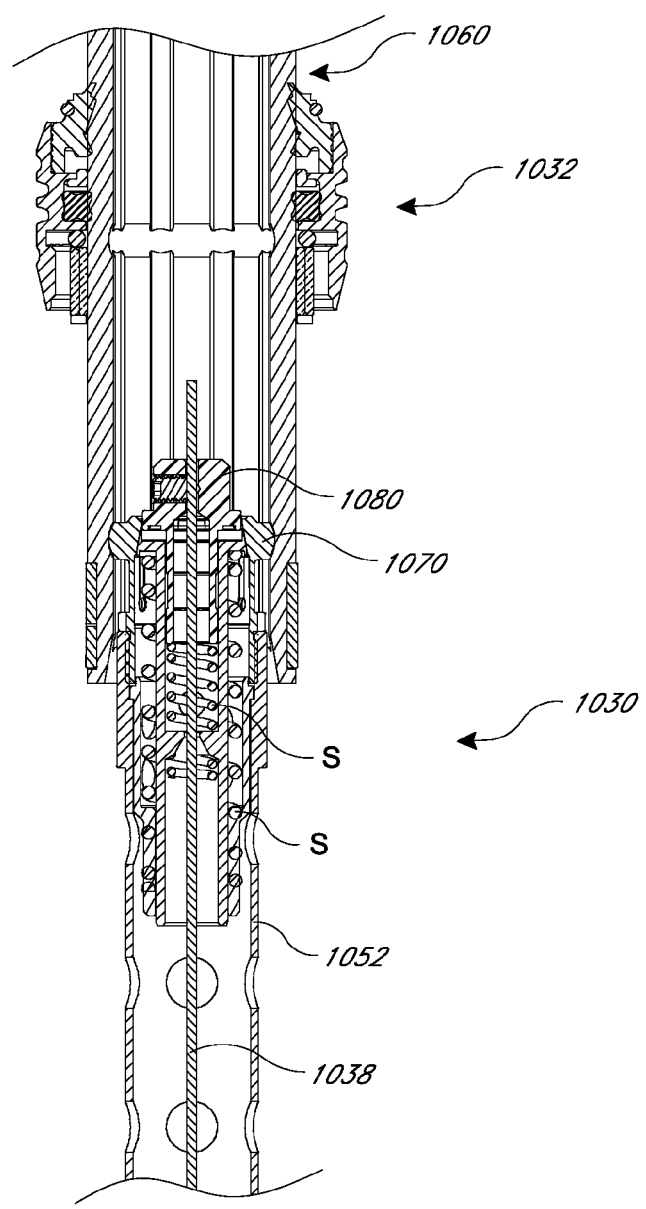
Figure 23A:
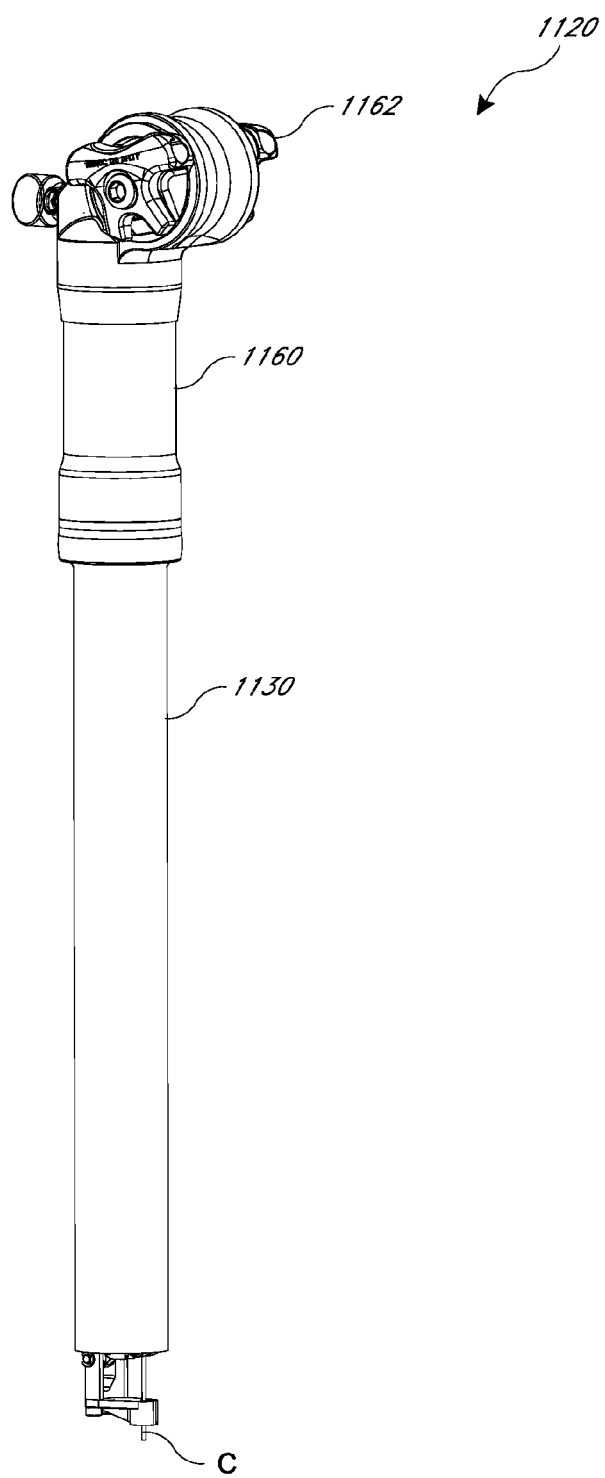
FIG. 23A illustrates a perspective view of an adjustable assembly according to another embodiment.
Figure 23B:
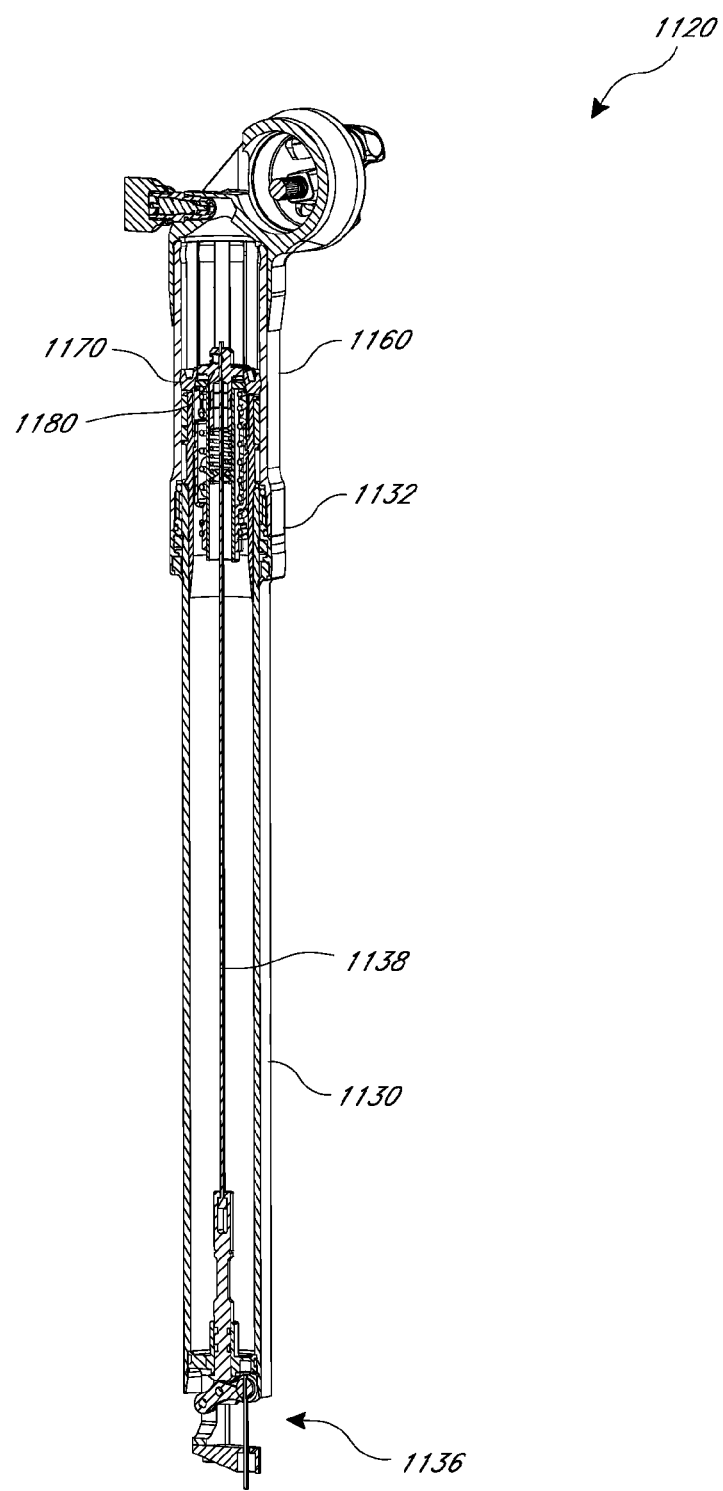
FIGS. 23B-23D illustrate different cross-sectional views of the adjustable assembly of FIG. 23A.
Figure 23C:
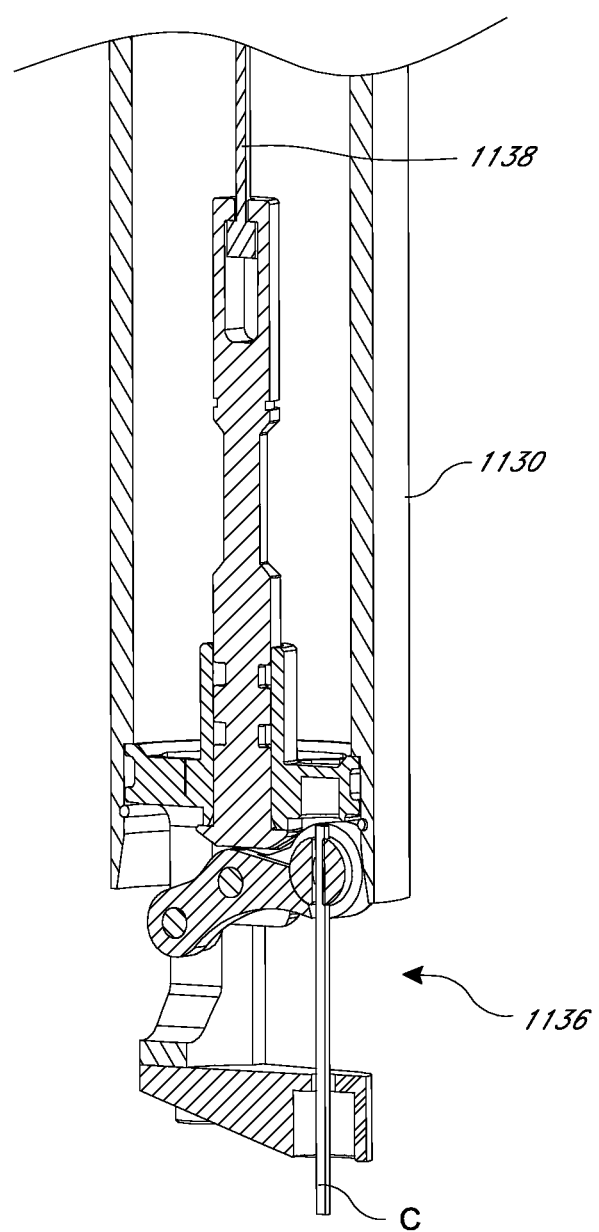
Figure 23D:
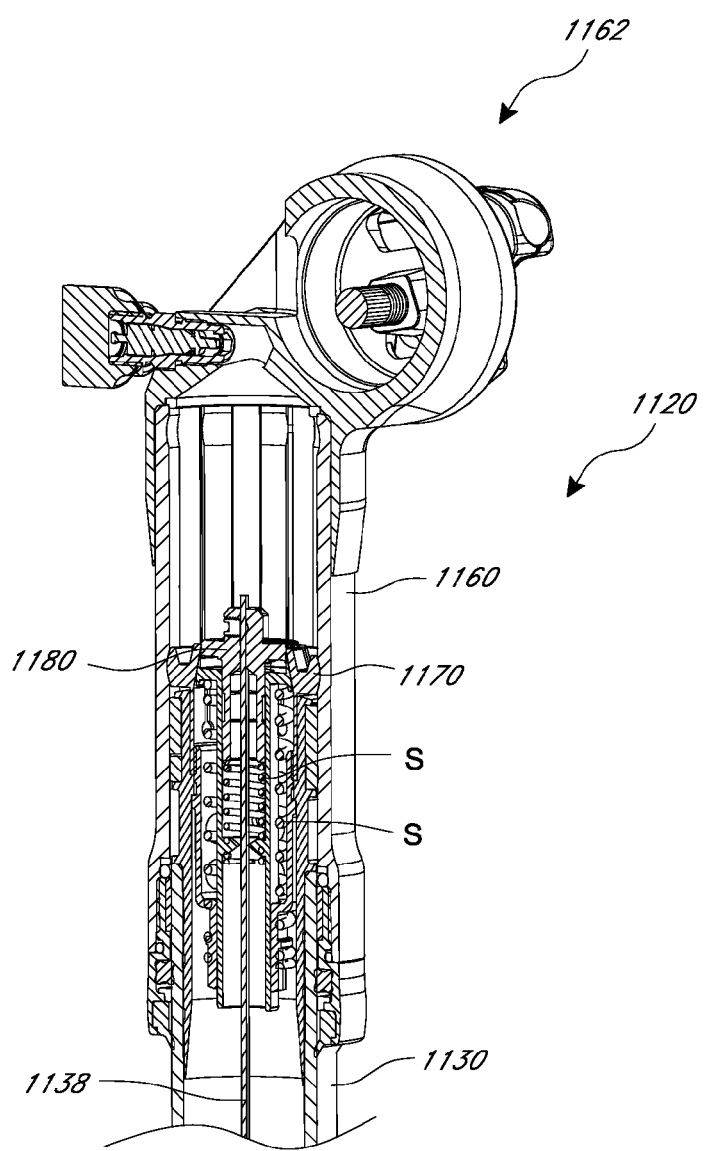

With continued reference to the cross-sectional view provided in FIG. 21D, the cable 938 can be routed to or near the bottom of the assembly's outer tube or support 930 where the cable's direction is reversed using a pulley 952 or similar device. As shown, the pulley 952 can advantageously align the cable 938 with the radial centerline of the assembly, such that the cable is routed upwardly through the interior of the outer tube (and possible one or more of the outer tube's internal components). According to some embodiments, the cable 938 is mechanically coupled to a retention assembly 980 that is resiliently biased, at least partially, within an interior of a collet or other expansion member or portion 970. As discussed herein with reference to other embodiments, the expansion portion 970 is sized, shaped and otherwise configured to engage a corresponding groove, recess and/or other surface of the inner tube 960 to maintain a desired relative orientation between the inner and outer tubes 960, 930. In addition, when the retention assembly 980 is positioned within an interior region or space of the collet or other expansion portion 970, the expansion portion is not permitted to retract inwardly, thereby further assuring that the expansion portion 970 will remain in engaging contact with the inner tube.

In some embodiments, the control cable C which is secured to the cable retention member 937 and which exits the seal head portion 932 is the same cable 938 routed within an interior of the outer tube 930 (e.g., around the pulley) that ultimately couples to the retention assembly 980. However, in other arrangements, the interior cable 938 is different than the control cable C that exits the assembly. In such an embodiment, the separate cables 938, C can be operatively coupled to each other at or near the seal head portion 932 (e.g., by the cable retention member 937, the hinge assembly 936 and/or one or more other components or devices).

Accordingly, in order to avoid the need for slack in the control cable C, the collet or other expansion portion 970 may be secured to the outer or lower tube or support 930, and the grooves or recesses (and/or other surfaces) that are engaged by the expansion portion 970 are located along an interior surface of the inner or upper tube or support 960. This is generally opposite of at least some of the adjustable assembly embodiments illustrated and discussed herein (e.g., see FIGS. 2-6). Thus, regardless of the exact location and orientation of the expansion portion, the grooves or recess and/or the like, the adjustable assembly can function in a similar manner. For example, in the embodiment of FIGS. 21A-21D, an air spring (and/or some other type of spring or resilient member) can be provided within the upper or lower tube to ensure that an upwardly directed force is applied to the upper tube.

FIGS. 22A-22D illustrate an embodiment of an adjustable assembly 1020 wherein the mechanically-actuated control cable C exits at or near the bottom of the assembly. As best depicted in the cross-sectional views of FIGS. 22B-22D, the control cable C exits the assembly at or near the bottom of the outer tube 1030. For clarity, at least a portion of the outer tube 1030 is hidden in these figures. The cable C can be coupled to a pivot or hinge assembly 1036, such that when the cable is pulled downwardly (e.g., generally away from the assembly), the pivot or hinge assembly 1036 will be moved against a resilient or other biasing force to also move the interior cable 1038 downwardly (e.g., toward the bottom of the assembly). Such a downward movement of the cable 1038 will cause the retention assembly 1080 that is directly or indirectly coupled to the cable 1038 to also move downwardly against a biasing force created by one or more springs S or other resilient members. As discussed herein with regard to other embodiments, movement of the retention assembly 1080 relative to the interior of the collet or other expansion portion or member 1070 can permit the expansion portion to retract inwardly. Accordingly, the expansion portion 1070 can disengage from a corresponding groove, recess and/or other portion of the interior wall of the inner tube 1060, allowing the rider to conveniently and reliably adjust the vertical position of the adjustable assembly.

With continued reference to the embodiment illustrated in FIGS. 22A-22D, the collet or other expansion portion 1070 can be coupled to one or more tubes or members 1052 positioned within an interior space of the outer tube 1030. In some embodiments, such interior tubes or members 1052 are maintained in a rigid orientation relative to the outer tube 1030 using one or more plugs 1058 or other members or components. The use of interior tubes, plugs and/or other components can assist in reinforcing the assembly and improve the structural integrity and/or capacity of the collet or other expansion portion 1070.

Yet another embodiment of an adjustable assembly for a seat post or another bicycle component is illustrated in FIGS. 23A-23D. As with the embodiment discussed herein with reference to FIGS. 22A-22D, this adjustable assembly comprises a control cable C that exits through or near the bottom of the lower tube 1130. However, unlike the embodiment of FIGS. 22A-22D, the stationary or lower tube in depicted assembly 1120 is the inner tube 1130 (not the outer tube 1160). Accordingly, the orientation of the upper tube and the lower tube is generally reversed in the adjustable assembly 1120 of FIGS. 23A-23D.

Figure 24A:
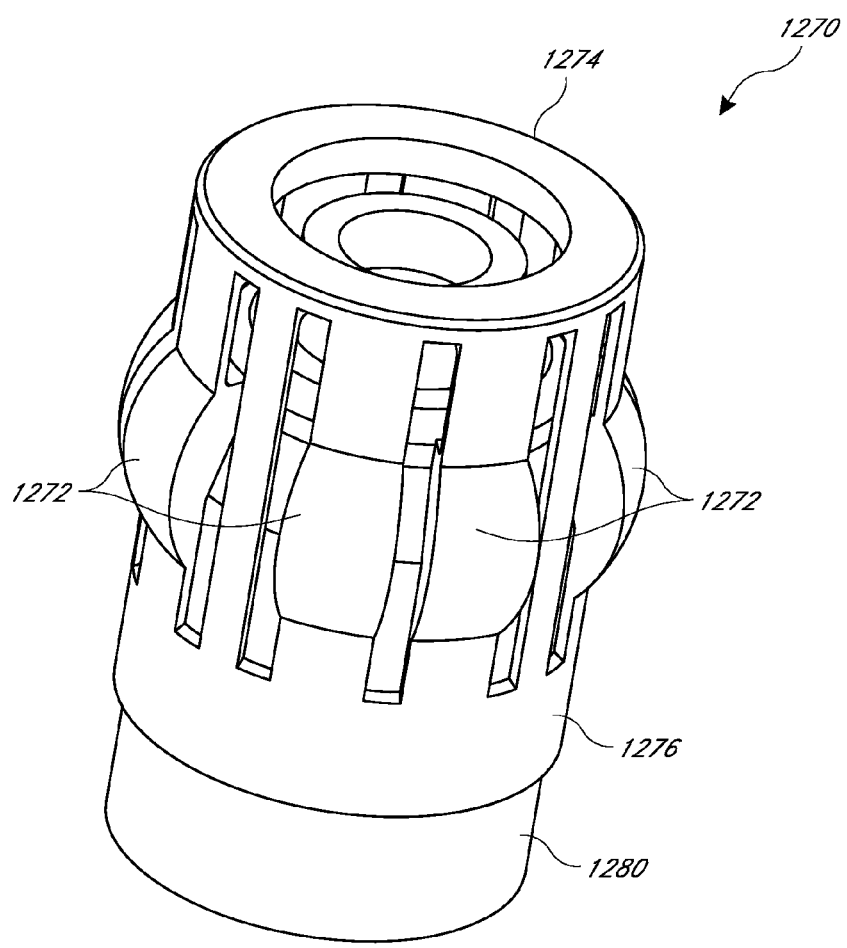
FIG. 24A illustrates a perspective view of an expandable member or expansion portion and a corresponding lock-pin according to one embodiment.
Figure 24B:
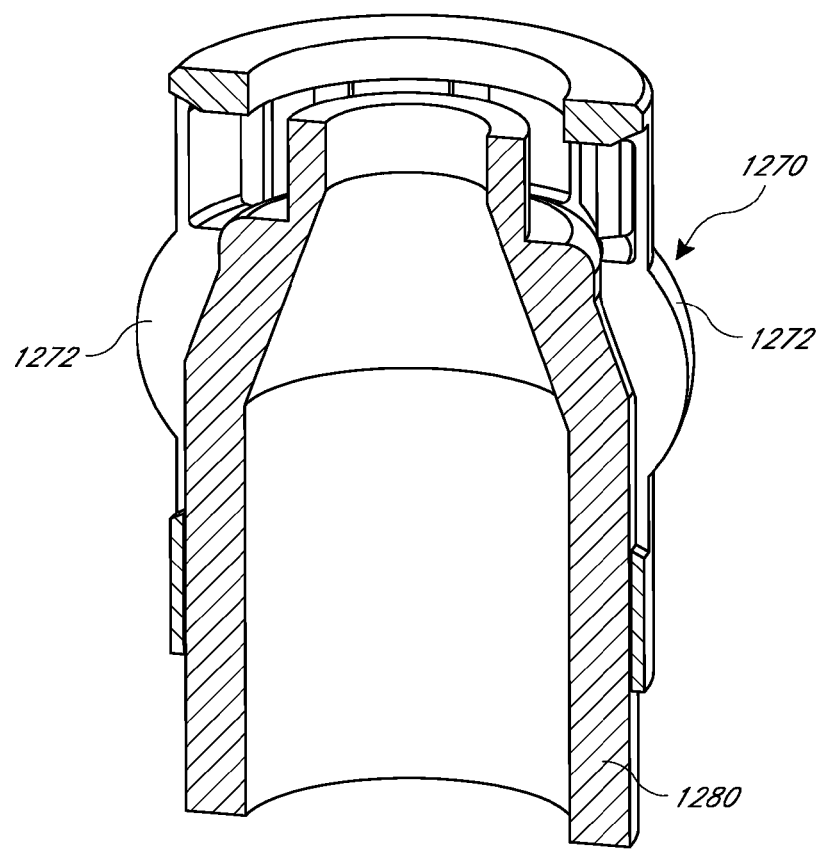
FIG. 24B illustrates a cross-sectional view of the expandable member or expansion portion and lock-pin of FIG. 24A.

FIGS. 24A and 24B illustrate a different embodiment of a collet or expansion portion or member 1270 and corresponding lock-pin or retention member 1280 that may be incorporated into any of the adjustable assembly configurations disclosed herein, or equivalent thereof. The plurality of flexible members or legs 1272 of the expansion portion 1270 are configured to flex inwardly in a generally linear manner. In other words, when subject to a radially inwardly oriented force, the flexible members 1272 of the collet or expansion portion 1270 will be urged radially inwardly, but will not pivot about a particular pivot point. For example, according to some embodiments, the flexible members or legs 1272 of the expansion portion 1270 are fixed to upper and lower base portions 1274, 1276 of the member. In such a configuration, the plurality of flexible members or legs 1272 that extend between the base portions 1274, 1276 are permitted to be compressed or otherwise moved in a radially inwardly direction (e.g., toward the centerline of the collet or expansion portion).

According to some embodiments, the expansion portion 1270 is manufactured by cutting or otherwise eliminating certain portions of a tube or other generally cylindrical member. In some arrangements, the depicted expansion portion 1270 is capable of supporting at least some vertical load exerted upon it. Accordingly, such a collet or other expansion portion 1270 can be supported by a tube (e.g., inner or outer tube) of an adjustable assembly while simultaneously pushing against or exerting a force on one or more adjacent springs or other resilient members without causing harm to or threatening the structural integrity of the expansion portion 1270 and/or disturbing or otherwise negatively affecting the function of the expansion portion.

Figure 25A:
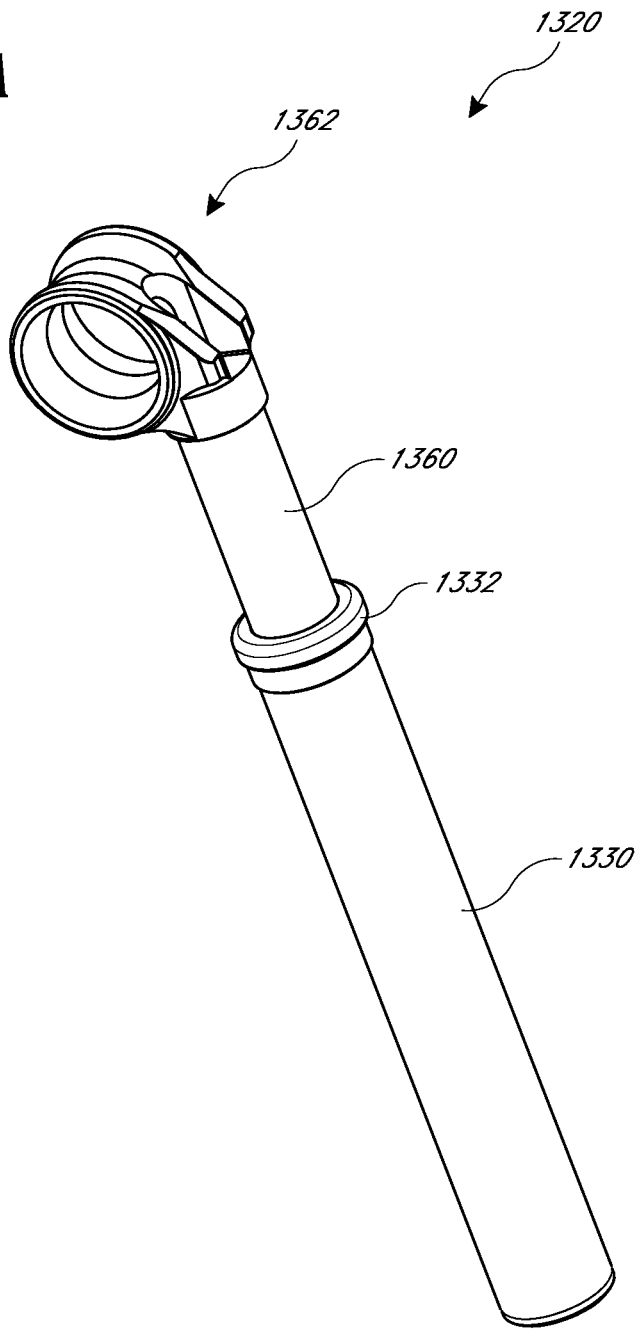
FIG. 25A illustrates a perspective view of an adjustable assembly according to another embodiment.

FIG. 25A illustrates another embodiment of an adjustable assembly 1320 comprising an inner tube 1360 that is configured to be selectively moved relative to an outer tube 1330. In the depicted embodiment, the inner tube 1360 is slidably positioned within an interior of the outer tube 1330 and expends above the outer tube. However, as noted above, the inner tube can be positioned to extend below the outer tube, as desired or required by a particular application or use. Such a design modification can be incorporated into any of the embodiments of the adjustable assembly disclosed herein. As with other embodiments disclosed herein, the lower tube (e.g., the outer tube 1330) can be sized, shaped and otherwise configured to be secured to a frame of a bicycle, whereas the upper tube (e.g., the inner tube 1360) can be secured to a bicycle saddle (e.g., via the saddle head 1362). The adjustable assembly 1320 can be incorporated into a bicycle as an original component. Alternatively, the assembly 1320 can be supplied as an after-market product that can replace an original seat post.

Figure 25B:
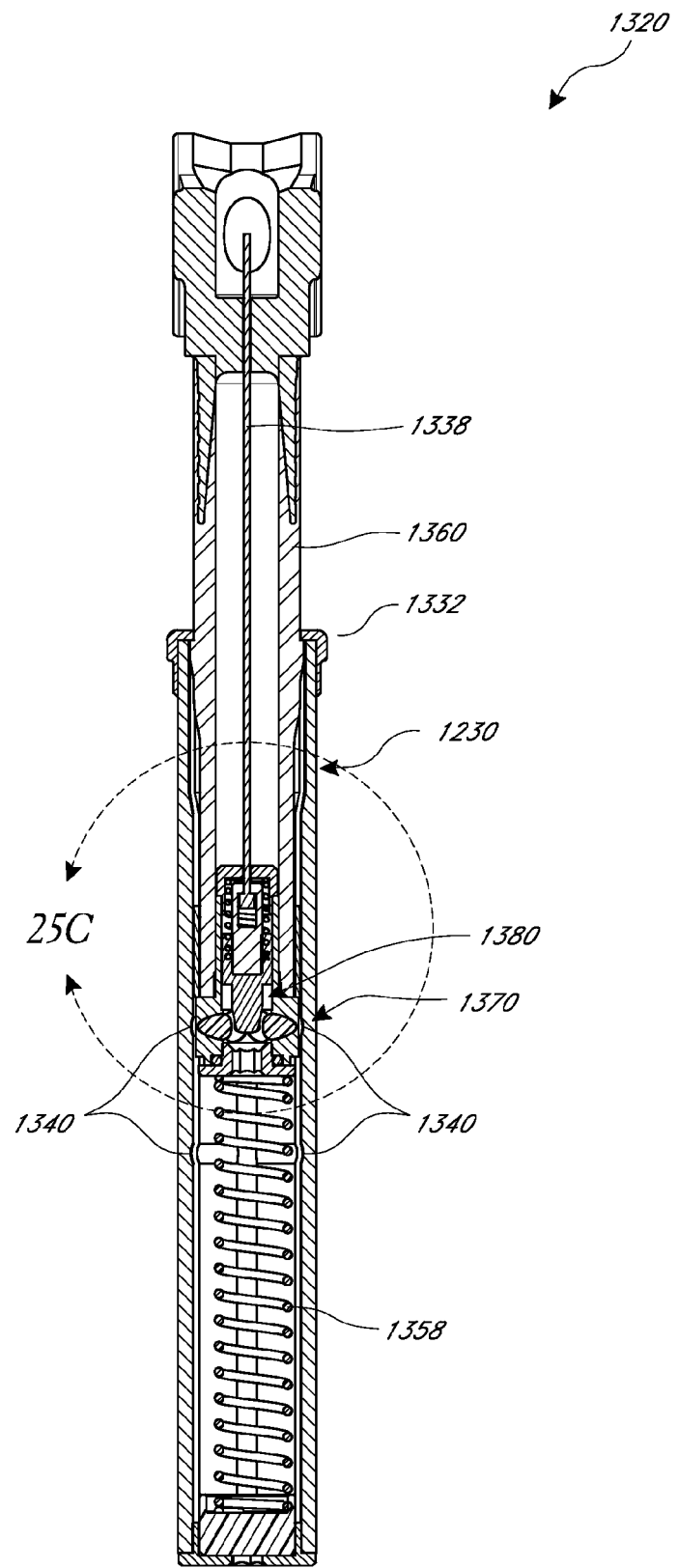
FIGS. 25B-25E illustrate different cross-sectional views of the adjustable assembly of FIG. 25A.
Figure 25C:
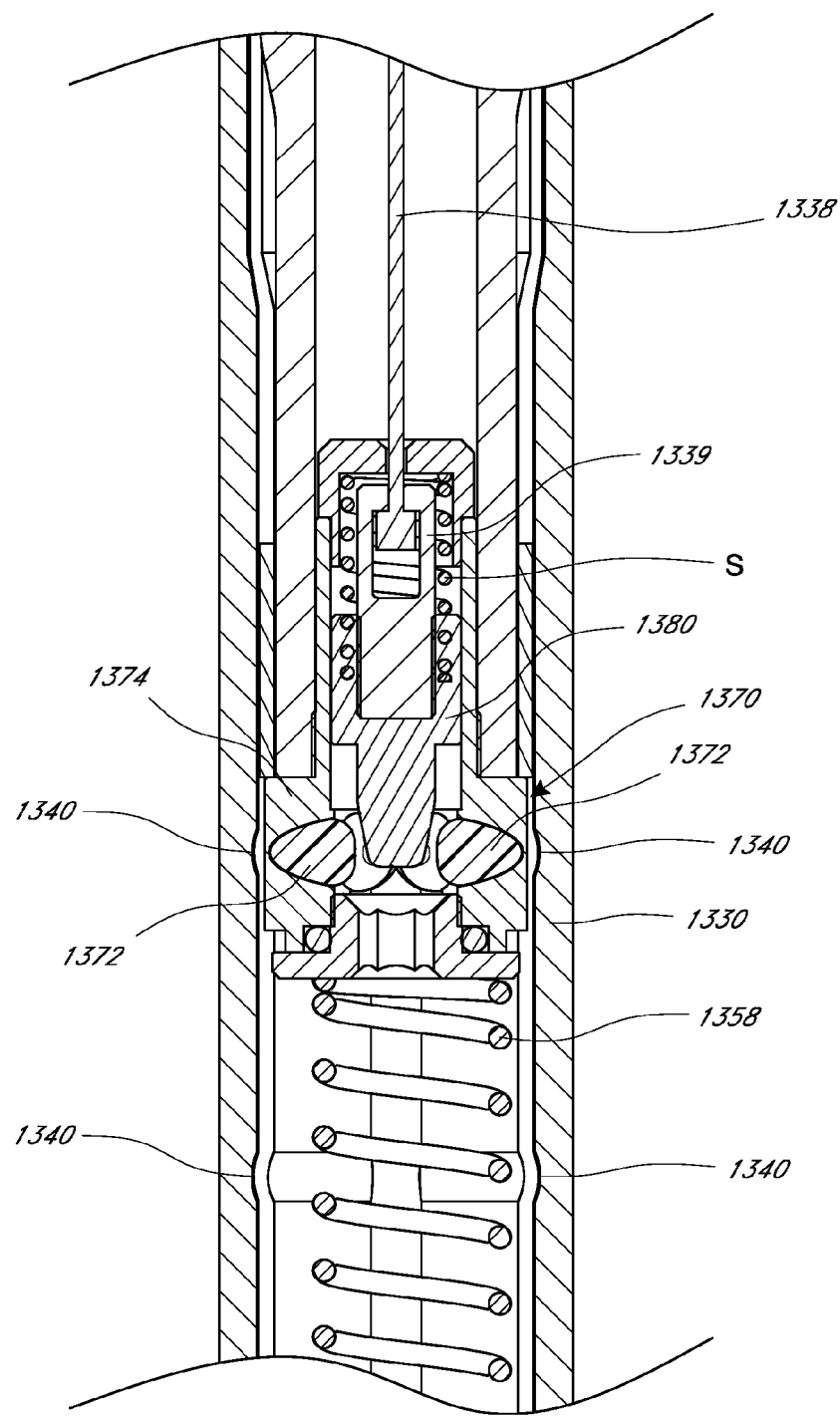

With reference to the cross-sectional views of FIGS. 25B and 25C, a cable 1338 or other mechanical actuator or connection can be routed through the interior of the inner or upper tube 1360. In some embodiments, the cable 1338 mechanically couples to an expansion portion 1370 (either directly or indirectly through one or more components). The other end of the cable 1338 can be routed to a lever or other actuator. For example, in some embodiments, the cable 1338 is connected to a lever or other actuator at or near the handlebars of the bicycle, allowing a rider to advantageously change the position of the adjustable assembly while the bicycle is being ridden. In the depicted arrangement, the cable or other connector 1338 is routed through the top of the assembly. However, as discussed with reference to other embodiments herein, the cable can exit the assembly from any other location (e.g., the bottom of the assembly, the seal head 1332, another side portion of the assembly, etc.).

With continued reference to the detailed cross-sectional view of FIG. 25C, the cable 1338 is secured to a pull rod 1339 and/or one or more other intermediate couplings that abut or otherwise contact a retention assembly 1380. As shown, the retention assembly 1380 can be normally resiliently biased toward an expansion portion 1370, generally away from the cable 1338. For example, the retention assembly 1380 can be in the "locked" position shown in FIG. 25C when the cable 1338 is not being pulled or otherwise actuated by a rider.

Figure 25D:
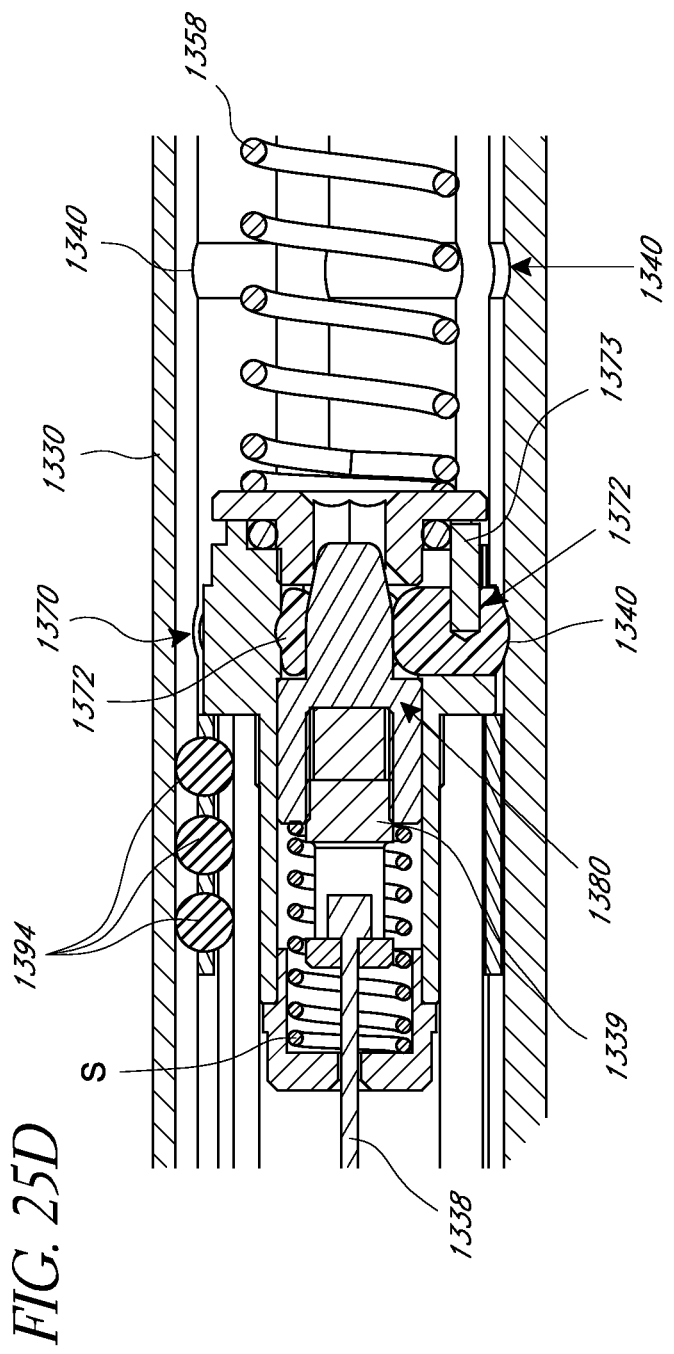
Figure 25E:
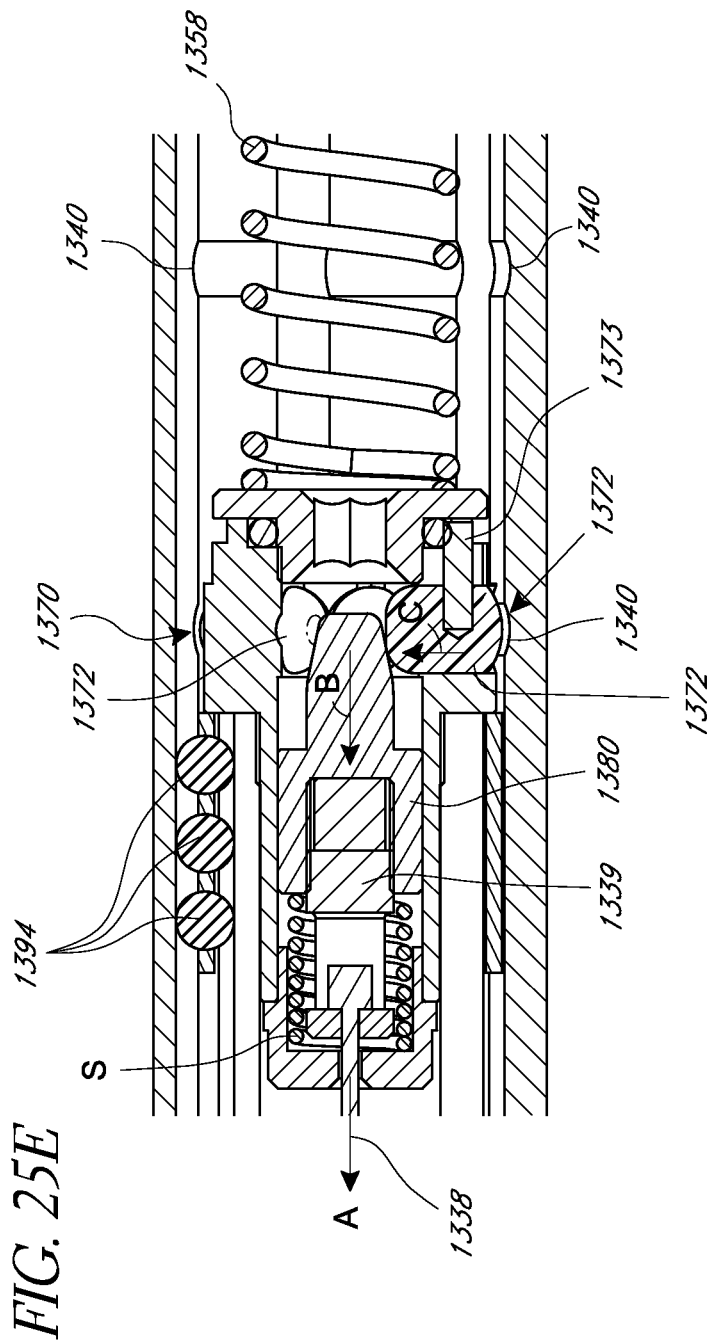
Figure 25F:
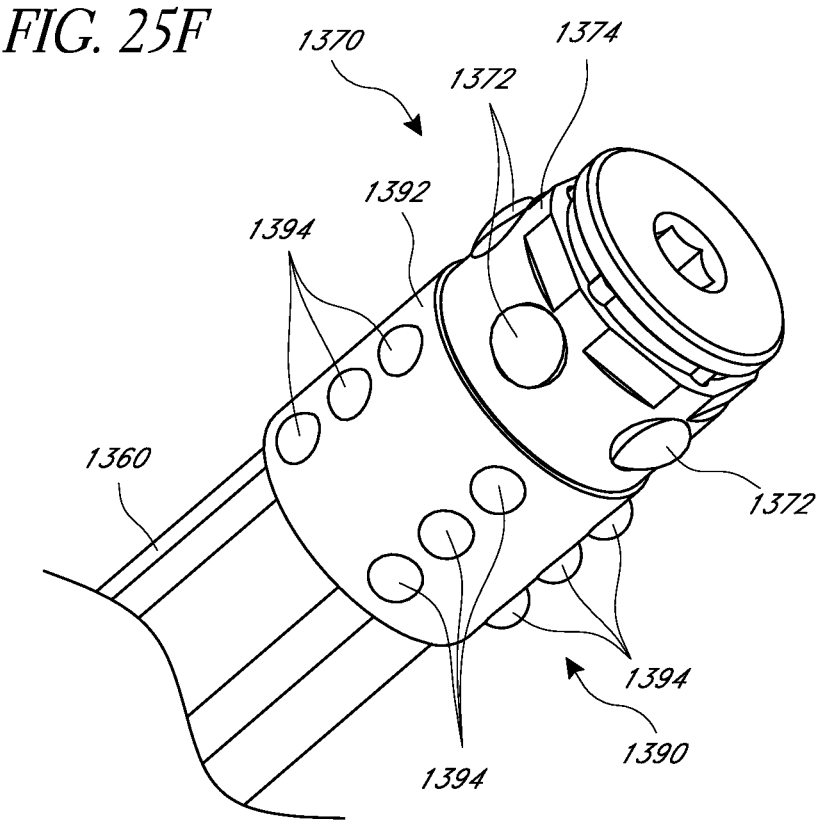
FIG. 25F illustrates a perspective view of one embodiment of an expansion portion incorporated into the adjustable assembly of FIG. 25A.

As illustrated in FIG. 25F, the expansion portion 1370 can be positioned along the end of the inner or upper tube 1360. According to some embodiments, the expansion portion 1370 comprises a plurality of movable members or elements 1372 that can be selectively moved between radially contracted and radially expanded positions. In the illustrated arrangement, the expansion portion 1370 comprises a total of five elements 1372 that are equally or substantially equally spaced apart relative to one another. However, in other embodiments, the expansion portion 1370 comprises more elements (e.g., 6, 7, 8, 9, 10, more than 10, etc.) or fewer elements (e.g., 1, 2, 3, 4), as desired or required. In addition, as shown, the elements 1372 can be configured to be moved into and out of corresponding openings of a drivehead or outer shell 1374 of the expansion portion 1370.

According to some embodiments, the elements 1372 have a spherical, partial spherical or other curved or rounded (e.g., non-linear) shape along one or more portions. For example, such a partial spherical portion can be advantageously located along the radial exterior of the elements 1372. In some arrangements, the spherical, partial spherical and/or other curved portion(s) of a radial exterior surface of the elements 1372 can be shaped and configured to at least partially match or otherwise mate with corresponding grooves or other features 1340 located along an interior surface of the outer or lower tube 1330. Therefore, as with other embodiments of an expansion portion disclosed herein, when the elements 1372 are moved to a radially expanded position, the expansion portion 1370 at least temporarily engages the outer tube 1330, thereby preventing any relative movement between the inner tube 1360 and the outer tube. Alternatively, when the elements 1372 of the expansion portion 1370 are moved to a radially contracted position, the elements 1372 disengage from the grooves 1340 and/or other portion of the outer tube 1330, and the inner tube 1360 is permitted to move relative to the outer tube 1330. Under these circumstances, the vertical orientation of the adjustable assembly 1320 can be advantageously modified by the rider of the bicycle.

With continued reference to FIG. 25F, the inner or upper tube 1360 can include a ball bearing assembly 1390. In the illustrated embodiment, the ball bearing assembly 1390 is positioned immediately adjacent to the expansion portion 1370. In other arrangements, however, the ball bearing assembly 1390 can be positioned along any other portion of the inner or upper tube 1360. Regardless of its exact position, orientation, size and/or other details, the ball bearing assembly 1390 can advantageously reduce friction and facilitate movement between the inner and outer tubes 1360, 1330 during use. In other embodiments, one or more other devices, components and/or features can be used to facilitate such relative movement, either in addition to or in lieu of ball bearings. As illustrated in FIG. 25F, in some embodiments, the ball bearing assembly 1390 comprises a total of fifteen ball bearings 1394 that are arranged in five separate vertical rows (with three ball bearings in each row). In other arrangements, the quantity, size, orientation (e.g., number of rows), spacing and/or other details regarding the ball bearings 1394 can vary.

In FIG. 25C, the elements 1372 of the expansion portion 1370 are in a radially contracted position. Thus, as shown, the expansion portion 1370 does not engage the grooves 1340. In some embodiments, the expansion portion may also not engage any other surface or portion of the outer tube 1330. In the illustrated embodiment, as noted above, the inner tube 1360 is permitted to move relative to the outer tube 1330. For example, under such circumstances, when the rider lifts off the saddle (or otherwise reduces the downwardly directed forced on the saddle), a spring (e.g., coil spring, air spring, etc.) or other resilient member 1358 positioned within the outer tube 1330 (and below the expansion portion 1370 in the illustrated embodiment) can advantageously cause the expansion portion, and thus the inner tube 1360, to be lifted relative to the lower tube 1330. As a result, the bicycle saddle can be lifted, even when the bicycle is being ridden. Alternatively, if the rider exerts a downwardly directed force on the saddle while the expansion portion 1370 is in the contracted position (as illustrated in FIG. 25C), the inner tube 1360 can be moved within an interior of the outer tube 1330 (e.g., against the resilient force of the spring or other resilient member 1358), thereby causing the saddle to be lowered.

In the illustrated embodiment, the outer or lower tube 1330 comprises a single coil spring 1358 to exert an upwardly directed force on the expansion portion 1370 and the inner or upper tube 1360. However, in alternative arrangements, two or more coil springs can be used. In other embodiments, one or more air springs, elastomeric materials and/or other devices or materials configured to exert a resilient force can be incorporated into the adjustable assembly 1320, either in lieu of or in addition to one or more coil springs. Such design alternatives regarding the springs or other biasing members are relevant to any of the adjustable assembly embodiments disclosed herein.

In FIG. 25D, the elements 1372 (e.g., balls, pawls, other spherical or partially spherical members, etc.) of the expansion portion 1370 are in a radially expanded position, such that their outer spherical or curved surfaces at least partially engage a circumferential groove 1340 or other portion of the outer or lower tube 1330. As illustrated, in some embodiments, the movable elements 1372 of the expansion portion are supported by one or more pins 1373 and/or other members. Such pins 1373 or other support members can permit the elements 1372 to be moved between the radially retracted and radially expanded positions. In some embodiments, such pins or other support members are resiliently biased, either in a radially inward position or orientation or a radial outward position or orientation. Thus, the movable elements 1372 (e.g., balls, pawls, other spherical or partially spherical members, etc.) can normally assume a radially contracted position wherein the elements 1372 do not engage a corresponding groove 1340 or any other portion of the adjacent support 1330 (e.g., as illustrated in FIGS. 25C and 25E). Such elements can be moved to a radially expanded position or orientation (e.g., as illustrated in FIG. 25D) when the retention member 1380 is moved within an interior portion of the elements. The elements 1372 can be moved in the radially expanded position against a spring or other biasing force (e.g., created by the pins or other support members 1373).

According to some embodiments, in order to move the expansion portion 1370 to a radially contracted position, the user manipulates a lever or other actuator (e.g., button, knob, etc.), causing the cable 1338 to retract or move upwardly (e.g., in a direction generally represented by arrow A in FIG. 25E). As discussed with reference to other arrangements, any of the adjustable assembly embodiments disclosed herein can include another type of component or device to facilitate movement of the expansion assembly between radially expanded and contracted positions (e.g., pneumatic or hydraulic connections, servomotors, solenoids, etc.), either in lieu of or in addition to a mechanically actuated cable 1338.

With continued reference to FIG. 25E, once the cable 1338 or other actuator is retracted (or otherwise moved away from the expansion portion 1370), a lockpin 1339 and retention assembly 1380 are also in a similar direction against one or more springs S or other resilient members (e.g., in a direction generally represented by arrow B). As a result, the retention assembly 1380 moves away from an interior space defined by the elements 1372 of the expansion portion 1370. In some embodiments, the elements 1372 or other movable members of the expansion portion 1370 are resiliently biased inwardly. Thus, when the retention assembly 1380 is moved away from the interior of the expansion portion 1370, the elements 1372 can retract inwardly (e.g., in a direction generally represented by arrow C) and disengage from the groove 1340 or other portion of the outer tube 1330. As discussed above, this causes the assembly to become "unlocked," permitting the inner tube 1360 to move relative to the outer tube 1330. The inner tube can be moved either within or out of the outer tube (e.g., vertically downwardly or upwardly), depending on whether the downwardly exerted forces on the adjustable assembly 1320 are greater or less than the force created by the biasing member 1358 (e.g., coil spring, air spring, elastomeric member or material, other resilient member, etc.).

Once the cable 1338 is moved to its original position (e.g., by the rider releasing a lever, manipulating another actuator or controller, etc.), the retention assembly 1380 can return to the interior of the expansion portion 1370, forcing the elements to an expanded position. Accordingly, the exterior surfaces of the elements 1372 can engage a corresponding groove or other portion of the outer tube 1330 to once again prevent relative movement between the inner and outer tubes. In some embodiments, the retention assembly 1380 effectively locks the elements of the expansion assembly in a radially expanded position when positioned within an interior of the expansion assembly 1370. This can advantageously ensure that the vertical position of the adjustable assembly 1320 will not unintentionally move during use.

Although the foregoing description of the preferred embodiments has shown, described, and pointed out certain novel features, it will be understood that various omissions, substitutions and/or changes in the form of the detail of the apparatus, device, system and/or method as illustrated, as well as the uses thereof, may be made by those skilled in the art without departing from the spirit of this disclosure. Consequently, the scope of the present inventions should not be limited by the foregoing discussion, which is intended to illustrate rather than limit the scope of the inventions.

In addition, although this invention has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of this inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described and illustrated herein, but should be determined only by a fair reading of the claims that follow.

What is claimed is:

1. An adjustable assembly for a bicycle, comprising:
a lower tubular support attached to a bicycle frame;
an upper tubular support attached to a bicycle saddle extending from the frame, the upper support longitudinally slidable relative to the lower support;
wherein the lower support comprises an annular expansion portion disposed on a portion of the lower support and configured to be moved between a radially expanded position and a radially contracted position, wherein an outer surface of the expansion portion is configured to engage an interior surface of the upper support when the expansion portion is in the radially expanded position;
a retention assembly movably connected to the lower support adjacent the expansion portion, and configured to slidably move at least partially within or out of an interior space of the expansion portion between a locked position and an unlocked position;
wherein, when the retention assembly is in the locked position, the retention assembly is moved upwards, towards the saddle, and occupies the interior space of the expansion portion to secure it in the radially expanded position, thereby preventing longitudinal movement of the upper support relative to the lower support; and
wherein, when the retention assembly is in the unlocked position, the retention assembly is moved downward, away from the saddle and out of the interior space of the expansion portion, thereby allowing the upper support to move longitudinally relative to the lower support;
a biasing member exerting an upward force on the retention assembly such that the expansion portion is normally resiliently biased into the locked position;
a resilient member disposed above the upper end of the lower support and within the interior surface of the upper support adapted to provide an upwardly-directed force to the upper support to provide movement of the upper support away from the bicycle frame when the retention assembly is in the unlocked position; and an actuator operatively coupled to the retention assembly, the actuator being configured to selectively move the retention assembly between the locked and unlocked positions;

wherein the actuator is routed to or near a bottom of the lower support.

2. The adjustable assembly of claim 1, wherein the actuator exits the bottom of the adjustable assembly.

3. The adjustable assembly of claim 1, wherein the resilient member comprises an air spring.

4. The adjustable assembly of claim 3, further comprising a valve configured to permit a user to inject fluid therethrough to adjust a resilient force created by the air spring.

5. The adjustable assembly of claim 4, wherein the valve is located near an upper portion of the assembly so that fluids can be delivered to the air spring through the upper support.

6. The adjustable assembly of claim 4, wherein the valve comprises a Schrader valve.

7. The adjustable assembly of claim 1, wherein the resilient member comprises at least one of a coiled spring, an elastomeric material and another resilient member.

8. The adjustable assembly of claim 1, wherein the lower support comprises an interior member, the interior member being maintained in a rigid orientation relative to the lower support, wherein the expansion portion is coupled to the interior member.

9. The adjustable assembly of claim 1, wherein the expansion portion comprises a collet.

10. The adjustable assembly of claim 1, wherein the expansion portion is configured to engage a groove along the interior surface of the upper support.

11. The adjustable assembly of claim 1, wherein the upper support is configured to be moved relative to the lower support while the bicycle is being ridden.

12. The adjustable assembly of claim 1, further comprising a seal head portion located generally along an overlap of the upper support and the lower support, wherein the seal head is positioned along a top of the lower support.

13. The adjustable assembly of claim 1, wherein the actuator is operatively coupled to a lever located at or near a handlebar area of the bicycle to permit a rider to selectively adjust a position of the upper support relative to the lower support.

14. The adjustable assembly of claim 1, wherein the actuator comprises at least one cable.

15. The adjustable assembly of claim 1, wherein the expansion portion is coupled to the lower support.

* * * * *